United States Patent
Ouchi et al.

(10) Patent No.: US 12,096,453 B2
(45) Date of Patent: Sep. 17, 2024

(54) USER EQUIPMENT, BASE STATION AND METHOD

(71) Applicant: SHARP KABUSHIKI KAISHA, Sakai (JP)

(72) Inventors: Wataru Ouchi, Sakai (JP); Toshizo Nogami, Sakai (JP); Tomoki Yoshimura, Sakai (JP); Takahisa Fukui, Sakai (JP); Huifa Lin, Sakai (JP); Ryota Morimoto, Sakai (JP); Daiichiro Nakashima, Sakai (JP); Shoichi Suzuki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 213 days.

(21) Appl. No.: 17/691,906

(22) Filed: Mar. 10, 2022

(65) Prior Publication Data
US 2023/0232406 A1      Jul. 20, 2023

(30) Foreign Application Priority Data
Jan. 14, 2022   (JP) .................. 2022-004653

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .................. H04W 72/23; H04W 72/1268
USPC ............................................ 370/329
See application file for complete search history.

(56) References Cited

U.S. PATENT DOCUMENTS

| 2020/0396760 A1 | 12/2020 | Yi et al. |
| 2021/0266887 A1 | 8/2021 | Zhang et al. |

*Primary Examiner* — Angel T Brockman
(74) *Attorney, Agent, or Firm* — ScienBiziP, P.C.

(57) ABSTRACT

A user equipment (UE) is described. The UE may comprise high-layer processing circuitry configured to acquire at least a first RRC parameter for indicating whether or not a transform precoder is enabled and a second RRC parameter for indicating whether or not a transform precoding indicator field is included in a DCI format, reception circuitry configured to receive the DCI format for scheduling of a PUSCH and transmission circuitry configured to transmit the PUSCH.

3 Claims, 25 Drawing Sheets

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

Figure 2B: Number of OFDM symbols per slot, slots per frame, and slots per subframe for extended cyclic prefix $k = 0$;  Step 0
$j = 0$;  Step 1
while $k < E_r$  Step 2
  if $d^r(mod(k_0 + j, N_{cb})) \neq <NULL>$  Step 3
    $e(k) = d^r(mod(k_0 + j, N_{cb}))$;  Step 4
    $k = k + 1$;  Step 5
  end if
  $j = j + 1$;  Step 6
end while  Step 7

Figure 13

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| | PUSCH scheduled by MAC RAR or MAC fallbackRAR or for MsgA PUSCH transmission | No | - | Default A |
| | | Yes | - | *pusch-TimeDomainAllocationList* provided in *pusch-ConfigCommon* |
| C-RNTI, MCS-C-RNTI, TC-RNTI, CS-RNTI | Any common search space associated with CORESET 0 | No | | Default A |
| | | Yes | | *pusch-TimeDomainAllocationList* provided in *pusch-ConfigCommon* |
| C-RNTI, MCS-C-RNTI, TC-RNTI, CS-RNTI | Any common search space associated with CORESET 0, DCI format 0_0 in UE specific search space | No | No | Default A |
| | | Yes | No | *pusch-TimeDomainAllocationList* provided in *pusch-ConfigCommon* |
| | | No/Yes | Yes | *pusch-TimeDomainAllocationList* provided in *pusch-Config* |

Figure 21

| pusch-ConfigCommon includes pusch-TimeDomainAllocationList | pusch-Config includes pusch-TimeDomainAllocationList | pusch-Config includes pusch-TimeDomainAllocationListDCI-0-1 | pusch-Config includes pusch-TimeDomainAllocationList-ForMultiPUSCH or includes pusch-TimeDomainAllocationList-ForMultiPUSCH-r17 | PUSCH time domain resource allocation to apply |
|---|---|---|---|---|
| No | No | No | No | Default A |
| Yes | No | No | No | pusch-TimeDomainAllocationList provided in pusch-ConfigCommon |
| No/Yes | Yes | No | No | pusch-TimeDomainAllocationList provided in pusch-Config |
| No/Yes | No/Yes | Yes | - | pusch-TimeDomainAllocationListDCI-0-1 provided in pusch-Config |
| No/Yes | No/Yes | - | - | pusch-TimeDomainAllocationList-ForMultiPUSCH or pusch-TimeDomainAllocationList-ForMultiPUSCH-r17 provided in pusch-Config |

Figure 22

| pusch-ConfigCommon includes pusch-TimeDomainAllocationList | pusch-Config includes pusch-TimeDomainAllocationList | pusch-Config includes pusch-TimeDomainAllocationListDCI-0-2 | PUSCH time domain resource allocation to apply |
|---|---|---|---|
| No | No | No | Default A |
| Yes | No | No | pusch-TimeDomainAllocationList provided in pusch-ConfigCommon |
| No/Yes | Yes | No | pusch-TimeDomainAllocationList provided in pusch-Config |
| No/Yes | No/Yes | Yes | pusch-TimeDomainAllocationListDCI-0-2 provided in pusch-Config |

Figure 23

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j+1 | 0 | 14 |
| 9 | Type A | j+1 | 0 | 12 |
| 10 | Type A | j+1 | 0 | 10 |
| 11 | Type A | j+2 | 0 | 14 |
| 12 | Type A | j+2 | 0 | 12 |
| 13 | Type A | j+2 | 0 | 10 |
| 14 | Type B | j | 8 | 6 |
| 15 | Type A | j+3 | 0 | 14 |
| 16 | Type A | j+3 | 0 | 10 |

Figure 24

| $rv_{id}$ indicated by the DCI scheduling the PUSCH | $rv_{id}$ to be applied to $n^{th}$ transmission occasion (repetition Type A) or TB processing over multiple slots) or $n^{th}$ actual repetition (repetition Type B) | | | |
|---|---|---|---|---|
| | $((n-(n \bmod N))/N) \bmod 4 = 0$ | $((n-(n \bmod N))/N) \bmod 4 = 1$ | $((n-(n \bmod N))/N) \bmod 4 = 2$ | $((n-(n \bmod N))/N) \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 25

USER EQUIPMENT, BASE STATION AND METHOD

TECHNICAL FIELD

The present invention relates to a user equipment, a base station and a method.

BACKGROUND

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2A and FIG. 2B are examples showing the relationship between subcarrier-spacing configuration u, the number of OFDM symbols per slot $N^{slot}_{symb}$, and the CP configuration according to an aspect of the present embodiment;

FIG. 13 is an example of the bit-selection procedure according to an aspect of the present embodiment;

FIG. 21 is an example of an applicable PUSCH time domain resource allocation for common search space and DCI format 0_0 in UE specific search space;

FIG. 22 is an example of an applicable PUSCH time domain resource allocation for DCI format 0_1 in UE specific search space scrambled with C-RNTI, MCS-C-RNTI, CS-RNTI or SP-CSI-RNTI;

FIG. 23 is an example of an applicable PUSCH time domain resource allocation for DCI format 0_2 in UE specific search space scrambled with C-RNTI, MCS-C-RNTI, CS-RNTI or SP-CSI-RNTI;

FIG. 24 is an example of a default PUSCH time domain resource allocation A for normal CP; and FIG. 25 is an example of a redundancy version for PUSCH transmission.

DETAILED DESCRIPTION

Figure 1:
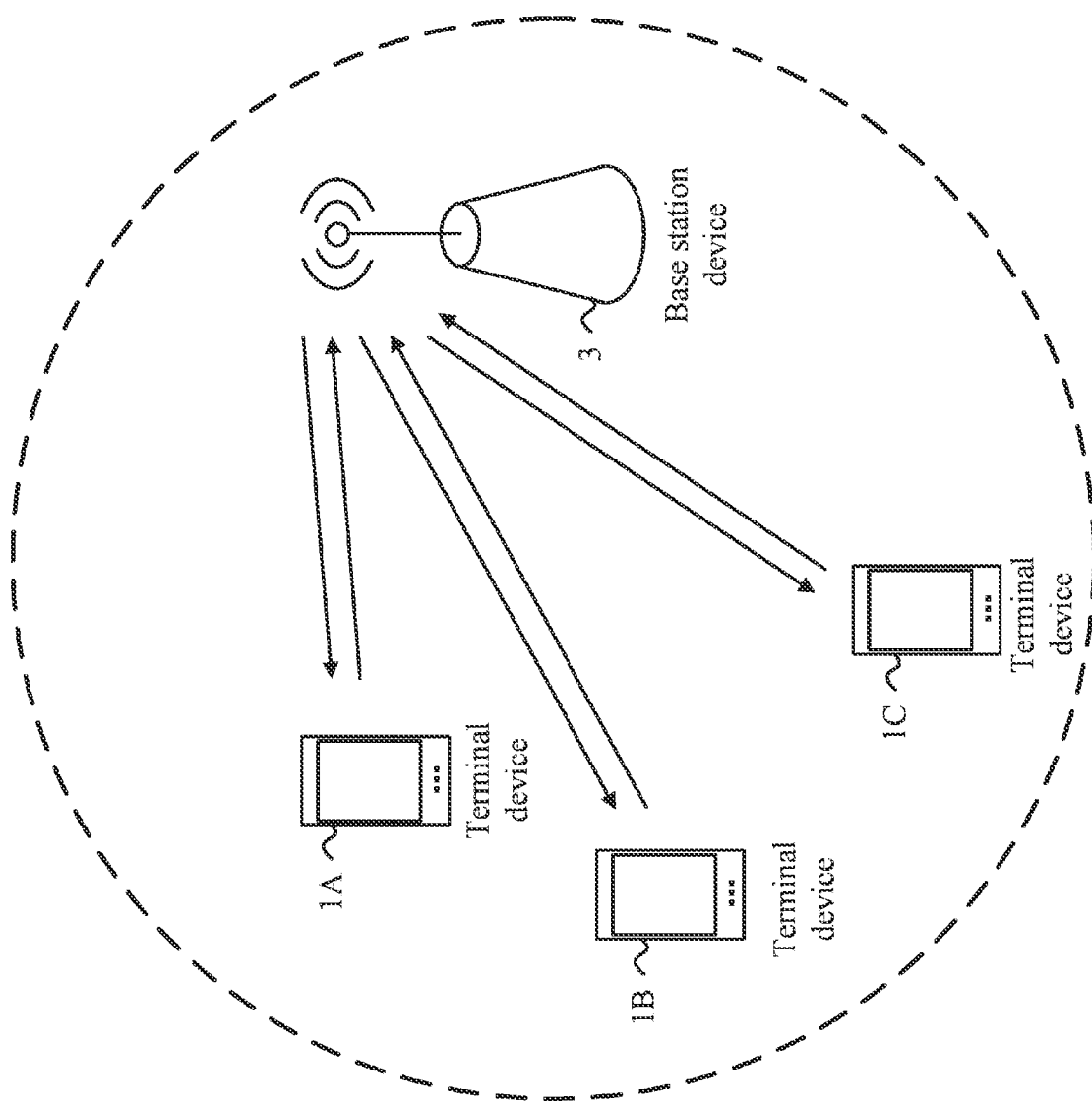
FIG. 1 is a conceptual diagram of a wireless communication system according to an aspect of the present embodiment.

A user equipment (UE) is described. The UE may comprise high-layer processing circuitry configured to acquire at least a first RRC parameter for indicating whether or not a transform precoder is enabled and a second RRC parameter for indicating whether or not a transform precoding indicator field is included in a DCI format, reception circuitry configured to receive the DCI format for scheduling of a PUSCH, and transmission circuitry configured to transmit the PUSCH scheduled by the DCI format, wherein in a case that the first RRC parameter indicates disabled and the second RRC parameter indicates that the transform precoding indicator field is included in the DCI format, the transmission circuitry is configured to apply a transform precoding for a transmission of the PUSCH, based on a value of the transform precoding indicator field in the DCI format.

A base station is described. The base station may comprise higher-layer processing circuitry configured to provide at least a first RRC parameter for indicating whether or not a transform precoder is enabled and a second RRC parameter for indicating whether or not a transform precoding indicator field is included in a DCI format, transmission circuitry configured to transmit the DCI format for scheduling of a PUSCH, and reception circuitry configured to receive the PUSCH scheduled by the DCI format, wherein in a case that the first RRC parameter indicates disabled and the second RRC parameter indicates that the transform precoding indicator field is included in the DCI format, the transmission circuitry is configured to transmit the DCI format including the transform precoding indicator field and the reception circuitry is configured to receive the PUSCH with a transform precoding applied based on a value of the transform precoding indicator field in the DCI format.

A method for a user equipment (UE) is described. The method may comprise acquiring at least a first RRC parameter for indicating whether or not a transform precoder is enabled and a second RRC parameter for indicating whether or not a transform precoding indicator field is included in a DCI format, receiving the DCI format for scheduling of a PUSCH, and transmitting the PUSCH scheduled by the DCI format, wherein applying a transform precoding for a transmission of the PUSCH, based on a value of the transform precoding indicator field in the DCI format, in a case that the first RRC parameter indicates disabled and the second RRC parameter indicates that the transform precoding indicator field is included in the DCI format.

'The available slot-based counting (PUSCH repetition counting) is configured' may be referred to as 'the slot-based counting (PUSCH repetition counting) set to enabled is configured' or 'the slot-based counting (PUSCH repetition counting) is enabled' or 'an RRC parameter AvailableSlot-Counting is enabled'.

'The available slot-based counting (PUSCH repetition counting) is not configured' may be referred to as 'the slot-based counting (PUSCH repetition counting) set to disabled is configured' or 'the slot-based counting (PUSCH repetition counting) is disabled' or 'an RRC parameter for indicating the available slot-based counting (PUSCH repetition counting) is not configured' or 'an RRC parameter AvailableSlotCounting is disabled'.

floor (CX) may be a floor function for real number CX. For example, floor (CX) may be a function that provides the largest integer within a range that does not exceed the real number CX. ceil (DX) may be a ceiling function to a real number DX. For example, ceil (DX) may be a function that provides the smallest integer within the range not less than the real number DX. mod (EX, FX) may be a function that provides the remainder obtained by dividing EX by FX. mod (EX, FX) may be a function that provides a value which corresponds to the remainder of dividing EX by FX. It is exp (GX)=e^GX. Here, e is Napier number. (HX)^(IX) indicates IX to the power of HX.

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

Either DFT-s-OFDM or CP-OFDM may be given based whether or not transform precoder (or transform precoding) is enabled. DFT-s-OFDM may be given if the transform precoder (or transform precoding) is enabled. CP-OFDM may be given if the transform precoder (or transform precoding) is disabled. E.g. either enabled transform precoder or disabled transform precoder for PUSCH may be indicated based on RRC parameters transformPrecoder in PUSCH-Config or ConfiguredGrantConfig and/or msg3-transformPrecoder in RACH-ConfigCommon.

The RRC parameter transformPrecoder indicates the UE specific selection of the transform precoder for a PUSCH. If the transformPrecoder is absent/not configured, the UE applies the value of the msg3-transformPrecoder to the transform precoder for the PUSCH.

The msg3-transformPrecoder indicates that the UE enables the transform precoder for Msg3 transmission. If the msg3-transformPrecoder is provided/configured, the UE enables the transform precoder for the Msg3 transmission. If the msg3-transformPrecoder is absent/not configured/not provided, the UE disables the transform precoder for Msg3 transmission.

The OFDM symbol may be a designation including a CP added to the OFDM symbol. That is, an OFDM symbol may be configured to include the OFDM symbol and a CP added to the OFDM symbol.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

For example, one resource grid may be provided for one component carrier. For example, one resource grid may be provided for one component carrier and a subcarrier-spacing configuration u. A subcarrier-spacing configuration u is also referred to as numerology. A resource grid includes $N^{size,u}_{grid,x} N^{RB}_{sc}$ subcarriers. The resource grid starts from a common resource block with index $N^{start, u}_{grid}$. The common resource block with the index $N^{start, u}_{grid}$ is also referred to as a reference point of the resource grid. The resource grid includes $N^{subframe, u}_{symb}$ OFDM symbols. The subscript x indicates the transmission direction and indicates either downlink or uplink. One resource grid is provided for an antenna port p, a subcarrier-spacing configuration u, and a transmission direction x.

Resource grid is also referred to as carrier.

$N^{size, u}_{grid,x}$ and $N^{start, u}_{grid}$ are given based at least on an RRC parameter (e.g. referred to as RRC parameter Carrier-Bandwidth). The RRC parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIG. 2A and FIG. 2B are examples showing the relationship between subcarrier-spacing configuration u, the number of OFDM symbols per slot $N^{slot}_{symb}$ and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame,\ u}_{slot}=40$, $N^{subframe,\ u}_{slot}=4$. Further, in FIG. 2B, for example, when the subcarrier-spacing configuration u is set to 2 and the CP configuration is set to an extended CP (extended cyclic prefix), $N^{slot}_{symb}=12$, $N^{frame,\ u}_{slot}=40$, $N^{subframe,\ u}_{slot}=4$.

In the wireless communication system according to an aspect of the present embodiment, a time unit $T_c$ may be used to represent the length of the time domain. The time unit $T_c$ is $T_c=1/(df_{max}*N_f)$. It is $df_{max}=480$ kHz. It is $N_f=4096$. The constant k is $k=df_{max}*N_f/(df_{ref}N_{f,\ ref})=64$. $df_{ref}$ is 15 kHz. $N_{f,\ ref}$ is 2048.

Transmission of signals in the downlink and/or transmission of signals in the uplink may be organized into radio frames (system frames, frames) of length $T_f$. It is $T_f=(df_{max}N_f/100)*T_s=10$ ms. One radio frame is configured to include ten subframes. The subframe length is $T_{sf}=(df_{max}N_f/1000)$ $T_s=1$ ms. The number of OFDM symbols per subframe is $N^{subframe,\ u}_{symb}=N^{slot}_{symb}N^{subframe,\ u}_{slot}$.

For a subcarrier-spacing configuration u, the number of slots included in a subframe and indexes may be given. For example, slot index $n^u_s$ may be given in ascending order with an integer value ranging from 0 to $N^{subframe,u}_{slot}-1$ in a subframe. For subcarrier-spacing configuration u, the number of slots included in a radio frame and indexes of slots included in the radio frame may be given. Also, the slot index $n^u_{s,f}$ may be given in ascending order with an integer value ranging from 0 to $N^{frame,u}_{slot}-1$ in the radio frame. Consecutive $N^{slot}_{symb}$ OFDM symbols may be included in one slot. It is $N^{slot}_{symb}=14$.

Figure 3:
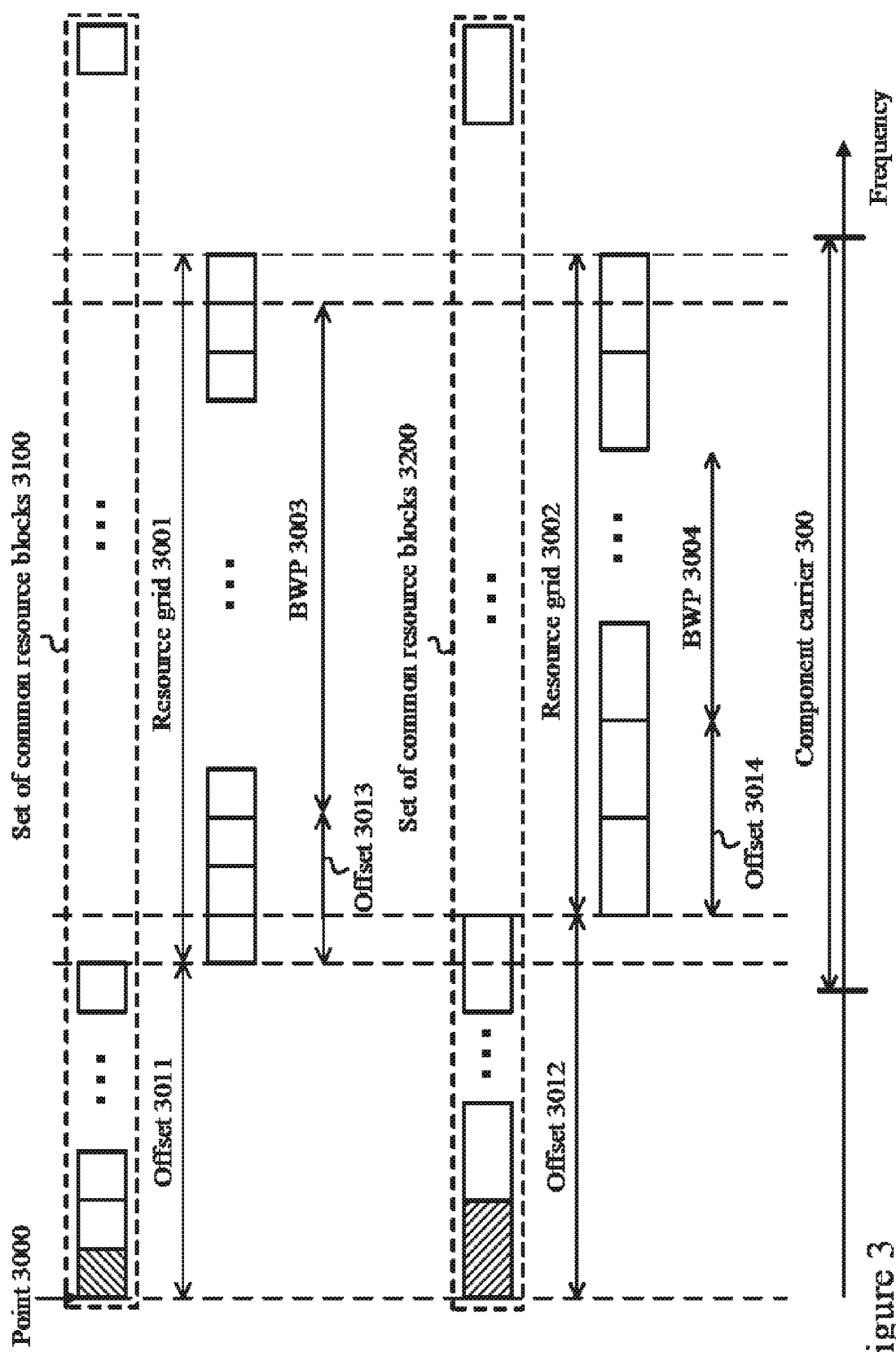
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration u=u₁ in the component carrier 300 and a configuration example of a resource grid of subcarrier-spacing configuration u=u₂ in a component carrier. One or more subcarrier-spacing configuration may be set for a component carrier. Although it is assumed in FIG. 3 that u₁=u₂-1, various aspects of this embodiment are not limited to the condition of u₁=u₂-1.

The component carrier 300 is a band having a predetermined width in the frequency domain.

Point 3000 is an identifier for identifying a subcarrier. Point 3000 is also referred to as point A. The common resource block (CRB) set 3100 is a set of common resource blocks for the subcarrier-spacing configuration u₁.

Among the common resource block-set 3100, the common resource block including the point 3000 (the block indicated by the upper right diagonal line in FIG. 3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by the number of common resource blocks which is relative to the subcarrier-spacing configuration u₁. The resource grid 3001 includes $N^{size,u}_{grid1,x}$ common resource blocks starting from the reference point of the resource grid 3001.

The offset 3013 is an offset from the reference point of the resource grid 3001 to the reference point ($N^{start,u}_{BWP,i1}$) of the BWP (BandWidth Part) 3003 of the index i1.

Common resource block-set 3200 is a set of common resource blocks with respect to subcarrier-spacing configuration u₂.

A common resource block including the point 3000 (a block indicated by a upper left diagonal line in FIG. 3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by the number of common resource blocks for subcarrier-spacing configuration u=u₂. The resource grid 3002 includes $N^{size,u}_{grid2,x}$ common resource blocks starting from the reference point of the resource grid 3002.

The offset 3014 is an offset from the reference point of the resource grid 3002 to the reference point ($N^{start,u}_{BWP,i2}$) of the BWP 3004 with index i₂.

Figure 4:
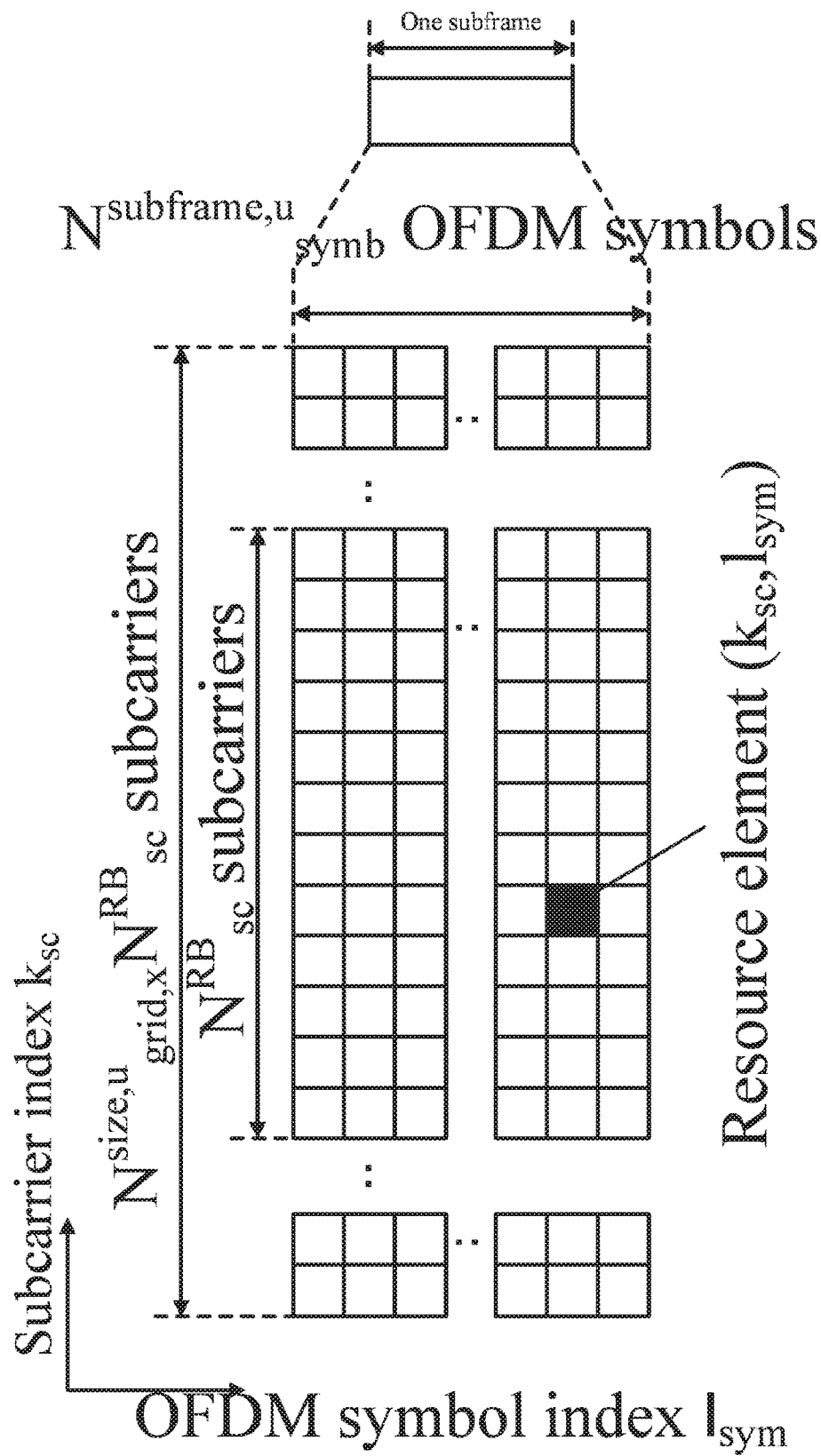
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size,u}_{grid1,x}N^{RB}_{sc}$ subcarriers, and includes $N^{subframes,u}_{symb}$ OFDM symbols. A resource specified by the subcarrier index $k_{sc}$ and the OFDM symbol index sym in a resource grid is also referred to as a resource element (RE).

A resource block (RB) includes $N^{RB}_{sc}$ consecutive subcarriers. A resource block is a generic name of a common resource block, a physical resource block (PRB), and a virtual resource block (VRB). It is $N^{RB}_{sc}=12$.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=\text{ceil}\ (k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,\ u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
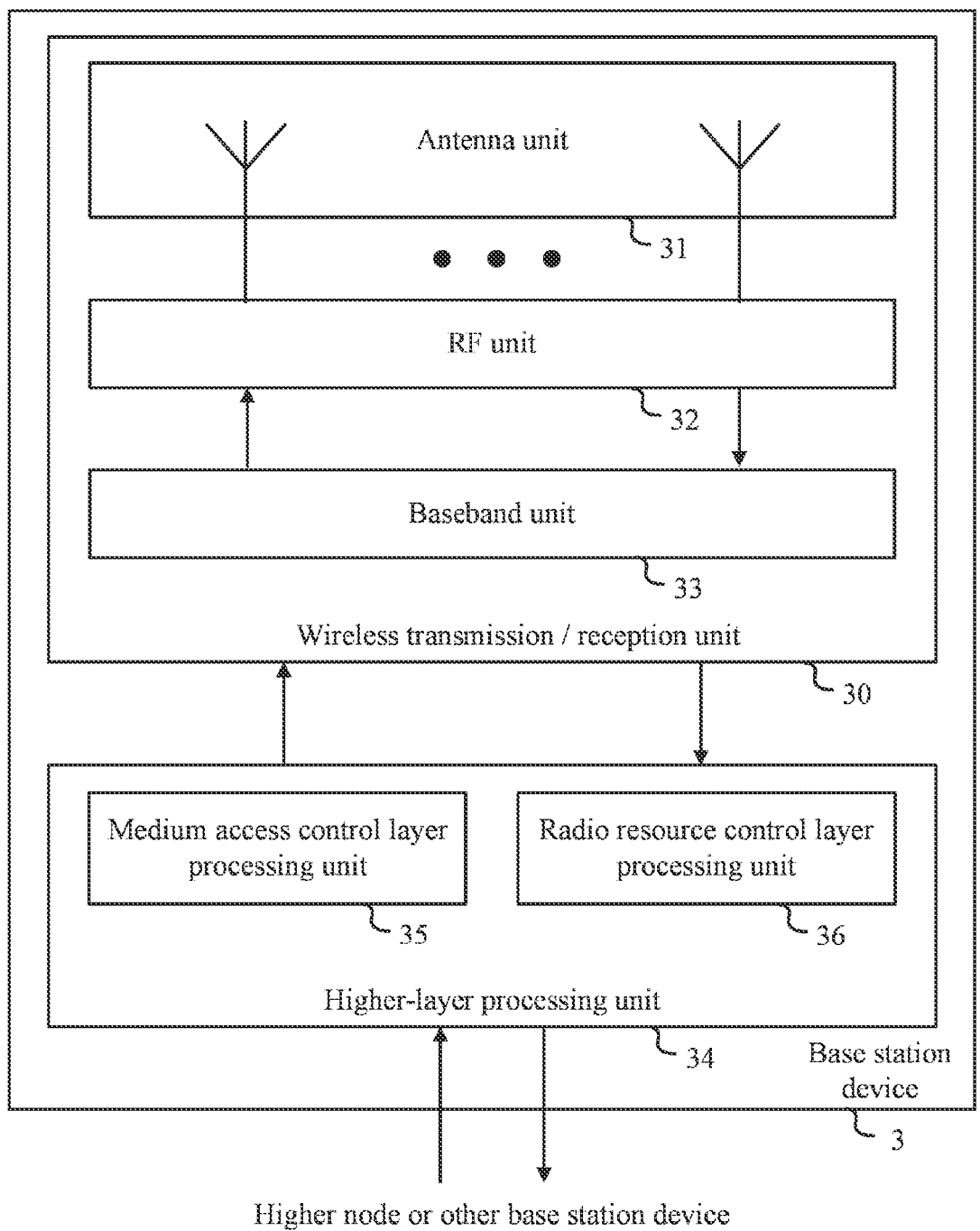
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part or all of the wireless transmission/reception unit (physical layer processing unit) 30 and the higher-layer processing unit 34. The wireless transmission/reception unit 30 includes at least a part or all of the antenna unit 31, the RF unit 32 (Radio Frequency unit 32), and the baseband unit 33. The higher-layer processing unit 34 includes at least a part or all of the medium access control layer processing unit 35 and the radio resource control (RRC) layer processing unit 36.

The wireless transmission/reception unit 30 includes at least a part of or all of a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts OFDM symbols in the physical signal to a baseband signal by conversion to a time-continuous signal. The wireless transmission/reception unit 30 (or the wireless transmission unit 30a) transmits the baseband signal (or the physical signal) to the terminal device 1 via radio frequency. The wireless transmission/reception unit 30 (or the wireless transmission unit 30a) may arrange the baseband signal (or the physical signal) on a component carrier and transmit the baseband signal (or the physical signal) to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the higher-layer processing unit 34. The wireless transmission/reception unit 30 (or the wireless reception unit 30b) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency and transmits it via the antenna unit 31. The RF unit 32 may have a function of controlling transmission power. The RF unit 32 is also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
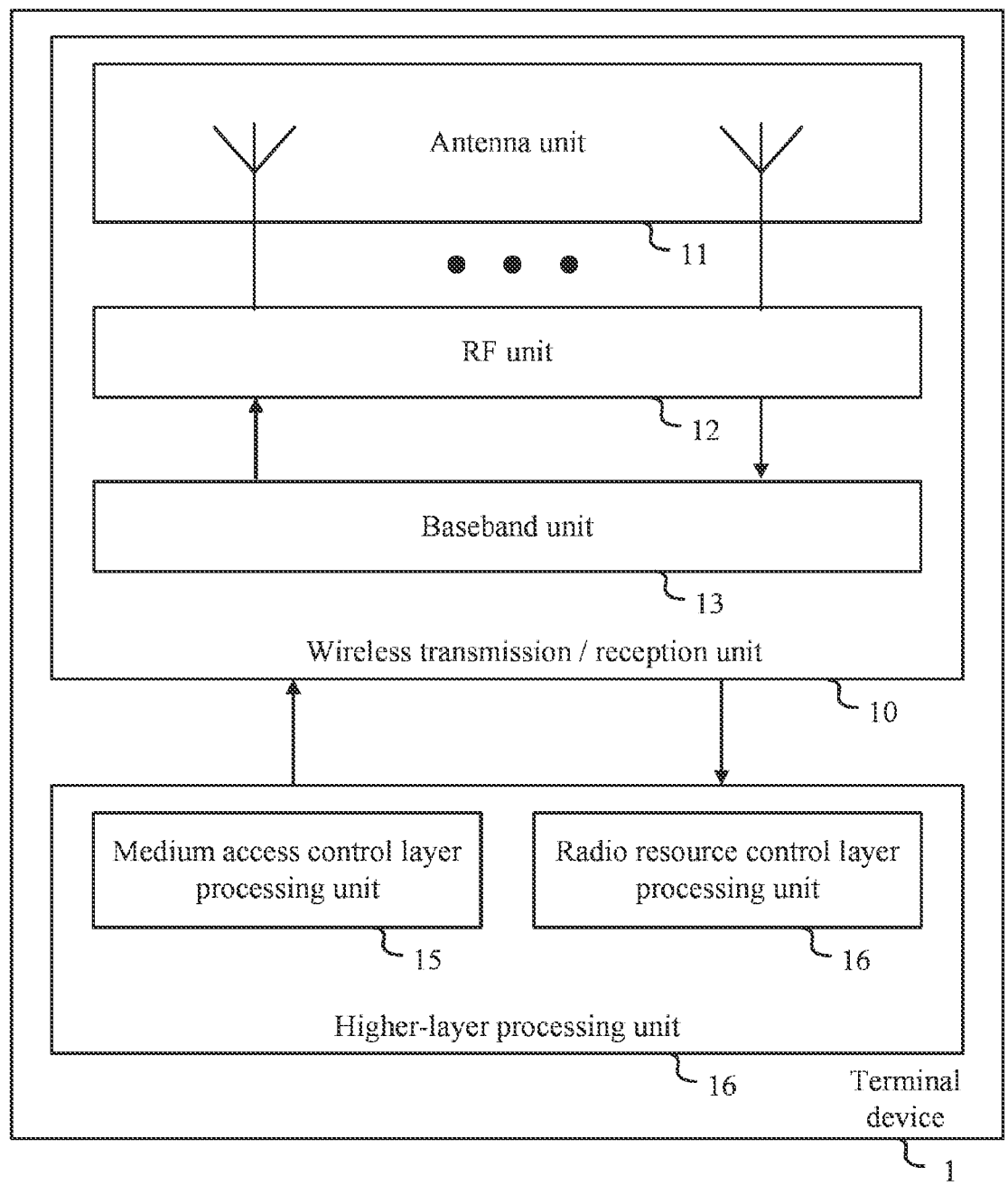
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part or all of the wireless transmission/reception unit (physical layer processing unit) 10 and the higher-layer processing unit 14. The wireless transmission/reception unit 10 includes at least a part or all of the antenna unit 11, the RF unit 12, and the baseband unit 13. The higher-layer processing unit 14 includes at least a part or all of the medium access control layer processing unit 15 and the radio resource control layer processing unit 16.

The wireless transmission/reception unit 10 includes at least a part of or all of a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10b may be the same or different.

The higher-layer processing unit 14 provides uplink data (a transport block) to the wireless transmission/reception unit 10 (or the wireless transmission unit 10a). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10a) performs processing such as encoding and modulation. The wireless transmission/reception unit 10 (or the wireless transmission unit 10a) generates a physical signal by encoding and modulating the uplink data. The wireless transmission/reception unit 10 (or the wireless transmission unit 10a) converts OFDM symbols in the physical signal to a baseband signal by conversion to a time-continuous signal. The wireless transmission/reception unit 10 (or the wireless transmission unit 10a) transmits the baseband signal (or the physical signal) to the base station device 3 via radio frequency. The wireless transmission/reception unit 10 (or the wireless transmission unit 10a) may arrange the baseband signal (or the physical signal) on a BWP (active uplink BWP) and transmit the baseband signal (or the physical signal) to the base station device 3.

The wireless transmission/reception unit 10 (or the wireless reception unit 10b) performs processing such as demodulation and decoding. The wireless transmission/reception unit 10 (or the wireless reception unit 10b) may receive a physical signal in a BWP (active downlink BWP) of a serving cell. The wireless transmission/reception unit 10 (or the wireless reception unit 10b) separates, demodulates and decodes the received physical signal, and provides the decoded information to the higher-layer processing unit 14. The wireless transmission/reception unit 10 (or the wireless reception unit 10b) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency, and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical channels, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI), scheduling request (SR), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part or all of a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

A PRACH may be used to transmit a random-access preamble. The PRACH may be used to convey a random-access preamble. The sequence $x_{u,v}(n)$ of the PRACH is defined by $x_{u,v}(n) = x_u(\mod(n+C_v, L_{RA}))$. The $x_u$ may be a ZC sequence (Zadoff-Chu sequence). The $x_u$ may be defined by $x_u = \exp(-j p u i(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 may transmit the PRACH. The base station device 3 may receive the PRACH.

For a given PRACH opportunity, 64 random-access preambles are defined. The random-access preamble is specified (determined, given) at least based on the cyclic shift $C_v$ of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part or all of fields 1A to 1E. The 1A is a DCI format identification field (Identifier field for DCI formats). The 1B is a frequency domain resource assignment field (FDRA field, FDRA information field). The 1C is a time domain resource assignment field (TDRA field, TDRA information field). The 1D is a frequency-hopping flag field. The 1E is an MCS field (Modulation-and-Coding-Scheme field).

Frequency domain resource assignment field may be referred to as FDRA field or FDRA information field.

Time domain resource assignment field may be referred to as TDRA field or TDRA information field.

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part or all of a target coding rate for the PUSCH. The MCS field included in the DCI format 0_0 may be at least used to indicate a modulation scheme for a PUSCH scheduled by the DCI format 0_0 and/or a part or all of a target coding rate for the PUSCH. A size of a transport block (TBS: Transport Block Size) of a PUSCH may be given based at least on a target coding rate and a part or all of a modulation scheme for the PUSCH. The modulation scheme may include at least one of modulation order, target code rate and spectral efficiency.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 0_0 is arranged.

The DCI format 0_1 is at least used for scheduling of a PUSCH for a cell (or arranged on a cell). The DCI format 0_1 includes at least a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part or all of a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When the number of uplink BWPs configured in the terminal device 1 in an uplink component carrier is two or more, the number of bits for the BWP field included in the DCI format 0_1 used for scheduling a PUSCH arranged on the uplink component carrier may be one or more. When the number of uplink BWPs configured in the terminal device 1 in a uplink component carrier is one, the number of bits for the BWP field included in the DCI format 0_1 used for scheduling a PUSCH arranged on the uplink component carrier may be zero.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When the number of uplink component carriers (or the number of serving cells) configured in the terminal device 1 in a serving cell group is two or more (when uplink carrier aggregation is operated in a serving cell group), or when cross-carrier scheduling is configured for the serving cell group, the number of bits for the carrier indicator field included in the DCI format 0_1 used for scheduling a PUSCH arranged on the serving cell group may be one or more (e.g., 3). When the number of uplink component carriers (or the number of serving cells) configured in the terminal device 1 in a serving cell group is one (or when uplink carrier aggregation is not operated in a serving cell group), or when the cross-carrier scheduling is not configured for the serving cell group, the number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part or all of a target coding rate for the PDSCH. The MCS field included in the DCI format 1_0 may be at least used to indicate a modulation scheme for a PDSCH scheduled by the DCI format 1_0 and/or a part or all of a target coding rate for the PDSCH. A size of a transport block (TBS: Transport Block Size) of a PDSCH may be given based at least on a target coding rate and a part or all of a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 11 may be at least used to indicate the assignment of time resources for a PDSCH scheduled by the DCI format 1_1.

The MCS field included in the DCI format 1_1 may be at least used to indicate a modulation scheme for a PDSCH and/or a part or all of a target coding rate for the PDSCH. The MCS field included in the DCI format 1_1 may be at least used to indicate a modulation scheme for a PDSCH scheduled by the DCI format 1_1 and/or a part or all of a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When the number of downlink BWPs configured in the terminal device 1 in a downlink component carrier is two or more, the number of bits for the BWP field included in the DCI format 1_1 used for scheduling a PDSCH arranged on the downlink component carrier may be one or more. When the number of downlink BWPs configured in the terminal device 1 in a downlink component carrier is one, the number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When the number of downlink component carriers (or the number of serving cells) configured in the terminal device 1 in a serving cell group is two or more (when downlink carrier aggregation is operated in a serving cell group), or when cross-carrier scheduling is configured for the serving cell group, the number of bits for the carrier indicator field included in the DCI format 1_1 used for scheduling a PDSCH arranged on the serving cell group may be one or more (e.g., 3). When the number of downlink component carriers (or the number of serving cells) configured in the terminal device 1 in a serving cell group is one (or when downlink carrier aggregation is not operated in a serving cell group), or when the cross-carrier scheduling is not configured for the serving cell group, the number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
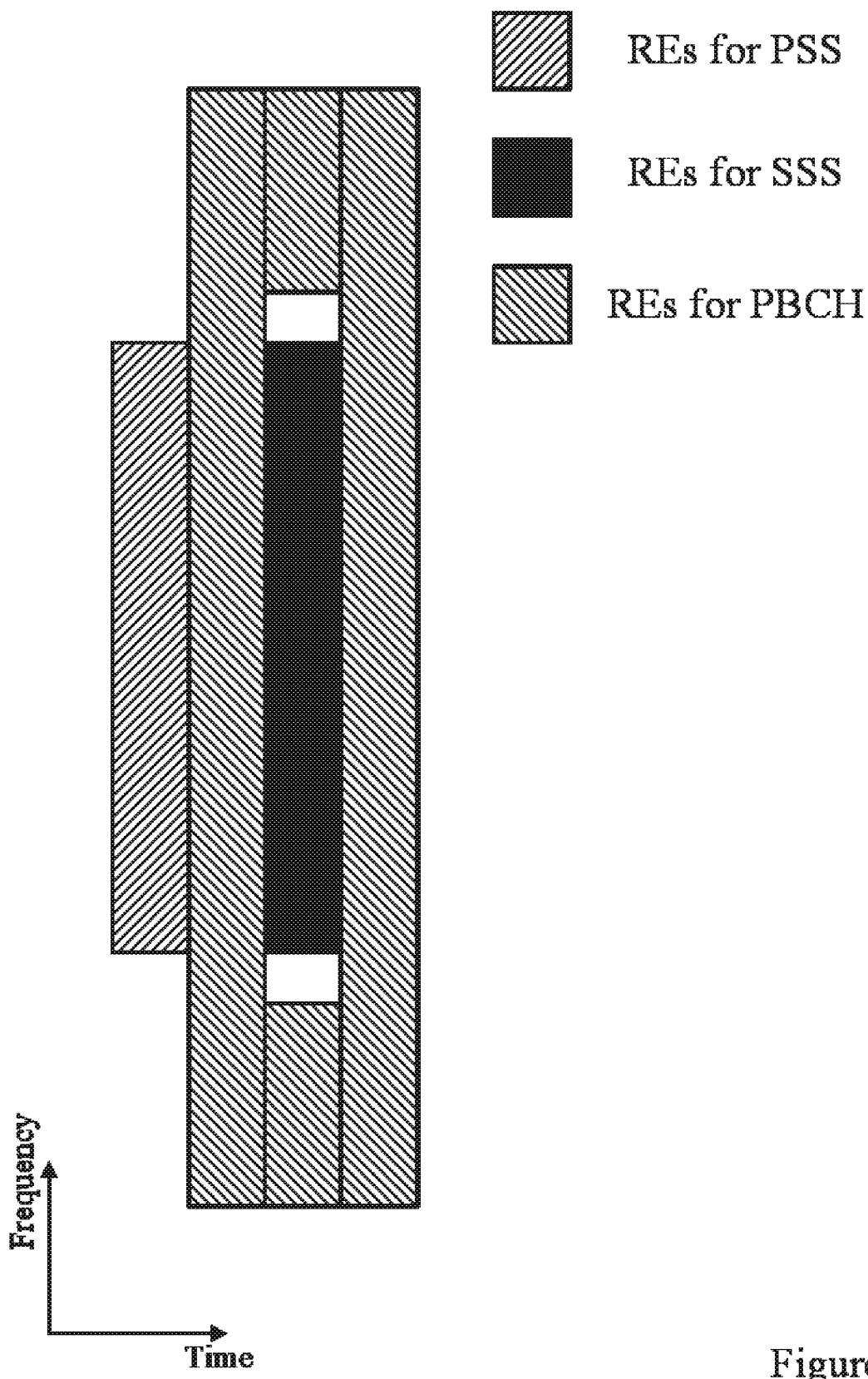
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $l_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements, higher layer parameters). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE. A higher-layer parameter may be referred to as an RRC parameter or an RRC configuration if the higher-layer parameter is the parameter included in the RRC message.

A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device may indicate change of cell-specific parameters by reconfiguration with random-access. The UE may change cell-specific parameters before triggering random-access. The base station device may indicate change of UE-specific parameters by reconfiguration with or without random-access. The UE may change UE-specific parameters before or after random-access.

The procedure performed by the terminal device 1 includes at least a part or all of the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID.

An SS/PBCH block candidate indicates a resource for which transmission of the SS/PBCH block may exist. An SS/PBCH block may be transmitted at a resource indicated as the SS/PBCH block candidate. The base station device 3 may transmit an SS/PBCH block at an SS/PBCH block candidate. The terminal device 1 may receive (detect) the SS/PBCH block at the SS/PBCH block candidate.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks of one or more indexes at a predetermined cycle. The terminal device 1 may detect an SS/PBCH block of at least one of the SS/PBCH blocks of the one or more indexes. The terminal device 1 may attempt to decode the PBCH included in the SS/PBCH block.

The random-access is a procedure including at least a part or all of message 1, message 2, message 3, and message 4.

The message 1 is a procedure in which the terminal device 1 transmits a PRACH. The terminal device 1 transmits the PRACH in one PRACH occasion selected from among one or more PRACH occasions based on at least the index of the SS/PBCH block candidate detected based on the cell search.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 (Msg 3) is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by the number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part or all of 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part or all of PDCCH monitoring periodicity, PDCCH monitoring pattern within a slot, and PDCCH monitoring offset.

Figure 8:
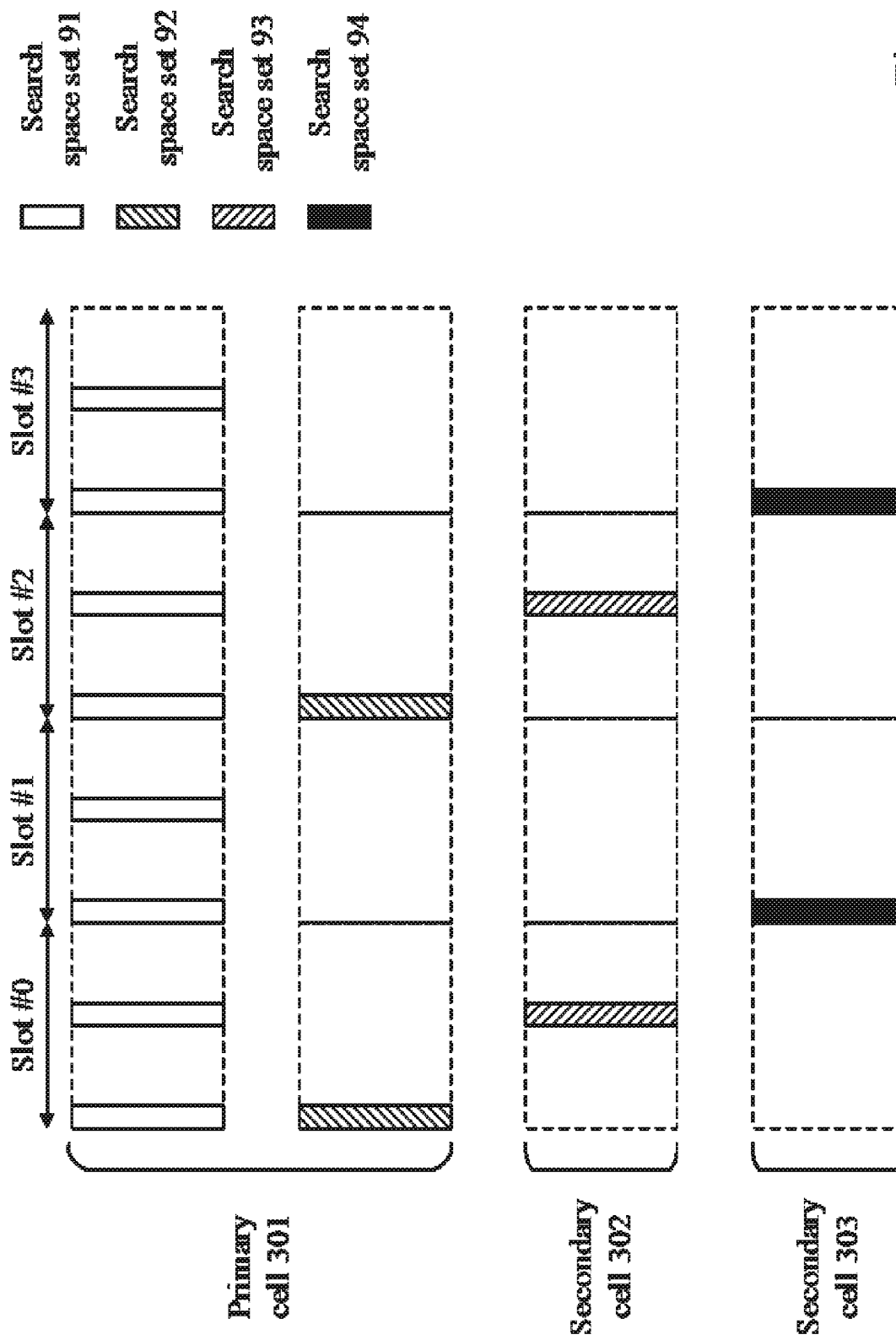
FIG. 8 is a diagram showing an example of the monitoring occasion of the search-space-set according to an aspect of the present embodiment.

FIG. 8 is a diagram showing an example of the monitoring occasion of the search-space-set according to an aspect of the present embodiment. In FIG. 8, the search-space-set 91 and the search-space-set 92 are sets in the primary cell 301, the search-space-set 93 is a set in the secondary cell 302, and the search-space-set 94 is a set in the secondary cell 303.

In FIG. 8, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 8, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 8, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 8, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 8, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

PUSCH transmission(s) can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to those procedure(s) after the reception of higher layer parameter configuredGrantConfig not including rrc-ConfiguredUplinkGrant. If configuredGrantConfig-ToAddModList is configured, more than one configured grant configuration of configured grant Type 1 and/or configured grant Type 2 may be active at the same time on an active BWP of a serving cell.

More details of resource allocation in time domain for PUSCH scheduled by a DCI format is described. When the UE (terminal device 1) is scheduled to transmit a transport block and no CSI report, or the UE is scheduled to transmit a transport block and a CSI report(s) on PUSCH by a DCI, the 'Time domain resource assignment' field value m of the DCI may provide a row index m+1 to an allocated table. The determination of the used resource allocation table may be pre-defined and/or defined in RRC configuration. The indexed row of the resource allocation table may define the slot offset K2, the start and length indicator SLIV, or directly the start symbol S and the allocation length L, the PUSCH mapping type, and the number of repetitions (if RRC parameter numberOfRepetitions is present in the resource allocation table) to be applied in the PUSCH transmission. It is noted that RRC parameter is a kind of high-layer parameter.

For PUSCH scheduled by DCI format 0_1, if RRC parameter pusch-RepTypeIndicatorDCI-0-1 is set to 'pusch-RepTypeB', the UE may apply PUSCH repetition Type B procedure when determining the time domain resource allocation. For PUSCH scheduled by DCI format 0_2, if RRC parameter pusch-RepTypeIndicatorDCI-0-2 is set to 'pusch-RepTypeB', the UE may apply PUSCH repetition Type B procedure when determining the time domain resource allocation. Otherwise, the UE may apply PUSCH repetition Type A procedure when determining the time domain resource allocation for PUSCH scheduled by PDCCH.

For PUSCH repetition Type A, the starting symbol S relative to the start of the slot, and the number of consecutive symbols L counting from the symbol S allocated for the PUSCH may be determined from the start and length indicator SLIV of the indexed row: if $(L-1) \leq 7$ then $SLIV=14(L-1)+S$, otherwise $SLIV=14(14-L+1+(14-1-S)$, where $0 \leq L \leq 14-S$.

For PUSCH repetition Type A, when transmitting PUSCH scheduled by DCI format 0_1 or 02 in PDCCH with CRC scrambled with C-RNTI, MCS-C-RNTI, or CS-RNTI with NDI=1, the number of repetitions K may be determined as: if RRC parameter numberOfRepetitions is present in the resource allocation table, the number of repetitions K may be equal to numberOfRepetitions; elseif the UE is configured with RRC parameter pusch-AggregationFactor, the number of repetitions K may be equal to pusch-AggregationFactor; otherwise K=1.

If the UE is not capable of a certain coverage enhancement feature(s) (e.g. available slot based PUSCH repetition counting) or if the UE is not provided with a certain coverage enhancement configuration(s) (e.g. available slot based PUSCH repetition counting), the following may be applied. For PUSCH repetition Type A, in case K>1, the same symbol allocation may be applied across the K consecutive slots and the PUSCH may be limited to a single transmission layer. The UE may repeat the TB across the K consecutive slots applying the same symbol allocation in each slot. The redundancy version to be applied on the nth transmission occasion of the TB, where n=0, 1, . . . K−1, may be determined as describe below. For PUSCH repetition Type A, a PUSCH transmission in a slot of a multi-slot PUSCH transmission may be omitted according to the conditions at least and/or at most in, PUSCH-priority based procedure, slot configuration based procedure, slot format based procedure and cancellation indication based procedure. For example, a slot may be determined as available if the slot is available according to all the conditions defined in those procedures, and/or the slot may be determined as not available if the slot is not available according to at least one of the conditions defined in those procedures. K may be an integer.

If the UE is capable of a certain coverage enhancement feature(s) and/or if the UE is provided with a certain coverage enhancement configuration(s), the following may be applied. For PUSCH repetition Type A, in case K>1, the same symbol allocation may be applied across the K available slots (i.e. the first K slots which are available for the PUSCH transmission) and the PUSCH may be limited to a single transmission layer. The UE may repeat the TB across the K consecutive slots applying the same symbol allocation in each slot. The K available slots may be determined according to the conditions at least and/or at most in, PUSCH-priority based procedure, slot configuration based procedure, slot format based procedure and cancellation indication based procedure. For example, a slot may be determined as available if the slot is available according to all the conditions defined in those procedures, and/or the slot may be determined as not available if the slot is not available according to at least one of the conditions defined in those procedures.

If the UE is capable of a certain coverage enhancement feature(s) and/or if the UE is provided with a certain coverage enhancement configuration(s), the following may be applied. For PUSCH repetition Type A, in case K>1, the same symbol allocation may be applied across the K available slots (i.e. the first K slots which are available for the PUSCH transmission) and the PUSCH may be limited to a single transmission layer. The UE may repeat the TB across the K available slots applying the same symbol allocation in each slot. The K available slots may be determined according to the conditions at least and/or at most in first RRC parameters. The first RRC parameters may be one or more of tdd-UL-DL-ConfigurationCommon, tdd-UL-DL-ConfigurationDedicated, ssb-PositionsInBurst, numberOfRepetitions, BandCombination-UplinkTxSwitch, repK, repK-RV, pusch-AggregationFactor, nrofSlots, configuredGrantConfig, cg-nrofSlots, cg-nrofPUSCH-InSlot, timeDomainAllocation, numberOfInvalidSymbolsForDL-UL-Switching, invalidSymbolPattern, and periodicityAndPattern. For PUSCH repetition Type A, a PUSCH transmission in a slot of a multi-slot PUSCH transmission is omitted according to the conditions at least and/or at most in second RRC parameters. The second RRC parameters may be one or more of tdd-UL-DL-ConfigurationCommon, tdd-UL-DL-ConfigurationDedicated, ssb-PositionsInBurst, numberOfRepetitions, BandCombination-UplinkTxSwitch, repK, repK-RV, pusch-AggregationFactor, nrofSlots, configuredGrantConfig, cg-nrofSlots, cg-nrofPUSCH-InSlot, timeDomainAllocation, numberOfInvalidSymbolsForDL-UL-Switching, invalidSymbolPattern, and periodicityAndPattern.

The configuredGrantConfig may be referred to the ConfiguredGrantConfig.

The configuredGrantConfig may be referred to as the ConfiguredGrantConfig.

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission.

For Type 1 PUSCH transmissions with a configured grant, the following parameters are given in configuredGrantConfig unless mentioned otherwise, and For the determination of the PUSCH repetition type, if the higher layer parameter pusch-RepTypeIndicator in rrc-ConfiguredUplinkGrant is configured and set to 'pusch-RepTypeB', PUSCH repetition Type B is applied. Otherwise, PUSCH repetition Type A is applied.

The higher layer parameter pusch-RepTypeIndicator indicates whether UE follows the behavior for PUSCH repetition Type A or the behavior for PUSCH repetition Type B for each Type 1 configured grant configuration. The value pusch-RepTypeA enables the 'PUSCH repetition Type A' and the value pusch-RepTypeB enables the 'PUSCH repetition Type B'. The value pusch-RepTypeB is not configured simultaneously with cg-nrofPUSCH-InSlot-r16 and cg-nrofSlots-r16.

For PUSCH repetition Type A, the selection of the time domain resource allocation table follows the rules for DCI format 0_0 on UE specific search space.

For PUSCH repetition Type A, the selection of the time domain resource allocation table is as follows. If pusch-RepTypeIndicatorDCI-0-1 in pusch-Config is configured and set to 'pusch-RepTypeA', pusch-TimeDomainResourceAllocationListDCI-0-1 in pusch-Config is used. Otherwise, pusch-TimeDomainResourceAllocationListDCI-0-2 in pusch-Config is used. It is not expected that pusch-RepTypeIndicator in rrc-ConfiguredUplinkGrant is configured with 'pusch-RepTypeA' when none of pusch-RepTypeIndicatorDCI-0-1 and pusch-RepTypeIndicatorDCI-0-2 in pusch-Config is set to 'pusch-RepTypeA'.

For PUSCH repetition Type B, the selection of the time domain resource allocation table is as follows. If pusch-RepTypeIndicatorDCI-0-1 in pusch-Config is configured and set to 'pusch-RepTypeB', pusch-TimeDomainResourceAllocationListDCI-0-1 in pusch-Config is used. Otherwise, pusch-TimeDomainResourceAllocationListDCI-0-2 in pusch-Config is used. It is not expected that pusch-RepTypeIndicator in rrc-ConfiguredUplinkGrant is configured with 'pusch-RepTypeB' when none of pusch-RepTypeIndicatorDCI-0-1 and pusch-RepTypeIndicatorDCI-0-2 in pusch-Config is set to 'pusch-RepTypeB'.

More details of resource allocation in time domain for PUSCH with configured grant is described. For PUSCH transmissions with a Type 1 or Type 2 configured grant, the number of (nominal) repetitions K to be applied to the transmitted transport block may be provided by the indexed row in the time domain resource allocation table if numberOfRepetitions is present in the table; otherwise K may be provided by the higher layer configured parameters repK. The UE may not be allowed to transmit anything on the resources configured by RRC parameter configuredGrantConfig if the higher layers did not deliver a transport block to transmit on the resources allocated for uplink transmission without grant.

A set of allowed periodicities P are defined in RRC configuration. The RRC parameter cg-nrofSlots, may provide the number of consecutive slots allocated within a configured grant period. The RRC parameter cg-nrofPUSCH-InSlot may provide the number of consecutive PUSCH allocations within a slot, where the first PUSCH allocation may follow the RRC parameter timeDomainAllocation for Type 1 PUSCH transmission or the higher layer configuration according to MAC procedure, and UL grant received on the DCI for Type 2 PUSCH transmissions, and the remaining PUSCH allocations may have the same length and PUSCH mapping type, and may be appended following the previous allocations without any gaps. The same combination of start symbol and length and PUSCH mapping type may repeat over the consecutively allocated slots.

The UE may not be expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE may not transmit the PUSCH in the transmission occasion.

The procedures apply to PUSCH transmissions of PUSCH repetition Type A with a Type 1 or Type 2 configured grant. The RRC parameter repK-RV defines the redundancy version pattern to be applied to the repetitions. If cg-RetransmissionTimer is provided, the redundancy version for uplink transmission with a configured grant is determined by the UE. If the parameter repK-RV is not provided in the configuredGrantConfig and cg-RetransmissionTimer is not provided, the redundancy version for uplink transmissions with a configured grant may have to be set to 0. If the parameter repK-RV is provided in the configuredGrantConfig and cg-RetransmissionTimer is not provided, for the nth transmission occasion among K repetitions, n=1, 2, . . . , K, it is associated with $(\mod(n-1,4)+1)^{th}$ value in the configured RV sequence. If a configured grant configuration is configured with startingFromRV0 set to 'off', the initial transmission of a transport block may only start at the first transmission occasion of the K repetitions. Otherwise, the initial transmission of a transport block may start the first transmission occasion of the K repetitions if the configured RV sequence is {0,2,3,1}, any of the transmission occasions of the K repetitions that are associated with RV=0 if the configured RV sequence is {0,3,0,3}, and/or any of the transmission occasions of the K repetitions if the configured RV sequence is (0,0,0,0), except the last transmission occasion when K≥8.

If a configured grant configuration is not configured with startingFromRV0 set to 'off' and if available slot-based counting is configured, the initial transmission of a transport block may start at the first transmission occasion of the K repetitions.

If a configured grant configuration is not configured with startingFromRV0 set to 'off' and if available slot-based counting is not configured, the initial transmission of a transport block may start the first transmission occasion of the K repetitions if the configured RV sequence is {0,2,3,1}, any of the transmission occasions of the K repetitions that are associated with RV=0 if the configured RV sequence is {0,3,0,3}, and/or any of the transmission occasions of the K repetitions if the configured RV sequence is {0,0,0,0}, except the last transmission occasion when K>8.

If a configured grant configuration is not configured with startingFromRV0 set to 'off' and if available slot-based counting is configured, the initial transmission of a transport block may start the first transmission occasion of the K repetitions if the configured RV sequence is {0,2,3,1}, any of the transmission occasions of the K repetitions that are associated with RV=0 if the configured RV sequence is {0,3,0,3}, and/or any of the transmission occasions of the K repetitions if the configured RV sequence is (0,0,0,0), except the last transmission occasion when K≥8.

If a configured grant configuration is not configured with startingFromRV0 set to 'off' and if available slot-based counting is not configured, the initial transmission of a transport block may start the first transmission occasion of the K repetitions if the configured RV sequence is {0,2,3,1}, any of the transmission occasions of the K repetitions that are associated with RV=0 assuming the transmission occasions of the K repetitions are determined based on consecutive physical slots if the configured RV sequence is {0,3,0,3}, and/or any of the transmission occasions of the K repetitions if the configured RV sequence is {0,0,0,0}, except the last transmission occasion when K≥8.

For any RV sequence, the repetitions may have to be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the UE may have to terminate the repetition of a transport block in a PUSCH transmission if the UE receives a DCI format 0_1 with DFI flag provided and set to '1', and if in this DCI the UE detects ACK for the HARQ process corresponding to that transport block.

The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For unpaired spectrum, when an RRC parameter AvailableSlotCounting is enabled, the UE determines N*K slots for a PUSCH transmission of a PUSCH repetition Type A, based on RRC parameters tdd-UL-DL-ConfigurationCommon, tdd-UL-DL-ConfigurationDedicated and ssb-PositionsInBurst. A slot is not counted in the number of N*K slots for PUSCH transmission of a PUSCH repetition Type A if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst. Otherwise, the UE determines N*K consecutive slots for a PUSCH transmission of a PUSCH repetition Type A. For the case of reduced capability half-duplex UE, and when AvailableSlotCounting is enabled, a slot is not counted in the number of N*K slots for a PUSCH transmission of a PUSCH repetition Type A, if at least one of the symbols indicated by the indexed row of the used resource allocation table in the slot overlaps with a symbol of an SS/PBCH block with index provided by ssb-PositionsInBurst.

For paired spectrum and SUL band, The UE determines N*K consecutive slots for a PUSCH transmission of a PUSCH repetition type A, irrespective of whether AvailableSlotCounting is enabled or not. For the case of reduced capability half-duplex UE, and when AvailableSlotCounting is enabled, a slot is not counted in the number of N*K slots for a PUSCH transmission of a PUSCH repetition Type A, if at least one of the symbols indicated by the indexed row of the used resource allocation table in the slot overlaps with a symbol of an SS/PBCH block with index provided by ssb-PositionsInBurst.

For both Type 1 and Type 2 PUSCH transmissions with a configured grant, when K>1, for unpaired spectrum, if an RRC parameter AvailableSlotCounting is enabled, the UE may have to repeat the TB across the N*K slots determined for the PUSCH transmission applying the same symbol allocation in each slot. Otherwise, the UE may have to repeat the TB across the N*K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

For both Type 1 and Type 2 PUSCH transmissions with a configured grant, when K>1, for paired spectrum, irrespective of whether AvailableSlotCounting is enabled or not, the UE may have to repeat the TB across the N*K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration. A Type 1 or Type 2 PUSCH transmission with a configured grant in a slot is omitted according to the conditions in the UE procedure(s) for reporting control information, the UE procedure(s) for determining slot configuration(s) and the UE procedure(s) associated with cancellation indication.

If the available slot based counting is not configured [or for paired spectrum], for both Type 1 and Type 2 PUSCH transmissions with a configured grant, when K>1, the UE may have to repeat the TB across the K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

If the available slot based counting is configured [and for unpaired spectrum], for both Type 1 and Type 2 PUSCH transmissions with a configured grant, when K>1, the UE may have to repeat the TB across the first K available slots applying the same symbol allocation in each slot where each of the available slots is a slot having an UL symbol, as described in the UE procedure(s) for determining slot configuration(s), or flexible symbol, as described in the UE procedure(s) for determining slot configuration(s), that is not SS/PBCH block symbol, for the PUSCH, and[/or] consecutive UL symbols, as described in the UE procedure(s) for determining slot configuration(s), or flexible symbols, as described in the UE procedure(s) for determining slot configuration(s), that are not SS/PBCH block symbols, starting from the first symbol, equal to or larger than a number of symbols for the PUSCH, except if the UE is provided with higher layer parameters cg-nrofSlots and cg-nrofPUSCH-InSlot, in which case the UE repeats the TB in the repK earliest consecutive transmission occasion candidates within the same configuration. A Type 1 or Type 2 PUSCH transmission with a configured grant in a slot is omitted according to the conditions in the UE procedure(s) for reporting control information, the UE procedure(s) for determining slot configuration(s) and the UE procedure(s) associated with cancellation indication. A SS/PBCH block symbol is a symbol of an SS/PBCH block with candidate SS/PBCH block index corresponding to the SS/PBCH block index indicated to a UE by ssb-PositionsInBurst in SIB1 or ssb-PositionsInBurst in ServingCellConfigCommon, as described in the UE synchronization procedure for searching a cell.

If available slot based counting is not configured [or for paired spectrum], for both Type 1 and Type 2 PUSCH transmissions with a configured grant, when K>1, the UE may have to repeat the TB across the K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

If available slot based counting is configured [and for unpaired spectrum], for both Type 1 and Type 2 PUSCH transmissions with a configured grant, when K>1, the UE may have to repeat the TB across an initial slot and the following K−1 available slots applying the same symbol allocation in each slot where the initial slot is a slot having the symbol defined in the uplink transmission procedure(s) without dynamic grant by the MAC entity and each of the available slots is a slot having an UL symbol, as described in the UE procedure(s) for determining slot configuration(s), or flexible symbol, as described in the UE procedure(s) for determining slot configuration(s), that is not SS/PBCH block symbol, for the PUSCH, and/or consecutive UL symbols, as described in the UE procedure(s) for determining slot configuration(s), or flexible symbols, as described in the UE procedure(s) for determining slot configuration(s), that are not SS/PBCH block symbols, starting from the first symbol, equal to or larger than a number of symbols for the PUSCH, except if the UE is provided with higher layer parameters cg-nrofSlots and cg-nrofPUSCH-InSlot, in which case the UE repeats the TB in the repK earliest consecutive transmission occasion candidates within the same configuration. A Type 1 or Type 2 PUSCH transmission with a configured grant in a slot is omitted according to the conditions in the UE procedure(s) for reporting control information, the UE procedure(s) for determining slot configuration(s) and the UE procedure(s) associated with cancellation indication. A SS/PBCH block symbol is a symbol of an SS/PBCH block with candidate SS/PBCH block index corresponding to the SS/PBCH block index indicated to a UE by ssb-PositionsInBurst in SIB1 or ssb-PositionsInBurst in ServingCellConfigCommon, as described in the UE synchronization procedure for searching a cell.

The MAC entity may be included in the medium access control layer processing unit 15.

The UE may not expect that the initial slot is not available.

If the available slot-based counting is not configured or for paired spectrum, for both Type 1 and Type 2 PUSCH transmissions with a configured grant, when K>1, the UE may have to repeat the TB across the K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

If the available slot-based counting is configured and for unpaired spectrum, for both Type 1 and Type 2 PUSCH transmissions with a configured grant, when K>1, the UE may have to repeat the TB across the K available slots applying the same symbol allocation in each slot where each of the available slots is a slot having an UL symbol, as described in those procedures, or flexible symbol, according to the conditions in those procedures, that is not SS/PBCH block symbol, for the PUSCH, and/or consecutive UL symbols, according to the conditions in those procedures, or flexible symbols, according to the conditions in those procedures, that are not SS/PBCH block symbols, starting from the first symbol, equal to or larger than a number of symbols for the PUSCH, except if the UE is provided with higher layer parameters cg-nrofSlots and cg-nrofPUSCH-InSlot, in which case the UE repeats the TB in the repK earliest consecutive transmission occasion candidates within the same configuration.

A Type 1 or Type 2 PUSCH transmission with a configured grant in a slot is omitted according to the conditions in those procedures. An SS/PBCH block symbol is a symbol of an SS/PBCH block with candidate SS/PBCH block index corresponding to the SS/PBCH block index indicated to a UE by ssb-PositionsInBurst in SIB1 or ssb-PositionsInBurst in ServingCellConfigCommon, according to the conditions in those procedures.

For both Type 1 and Type 2 PUSCH transmissions with a configured grant, when K>1, the UE may have to repeat the TB across the K consecutive slots applying the same symbol allocation in each slot, except if the UE is provided with RRC parameters cg-nrofSlots and cg-nrofPUSCH-InSlot, in which case the UE repeats the TB in the repK earliest consecutive transmission occasion candidates within the same configuration. A Type 1 or Type 2 PUSCH transmission with a configured grant in a slot is omitted according to the conditions in one or more RRC configurations.

The procedures apply to PUSCH transmissions of PUSCH repetition Type B with a Type 1 or Type 2 configured grant. For PUSCH transmissions with a Type 1 or Type 2 configured grant, the nominal repetitions and the actual repetitions are determined according to the procedures for PUSCH repetition Type B according to at least one of defined in those procedures. The higher layer configured parameters repK-RV defines the redundancy version pattern to be applied to the repetitions. If the parameter repK-RV is not provided in the configuredGrantConfig, the redundancy version for each actual repetition with a configured grant may have to be set to 0. Otherwise, for the nth transmission occasion among all the actual repetitions (including the actual repetitions that are omitted) of the K nominal repetitions, it is associated with $(\mod(n-1,4)+1)^{th}$ value in the configured RV sequence. If a configured grant configuration is configured with startingFromRV0 set to 'off', the initial transmission of a transport block may only start at the first transmission occasion of the actual repetitions. Otherwise, the initial transmission of a transport block may start at the first transmission occasion of the actual repetitions if the configured RV sequence is {0,2,3,1}, any of the transmission occasions of the actual repetitions that are associated with RV=0 if the configured RV sequence is {0,3,0,3}, and/or any of the transmission occasions of the actual repetitions if the configured RV sequence is {0,0,0,0}, except the actual repetitions within the last nominal repetition when K≥8.

For any RV sequence, the repetitions may have to be terminated after transmitting K nominal repetitions, or at the last transmission occasion among the K nominal repetitions within the period P, or from the starting symbol of a repetition that overlaps with a PUSCH with the same HARQ process scheduled by DCI format 0_0, 0_1 or 0_2, whichever is reached first. The UE is not expected to be configured with the time duration for the transmission of K nominal repetitions larger than the time duration derived by the periodicity P.

For PUSCH repetition Type A (as determined according to procedures defined in those procedures for scheduled PUSCH, or those procedures for configured PUSCH), a UE is configured for frequency hopping by the RRC parameter frequencyHoppingDCI-0-1 (e.g. frequencyHoppingDCI-0-1-r16 and/or frequencyHoppingDCI-0-1-r17) in pusch-Config for PUSCH transmission scheduled by DCI format 0_1, and frequencyHoppingDCI-0-2 in pusch-Config for PUSCH transmission scheduled by DCI format 0_2, and by frequencyHopping provided in pusch-Config for PUSCH transmission scheduled by a DCI format other than 0_2, and by frequencyHopping provided in configuredGrantConfig for configured PUSCH transmission, and by frequencyHoppingPUSCH-RepTypeA provided in rrc-ConfiguredUplinkGrant for Type 1 configured PUSCH transmission. One of two frequency hopping modes (intra-slot frequency hopping, applicable to single slot and multi-slot PUSCH transmission and inter-slot frequency hopping, applicable to multi-slot PUSCH transmission) can be configured. One frequency hopping mode can be further configured (inter-repetition frequency hopping, applicable to multi-slot PUSCH transmission).

The pusch-Config may be referred to the PUSCH-Config.

The pusch-Config may be referred to as the PUSCH-Config.

The RRC parameter frequencyHopping indicates that the value intraSlot enables 'Intra-slot frequency hopping' and the value interSlot enables 'Inter-slot frequency hopping'. If the field is absent, frequency hopping is not configured for'pusch-RepTypeA'. The field frequencyHopping applies to DCI format 0_0 and 0_1 for'pusch-RepTypeA'.

The RRC parameter frequencyHoppingDCI-0-1-r16 indicates the frequency hopping scheme for DCI format 0_1 when pusch-RepTypeIndicatorDCI-0-1 is set to 'pusch-RepTypeB', The value interRepetition enables 'Inter-repetition frequency hopping', and the value interSlot enables 'Inter-slot frequency hopping'. If the field is absent, frequency hopping is not configured for DCI format 0_1.

The RRC parameter frequencyHoppingDCI-0-1-r17 indicates the frequency hopping scheme for DCI format 0_1 when pusch-RepTypeIndicatorDCI-0-1 is set to 'pusch-RepTypeA' or 'pusch-RepTypeB' with 'Inter-repetition frequency hopping'. The value interRepetition enables 'Inter-repetition frequency hopping', and the value interSlot enables 'Inter-slot frequency hopping', and the value intraSlot enables 'intra-slot frequency hopping'. If the field is absent, inter-repetition frequency hopping is not configured for DCI format 0_1 for 'pusch-RepTypeA' and frequency hopping is not configured for DCI format 0_1 for 'pusch-RepTypeB'. Or the RRC parameter frequencyHoppingDCI-0-1-r17 may indicate the frequency hopping scheme for DCI format 0_1 when pusch-RepTypeIndicatorDCI-0-1 is set to 'pusch-RepTypeA' enabling 'Inter-repetition frequency hopping'.

In case of resource allocation type 2, the UE transmits PUSCH without frequency hopping.

In case of resource allocation type 1, whether or not transform precoding is enabled for PUSCH transmission, the UE may perform PUSCH frequency hopping, if the frequency hopping field in a corresponding detected DCI format or in a random access response UL grant is set to 1, or if for a Type 1 PUSCH transmission with a configured grant the RRC parameter frequencyHoppingOffset is provided, otherwise no PUSCH frequency hopping is performed. When frequency hopping is enabled for PUSCH, the RE mapping is defined in those procedures.

For a PUSCH scheduled by RAR UL grant, fallbackRAR UL grant, or by DCI format 0_0 with CRC scrambled by TC-RNTI, frequency offsets are obtained as described in those procedures. For a PUSCH scheduled by DCI format 0_0/0_1 or a PUSCH based on a Type 2 configured UL grant activated by DCI format 0_0/0_1 and for resource allocation type 1, frequency offsets are configured by RRC parameter frequencyHoppingOffsetLists in pusch-Config. For a PUSCH scheduled by DCI format 0_2 or a PUSCH based on a Type2 configured UL grant activated by DCI format 0_2 and for resource allocation type 1, frequency offsets are configured by RRC parameter frequencyHoppingOffsetList-sDCI-0-2 in pusch-Config. When the size of the active BWP is less than 50 PRBs, one of two higher layer configured offsets is indicated in the UL grant. When the size of the active BWP is equal to or greater than 50 PRBs, one of four higher layer configured offsets is indicated in the UL grant.

For PUSCH based on a Type1 configured UL grant the frequency offset is provided by the RRC parameter frequencyHoppingOffset in rrc-ConfiguredUplinkGrant.

For PUSCH repetition Type B (as determined according to procedures defined in those procedures for scheduled PUSCH, or those procedures for configured PUSCH), a UE is configured for frequency hopping by the RRC parameter frequencyHoppingDCI-0-2 in pusch-Config for PUSCH transmission scheduled by DCI format 0_2, by frequencyHoppingDCI-0-1 provided in pusch-Config for PUSCH transmission scheduled by DCI format 0_1, and by frequencyHoppingPUSCH-RepTypeB provided in rrc-ConfiguredUplinkGrant for Type 1 configured PUSCH transmission. The frequency hopping mode for Type 2 configured PUSCH transmission follows the configuration of the activating DCI format. One of two frequency hopping modes (Inter-repetition frequency hopping and Inter-slot frequency hopping) can be configured.

In case of resource allocation type 1, whether or not transform precoding is enabled for PUSCH transmission, the UE may perform PUSCH frequency hopping, if the frequency hopping field in a corresponding detected DCI format is set to 1, or if for a Type 1 PUSCH transmission with a configured grant the RRC parameter frequencyHoppingPUSCH-RepTypeB is provided, otherwise no PUSCH frequency hopping is performed. When frequency hopping is enabled for PUSCH, the RE mapping is defined in those procedures.

For a PUSCH scheduled by DCI format 0_1 or a PUSCH based on a Type 2 configured UL grant activated by DCI format 0_1 and for resource allocation type 1, frequency offsets are configured by RRC parameter frequencyHoppingOffsetLists in pusch-Config. For a PUSCH scheduled by DCI format 0_2 or a PUSCH based on a Type 2 configured UL grant activated by DCI format 0_2 and for resource allocation type 1, frequency offsets are configured by RRC parameter frequencyHoppingOffsetListsDCI-0-2 in pusch-Config. When the size of the active BWP is less than 50 PRBs, one of two higher layer configured offsets is indicated in the UL grant. When the size of the active BWP is equal to or greater than 50 PRBs, one of four higher layer configured offsets is indicated in the UL grant.

For PUSCH based on a Type1 configured UL grant the frequency offset is provided by the RRC parameter frequencyHoppingOffset in rrc-ConfiguredUplinkGrant.

In case of inter-slot frequency hopping, the starting RB during slot $n^{\mu}\_s$ follows that of inter-slot frequency hopping for PUSCH Repetition Type A according to at least one of the conditions defined in those procedures.

If the UE is not capable of a certain coverage enhancement feature(s) (e.g. available slot based PUSCH repetition counting) or if the UE is not provided with a certain coverage enhancement configuration(s) (e.g. available slot based PUSCH repetition counting), the following (i.e. the number of repetitions counted based on contiguous (or continuous, or consecutive) slots) may be applied. Alternatively or additionally, if the UE is capable of a certain coverage enhancement feature(s) and if the UE is provided with a slot-counting type configuration (the RRC configuration or RRC parameter for indicating whether the number of repetitions are counted based on contiguous (or continuous) slots or based on available slots) which indicates the PUSCH repetition to be counted based on contiguous slots, the following may be applied. For both Type 1 and Type 2 PUSCH transmissions with a configured grant, when K>1, the UE may repeat the TB across the K consecutive slots applying the same symbol allocation in each slot, except if the UE is provided with RRC parameters cg-nrofSlots and cg-nrofPUSCH-InSlot, in which case the UE may repeat the TB in the repK earliest consecutive transmission occasion candidates within the same configuration. A Type 1 or Type 2 PUSCH transmission with a configured grant in a slot may be omitted according to the conditions at least and/or at most in, PUSCH-priority based procedure, slot configuration based procedure, slot format based procedure and cancellation indication based procedure. For example, a slot may be determined as available if the slot is available according to all the conditions defined in those procedures, and/or the slot may be determined as not available if the slot is not available according to at least one of the conditions defined in those procedures.

It is noted that the aforementioned slot-counting type configuration may be referred to as a different name. The existence of the slot-counting type configuration in RRC configuration message may mean that the number of repetitions is counted based on available slots while the absence of the slot-counting type configuration in RRC configuration message may mean that the number of repetitions is counted based on contiguous slots. Additionally and/or alternatively, the slot-counting type configuration set to the first value (e.g. 'contiguous') may mean that the number of repetitions is counted based on contiguous slots while the slot-counting type configuration set to the second value (e.g. 'available') may mean that the number of repetitions is counted based on available slots.

If the UE is capable of a certain coverage enhancement feature(s) and/or if the UE is provided with a certain coverage enhancement configuration(s), the following (i.e. the number of repetitions counted based on available slots) may be applied. Alternatively or additionally, if the UE is capable of a certain coverage enhancement feature(s) and if the UE is provided with a slot-counting type configuration which indicates the PUSCH repetition to be counted based on available slots, the following may be applied. For both Type 1 and Type 2 PUSCH transmissions with a configured grant, when K>1, the UE may repeat the TB across the K available slots (i.e. the first K slots which are available for the PUSCH transmission) applying the same symbol allocation in each slot. The K available slots may be determined according to the conditions at least and/or at most in, PUSCH-priority based procedure, slot configuration based procedure, slot format based procedure and cancellation indication based procedure. For example, a slot may be determined as available if the slot is available according to all the conditions defined in those procedures, and/or the slot may be determined as not available if the slot is not available according to at least one of the conditions defined in those procedures.

The pattern of inter-slot frequency hopping according to the available slots may be determined based on the omission of PUSCH transmissions.

The pattern of RV according to the available slots may be determined based on the omission of PUSCH transmissions.

The pattern of slot-counting according to the available slots may be determined based on the omission of PUSCH transmissions.

The PUSCH-priority based procedure is described. If a PUSCH is scheduled by a DCI or a PUSCH with configured grant is configured, the PUSCH is transmitted unless otherwise stated.

A PUSCH or a PUCCH transmission, including repetitions if any, can be of priority index 0 or of priority index 1. For a configured grant PUSCH transmission, a UE may determine a priority index from RRC parameter phy-PriorityIndex, if provided. For a PUCCH transmission with HARQ-ACK information corresponding to a SPS PDSCH reception or a SPS PDSCH release, a UE may determine a priority index from RRC parameter harq-CodebookID, if provided. For a PUCCH transmission with SR, a UE may determine the corresponding priority by RRC parameter phy-PriorityIndex in RRC parameter SchedulingRequestResourceConfig, if any. For a PUSCH transmission with semi-persistent CSI report, a UE may determine a priority index from a priority indicator field, if provided, in a DCI format that activates the semi-persistent CSI report. If a priority index is not provided to a UE for a PUSCH or a PUCCH transmission, the priority index may be 0.

If in an active DL BWP a UE may monitor PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority.

When a UE determines overlapping for PUCCH and/or PUSCH transmissions of different priority indexes, including repetitions if any, the UE may first resolve the overlapping for PUCCH and/or PUSCH transmissions of smaller priority index. Then: if a transmission of a first PUCCH of larger priority index scheduled by a DCI format in a PDCCH reception would overlap in time with a repetition of a transmission of a second PUSCH or a second PUCCH of smaller priority index, the UE may cancel the repetition of a transmission of the second PUSCH or the second PUCCH before the first symbol that would overlap with the first PUCCH transmission; if a transmission of a first PUSCH of larger priority index scheduled by a DCI format in a PDCCH reception would overlap in time with a repetition of the transmission of a second PUCCH of smaller priority index, the UE may cancel the repetition of the transmission of the second PUCCH before the first symbol that would overlap with the first PUSCH transmission. The overlapping may be applicable before or after resolving overlapping among channels of larger priority index, if any. The UE may expect that the transmission of the first PUCCH or the first PUSCH, respectively, would not start before $T\_(proc,2)+d\_1$ after a last symbol of the corresponding PDCCH reception. $T\_(proc,2)$ is the PUSCH preparation time for a corresponding UE processing capability assuming $d\_2,1=0$, based on p and $N\_2$, and $d\_1$ is determined by a reported UE capability.

If the slot-counting type configuration indicates that the number of repetitions to be counted based on contiguous slots, the above-described processing time requirement that the first PUSCH would not start before $T\_(proc,2)+d\_1$ after a last symbol of the corresponding PDCCH reception may be applied. If the slot-counting type configuration indicates that the number of repetitions to be counted based on available slots, the processing time requirement may be relaxed. For example, the processing time requirement that the first PUSCH would not start before T_(proc,2)+d_1+d_x after a last symbol of the corresponding PDCCH reception may be applied, where d_x is a positive value. The d_x may be expressed in unit of symbols. In other words, If the number of repetitions for PUSCH repetition Type A is counted based on contiguous slots, the processing time requirement that the first PUSCH would not start before T_(proc,2)+d_1 after a last symbol of the corresponding PDCCH reception may be applied. If the number of repetitions for PUSCH repetition Type A is counted based on available slots, the processing time requirement may be relaxed. The relaxation of the processing time requirement may mean allowing longer gap duration between PUSCH start and the end of the corresponding PDCCH, where the processing time requirement may be the maximum processing time which is required for cancellation of a scheduled/configured/granted PUSCH transmission.

If a UE is scheduled by a DCI format in a first PDCCH reception to transmit a first PUCCH or a first PUSCH of larger priority index that overlaps with a second PUCCH or a second PUSCH transmission of smaller priority index that, if any, is scheduled by a DCI format in a second PDCCH, T_(proc,2) may be based on a value of p corresponding to the smallest SCS configuration of the first PDCCH, the second PDCCHs, the first PUCCH or the first PUSCH, and the second PUCCHs or the second PUSCHs. If the overlapping group includes the first PUCCH, N_2 is 5 for µ=0, 5.5 for µ=1 and 11 for µ=2 if RRC parameter processingType2Enabled of RRC parameter PDSCH-ServingCellConfig is set to enable for the serving cell where the UE receives the first PDCCH and for all serving cells where the UE receives the PDSCHs corresponding to the second PUCCHs, and if processingType2Enabled of RRC parameter PUSCH-ServingCellConfig is set to enable for the serving cells with the second PUSCHs, N_2 is 10 for µ=0, 12 for µ=1, 23 for µ=2, and 36 for µ=3 otherwise. If the overlapping group includes the first PUSCH, N_2 is 5 for µ=0, 5.5 for µ=1 and 11 for µ=2 if processingType2Enabled of PUSCH-ServingCellConfig is set to enable for the serving cells with the first PUSCH and the second PUSCHs and if processingType2Enabled of PDSCH-ServingCellConfig is set to enable for all serving cells where the UE receives the PDSCHs corresponding to the second PUCCHs, N_2 is 10 for µ=0, 12 for µ=1, 23 for µ=2, and 36 for µ=3 otherwise.

If a UE would transmit the following channels, including repetitions if any, that would overlap in time: a first PUCCH of larger priority index with SR and a second PUCCH or PUSCH of smaller priority index; or a configured grant PUSCH of larger priority index and a PUCCH of smaller priority index; or a first PUCCH of larger priority index with HARQ-ACK information only in response to a PDSCH reception without a corresponding PDCCH and a second PUCCH of smaller priority index with SR and/or CSI, or a configured grant PUSCH with smaller priority index, or a PUSCH of smaller priority index with SP-CSI report(s) without a corresponding PDCCH; or a PUSCH of larger priority index with SP-CSI reports(s) without a corresponding PDCCH and a PUCCH of smaller priority index with SR, or CSI, or HARQ-ACK information only in response to a PDSCH reception without a corresponding PDCCH; or a configured grant PUSCH of larger priority index and a configured PUSCH of lower priority index on a same serving cell, the UE may be expected to cancel a repetition of the PUCCH/PUSCH transmissions of smaller priority index before the first symbol overlapping with the PUCCH/PUSCH transmission of larger priority index if the repetition of the PUCCH/PUSCH transmissions of smaller priority index overlaps in time with the PUCCH/PUSCH transmissions of larger priority index.

A UE may not expect to be scheduled to transmit a PUCCH or a PUSCH with smaller priority index that would overlap in time with a PUCCH of larger priority index with HARQ-ACK information only in response to a PDSCH reception without a corresponding PDCCH. A UE may not expect to be scheduled to transmit a PUCCH of smaller priority index that would overlap in time with a PUSCH of larger priority index with SP-CSI report(s) without a corresponding PDCCH.

If a UE multiplexes aperiodic CSI in a PUSCH and the UE would multiplex UCI that includes HARQ-ACK information in a PUCCH that overlaps with the PUSCH and the timing conditions for overlapping PUCCHs and PUSCHs are fulfilled, the UE may multiplex only the HARQ-ACK information in the PUSCH and does not transmit the PUCCH.

If a UE transmits multiple PUSCHs in a slot on respective serving cells that include first PUSCHs that are scheduled by DCI formats and second PUSCHs configured by respective RRC parameter ConfiguredGrantConfig or semiPersistentOnPUSCH, and the UE would multiplex UCI in one of the multiple PUSCHs, and the multiple PUSCHs fulfil the conditions for UCI multiplexing, the UE may multiplex the UCI in a PUSCH from the first PUSCHs.

If a UE transmits multiple PUSCHs in a slot on respective serving cells and the UE would multiplex UCI in one of the multiple PUSCHs and the UE does not multiplex aperiodic CSI in any of the multiple PUSCHs, the UE may multiplex the UCI in a PUSCH of the serving cell with the smallest RRC parameter ServCellIndex subject to the conditions for UCI multiplexing being fulfilled. If the UE transmits more than one PUSCHs in the slot on the serving cell with the smallest ServCellIndex that fulfil the conditions for UCI multiplexing, the UE may multiplex the UCI in the earliest PUSCH that the UE transmits in the slot.

If a UE transmits a PUSCH over multiple slots and the UE would transmit a PUCCH with HARQ-ACK and/or CSI information over a single slot that overlaps with the PUSCH transmission in one or more slots of the multiple slots, and the PUSCH transmission in the one or more slots fulfills the conditions for multiplexing the HARQ-ACK and/or CSI information, the UE may multiplex the HARQ-ACK and/or CSI information in the PUSCH transmission in the one or more slots. The UE may not multiplex HARQ-ACK and/or CSI information in the PUSCH transmission in a slot from the multiple slots if the UE would not transmit a single-slot PUCCH with HARQ-ACK and/or CSI information in the slot in case the PUSCH transmission was absent.

If the PUSCH transmission over the multiple slots is scheduled by a DCI format that includes a DAI field, the value of the DAI field may be applicable for multiplexing HARQ-ACK information in the PUSCH transmission in any slot from the multiple slots where the UE multiplexes HARQ-ACK information.

When a UE would multiplex HARQ-ACK information in a PUSCH transmission that is configured by an RRC parameter ConfiguredGrantConfig, and includes CG-UCI, the UE may multiplex the HARQ-ACK information in the PUSCH transmission if the UE is provided RRC parameter cg-UCI-Multiplexing; otherwise, the UE does not transmit the PUSCH and multiplexes the HARQ-ACK information in a PUCCH transmission or in another PUSCH transmission.

If a PUSCH (or a repetition of a PUSCH) in a slot is determined to be transmitted or to multiplex UCI(s), the slot may be considered as available for the PUSCH transmission. If a PUSCH (or a repetition of a PUSCH) in a slot is determined to be cancelled, the slot may be considered as not available for the PUSCH transmission.

The slot configuration based procedure is described. If a PUSCH is scheduled by a DCI or a PUSCH with configured grant is configured, the PUSCH is transmitted unless otherwise stated.

If a UE is provided RRC parameter tdd-UL-DL-ConfigurationCommon, the UE may set the slot format (the format which indicates which type of symbol between downlink, uplink and flexible symbols each symbol in a slot is) per slot over a number of slots as indicated by tdd-UL-DL-ConfigurationCommon. If the UE is additionally provided RRC parameter tdd-UL-DL-ConfigurationDedicated, the parameter tdd-UL-DL-ConfigurationDedicated may override only flexible symbols per slot over the number of slots as provided by tdd-UL-DL-ConfigurationCommon.

For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE may not receive the PDCCH, or the PDSCH, or the CSI-RS, or the DL PRS in the set of symbols of the slot.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then: the following A), B) and C) may be applied. A) If the UE does not indicate the capability of partialCancellation, the UE does not expect to cancel the transmission of the PUCCH or PUSCH or PRACH in the set of symbols if the first symbol in the set occurs within T_(proc,2) relative to a last symbol of a CORESET where the UE detects the DCI format; otherwise, the UE cancels the PUCCH, or the PUSCH, or an actual repetition of the PUSCH, or the PRACH transmission in the set of symbols. B) If the UE indicates the capability of partialCancellation, the UE does not expect to cancel the transmission of the PUCCH or PUSCH or PRACH in symbols from the set of symbols that occur within T_(proc,2) relative to a last symbol of a CORESET where the UE detects the DCI format. The UE cancels the PUCCH, or the PUSCH, or an actual repetition of the PUSCH, or the PRACH transmission in remaining symbols from the set of symbols. C) The UE does not expect to cancel the transmission of SRS in symbols from the subset of symbols that occur within T_(proc,2) relative to a last symbol of a CORESET where the UE detects the DCI format. The UE cancels the SRS transmission in remaining symbols from the subset of symbols. T_(proc,2) is the PUSCH preparation time for the corresponding UE processing capability assuming d_2,1=1 and p corresponds to the smallest SCS configuration between the SCS configuration of the PDCCH carrying the DCI format and the SCS configuration of the SRS, PUCCH, PUSCH or μ_r, where μ_r corresponds to the SCS configuration of the PRACH if it is 15 kHz or higher; otherwise μ_r=0.

If the slot-counting type configuration indicates that the number of repetitions to be counted based on contiguous slots, the above-described processing time requirement that "UE does not expect to cancel the transmission of the PUSCH in the set of symbols if the first symbol in the set occurs within T_(proc,2) relative to a last symbol of a CORESET where the UE detects the DCI format, otherwise UE cancels the PUSCH transmission" may be applied. If the slot-counting type configuration indicates that the number of repetitions to be counted based on available slots, the processing time requirement may be relaxed. For example, "UE does not expect to cancel the transmission of the PUSCH in the set of symbols if the first symbol in the set occurs within T_(proc,2)+d_x relative to a last symbol of a CORESET where the UE detects the DCI format, otherwise UE cancels the PUSCH transmission" may be applied, where d_x is a positive value. In other words, If the number of repetitions for PUSCH repetition Type A is counted based on contiguous slots, the processing time requirement of T_(proc,2) may be applied. If the number of repetitions for PUSCH repetition Type A is counted based on available slots, the longer processing time requirement may be applied.

For a set of symbols of a slot that are indicated to a UE as downlink by tdd-UL-DL-ConfigurationCommon, or tdd-UL-DL-ConfigurationDedicated, the UE may not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE may not expect to receive both dedicated RRC parameters configuring transmission from the UE in the set of symbols of the slot and dedicated RRC parameters configuring reception by the UE in the set of symbols of the slot.

For operation on a single carrier in unpaired spectrum, for a set of symbols of a slot indicated to a UE by RRC parameter ssb-PositionsInBurst in SIB1 or ssb-PositionsInBurst in ServingCellConfigCommon, for reception of SS/PBCH blocks, the UE may not transmit PUSCH, PUCCH, PRACH in the slot if a transmission would overlap with any symbol from the set of symbols and the UE does not transmit SRS in the set of symbols of the slot. The UE may not expect the set of symbols of the slot to be indicated as uplink by tdd-UL-DL-ConfigurationCommon, or tdd-UL-DL-ConfigurationDedicated, when provided to the UE.

If a UE is scheduled by a DCI format to transmit PUSCH over multiple slots, and if tdd-UL-DL-ConfigurationCommon, or tdd-UL-DL-ConfigurationDedicated, indicates that, for a slot from the multiple slots, at least one symbol from a set of symbols where the UE is scheduled PUSCH transmission in the slot is a downlink symbol, the UE may not transmit the PUSCH in the slot.

If a PUSCH (or a repetition of a PUSCH) in a slot is determined to be transmitted, the slot may be considered as available for the PUSCH transmission. If a PUSCH (or a repetition of a PUSCH) in a slot is determined to be cancelled or not to be transmitted, the slot may be considered as not available for the PUSCH transmission.

An example of the definition of T_(proc,2) is described. If the first uplink symbol in the PUSCH allocation for a transport block, including the DM-RS, as defined by the slot offset K2 and the start S and length L of the PUSCH allocation indicated by 'Time domain resource assignment' of the scheduling DCI and including the effect of the timing advance, is no earlier than at symbol L2, where L2 is defined as the next uplink symbol with its CP starting $T_{(proc,2)}$ ($T_{proc,2} = \max\ ((N_2 + d_{2,1} + d_2)(2048 + 144) \cdot \kappa 2^{-\mu} \cdot T_c + T_{ext} + T_{switch}, d_{2,2}))$ after the end of the reception of the last symbol of the PDCCH carrying the DCI scheduling the PUSCH, then the UE may transmit the transport block. N2 is based on µ for UE processing capability 1 and 2 respectively, where µ corresponds to the one of (µDL, µUL) resulting with the largest T_(proc,2), where the µDL corresponds to the subcarrier spacing of the downlink with which the PDCCH carrying the DCI scheduling the PUSCH was transmitted and µUL corresponds to the subcarrier spacing of the uplink channel with which the PUSCH is to be transmitted, and the constant c is 64. For operation with shared spectrum channel access, T_ext may be non-zero value, otherwise T_ext=0. If the first symbol of the PUSCH allocation consists of DM-RS only, then d2,1=0, otherwise d2,1=1. The time units T_C=1/(Δf_"max" N_f) where Δf_"max"=480·10^3 Hz and N_f=4096. If the UE is configured with multiple active component carriers, the first uplink symbol in the PUSCH allocation further includes the effect of timing difference between component carriers. If the scheduling DCI triggered a switch of BWP, d2,2 equals to the switching time, otherwise d2,2=0. If a PUSCH of a larger priority index would overlap with PUCCH of a smaller priority index, d2 for the PUSCH of a larger priority is set as reported by the UE; otherwise d2=0. For a UE that supports capability 2 on a given cell, the processing time according to UE processing capability 2 is applied if the high layer parameter processingType2Enabled in PUSCH-ServingCellConfig is configured for the cell and set to 'enable'. If the PUSCH indicated by the DCI is overlapping with one or more PUCCH channels, then the transport block is multiplexed, otherwise the transport block is transmitted on the PUSCH indicated by the DCI. If uplink switching gap is triggered, T_switch equals to the switching gap duration and for the UE configured with RRC parameter uplinkTxSwitchingOption set to 'dualUL' for uplink carrier aggregation µUL=min (µUL,carrier1, µUL,carrier2), otherwise T_switch=0. For PUSCH preparation time for PUSCH timing capability 1, PUSCH preparation time N2 is 10, 12, 23 and 36 symbols for µ=0, 1, 2 and 3, respectively. For PUSCH preparation time for PUSCH timing capability 2, PUSCH preparation time N2 is 5, 5.5 and 11 symbols (for frequency range (FR) 1) for µ=0, 1 and 2, respectively.

The slot format based procedure is described. If a PUSCH is scheduled by a DCI or a PUSCH with configured grant is configured, the PUSCH is transmitted unless otherwise stated.

This procedure may apply for a serving cell that is included in a set of serving cells configured to a UE by RRC parameter slotFormatCombToAddModList and slotFormatCombToReleaseList, availableRB-SetsToAddModList and availableRB-SetsToRelease, switchTriggerToAddModList and switchTriggerToReleaseList, or co-DurationsPerCellToAddModList and co-DurationsPerCellToReleaseList.

A SFI-index field value in a DCI format 2_0 may indicate to a UE a slot format for each slot in a number of slots for each DL BWP or each UL BWP starting from a slot where the UE detects the DCI format 2_0. The number of slots may be equal to or larger than a PDCCH monitoring periodicity for DCI format 2_0. The SFI-index field may include maxSFIindex bits where maxSFIindex is the maximum value of the values provided by corresponding RRC parameter slotFormatCombinationId. A slot format may be identified by a corresponding format index as provided in the table in which each entry specifies a respective combination of 'D', 'U' and/or 'F', where 'D' denotes a downlink symbol, 'U' denotes an uplink symbol, and 'F' denotes a flexible symbol. The index 255 may indicate that UE determines the slot format for the slot based on tdd-UL-DL-ConfigurationCommon, or tdd-UL-DL-ConfigurationDedicated and, if any, on detected DCI formats.

For a set of symbols of a slot, a UE may not expect to detect a DCI format 2_0 with an SFI-index field value indicating the set of symbols of the slot as uplink and to detect a DCI format indicating to the UE to receive PDSCH or CSI-RS in the set of symbols of the slot.

For a set of symbols of a slot, a UE may not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated as downlink/uplink by tdd-UL-DL-ConfigurationCommon, or tdd-UL-DL-ConfigurationDedicated, the UE may not expect to detect a DCI format 2_0 with an SFI-index field value indicating the set of symbols of the slot as uplink/downlink, respectively, or as flexible.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255, at least the following A) to E) may be applied. A) If an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot. B) If an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot. C) If the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink. D) A UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot. E) A UE does not expect to detect an SFI-index field value in DCI format 2_0 indicating the set of symbols of the slot as downlink or flexible if the set of symbols of the slot includes symbols corresponding to any repetition of a PUSCH transmission activated (i.e. scheduled) by an UL Type 2 grant PDCCH.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then the following A), B) and C) may be applied. A) If the UE does not indicate the capability of partialCancellation, the UE does not expect to cancel the transmission of the PUCCH or PUSCH or PRACH in the set of symbols if the first symbol in the set occurs within T_(proc,2) relative to a last symbol of a CORESET where the UE detects the DCI format; otherwise, the UE cancels the PUCCH, or the PUSCH, or an actual repetition of the PUSCH, or the PRACH transmission in the set of symbols. B) If the UE indicates the capability of partialCancellation, the UE does not expect to cancel the transmission of the PUCCH or PUSCH or PRACH in symbols from the set of symbols that occur within T_(proc,2) relative to a last symbol of a CORESET where the UE detects the DCI format. The UE cancels the PUCCH, or the PUSCH, or an actual repetition of the PUSCH, or the PRACH transmission in remaining symbols from the set of symbols. C) The UE does not expect to cancel the transmission of SRS in symbols from the subset of symbols that occur within T_(proc,2) relative to a last symbol of a CORESET where the UE detects the DCI format. The UE cancels the SRS transmission in remaining symbols from the subset of symbols. T_(proc,2) is the PUSCH preparation time for the corresponding UE processing capability assuming d_2,1=1 and p corresponds to the smallest SCS configuration between the SCS configuration of the PDCCH carrying the DCI format and the SCS configuration of the SRS, PUCCH, PUSCH or μ_r, where μ_r corresponds to the SCS configuration of the PRACH if it is 15 kHz or higher; otherwise μ_r=0.

If the slot-counting type configuration indicates that the number of repetitions to be counted based on contiguous slots, the above-described processing time requirement that "UE does not expect to cancel the transmission of the PUSCH in the set of symbols if the first symbol in the set occurs within T_(proc,2) relative to a last symbol of a CORESET where the UE detects the DCI format, otherwise UE cancels the PUSCH transmission" may be applied. If the slot-counting type configuration indicates that the number of repetitions to be counted based on available slots, the processing time requirement may be relaxed. For example, "UE does not expect to cancel the transmission of the PUSCH in the set of symbols if the first symbol in the set occurs within T_(proc,2)+d_x relative to a last symbol of a CORESET where the UE detects the DCI format, otherwise UE cancels the PUSCH transmission" may be applied, where d_x is a positive value. In other words, If the number of repetitions for PUSCH repetition Type A is counted based on contiguous slots, the processing time requirement of T_(proc,2) may be applied. If the number of repetitions for PUSCH repetition Type A is counted based on available slots, the longer processing time requirement may be applied.

A UE may assume that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-Configuration-Dedicated are not provided to the UE, and if the UE does not detect a DCI format 2_0 providing a slot format for the slot, at least the following A) may be applied. A) The UE transmits PUSCH, PUCCH, PRACH, or SRS in the set of symbols of the slot if the UE receives a corresponding indication by a DCI format, a RAR UL grant, fallbackRAR UL grant, or successRAR.

If the UE is configured by higher layers to transmit SRS, or PUCCH, or PUSCH, or PRACH in the set of symbols of the slot and the UE is not provided RRC parameter enableConfiguredUL, the following A) and B) may be applied. A) The UE does not transmit the PUCCH, or the PUSCH, or the PRACH in the slot and does not transmit the SRS in symbols from the set of symbols in the slot, if any, starting from a symbol that is after PUSCH preparation time T_(proc,2) for the corresponding PUSCH timing capability assuming d_2,1=1 after a last symbol of a CORESET where the UE is configured to monitor PDCCH for DCI format 2_0 and p corresponds to the smallest SCS configuration between the SCS configuration of the PDCCH carrying the DCI format 2_0 and the SCS configuration of the SRS, PUCCH, PUSCH or μ_r, where μ_r corresponds to the SCS configuration of the PRACH if it is 15 kHz or higher; otherwise μ_r=0. B) The UE does not expect to cancel the transmission of the SRS, or the PUCCH, or the PUSCH, or the PRACH in symbols from the set of symbols in the slot, if any, starting before a symbol that is after the PUSCH preparation time T_(proc,2) for the corresponding PUSCH timing capability assuming d_2,1=1 after a last symbol of a CORESET where the UE is configured to monitor PDCCH for DCI format 2_0 and p corresponds to the smallest SCS configuration between the SCS configuration of the PDCCH carrying the DCI format 2_0 and the SCS configuration of the SRS, PUCCH, PUSCH or μ_r, where μ_r corresponds to the SCS configuration of the PRACH if it is 15 kHz or higher; otherwise μ_r=0.

If the slot-counting type configuration indicates that the number of repetitions to be counted based on contiguous slots, the above-described processing time requirement that "UE does not expect to cancel the transmission of the PUSCH in the set of symbols if the first symbol in the set occurs within T_(proc,2) relative to a last symbol of a CORESET where the UE monitor the DCI format 2_0, otherwise UE cancels the PUSCH transmission" may be applied. If the slot-counting type configuration indicates that the number of repetitions to be counted based on available slots, the processing time requirement may be relaxed. For example, "UE does not expect to cancel the transmission of the PUSCH in the set of symbols if the first symbol in the set occurs within T_(proc,2)+d_x relative to a last symbol of a CORESET where the UE monitors the DCI format 2_0, otherwise UE cancels the PUSCH transmission" may be applied, where d_x is a positive value. In other words, If the number of repetitions for PUSCH repetition Type A is counted based on contiguous slots, the processing time requirement of T_(proc,2) may be applied. If the number of repetitions for PUSCH repetition Type A is counted based on available slots, the longer processing time requirement may be applied.

If the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

If a PUSCH (or a repetition of a PUSCH) in a slot is determined to be transmitted, the slot may be considered as available for the PUSCH transmission. If a PUSCH (or a repetition of a PUSCH) in a slot is determined to be cancelled or not to be transmitted, of if at least one symbol for the PUSCH in the slot is determined as a downlink symbol, the slot may be considered as not available for the PUSCH transmission.

The cancellation indication based procedure is described. If a PUSCH is scheduled by a DCI or a PUSCH with configured grant is configured, the PUSCH is transmitted unless otherwise stated.

If a UE is provided RRC parameter UplinkCancellation, the UE may be provided, in one or more serving cells, a search space set for monitoring the first PDCCH candidate with a CCE aggregation level of L_CI CCEs of the search space set for detection of a DCI format 2_4 with a CI-RNTI provided by ci-RNTI.

For a serving cell having an associated field in a DCI format 2_4, the field may be denoted by N_"CI" a number of bits provided by RRC parameter ci-PayloadSize, B_"CI" a number of PRBs provided by RRC parameter frequencyRegionforCI in RRC parameter timeFrequencyRegion, T_"CI" a number of symbols, excluding symbols for reception of SS/PBCH blocks and DL symbols indicated by tdd-UL-DL-ConfigurationCommon, from a number of symbols that is provided by RRC parameter timeDurationforCI in RRC parameter timeFrequencyRegion, if the PDCCH monitoring periodicity for the search space set with the DCI format 2_4 is one slot and there are more than one PDCCH monitoring occasions in a slot, or is equal to the PDCCH monitoring periodicity, otherwise, and G_"CI" a number of partitions for the T_"CI" symbols provided by RRC parameter timeGranularityforCI in RRC parameter timeFrequencyRegion.

An indication by a DCI format 2_4 for a serving cell may be applicable to a PUSCH transmission or an SRS transmission on the serving cell. If the PUSCH transmission or the SRS transmission is scheduled by a DCI format, the indication by the DCI format 24 may be applicable to the PUSCH transmission or SRS transmission only if the last symbol of the PDCCH reception providing the DCI format is earlier than the first symbol of the PDCCH reception providing the DCI format 2_4. For the serving cell, the UE may determine the first symbol of the T_CI symbols to be the first symbol that is after T'_(proc,2) from the end of a PDCCH reception where the UE detects the DCI format 2_4, where T'_(proc,2) is obtained from T_(proc,2) for PUSCH processing capability 2assuming $d\_2,1=d\_offset \cdot 2^{(-\mu\_UL)}/2^{(-\mu)}$ where d_offset is provided by RRC parameter delta_Offset, μ being the smallest SCS configuration between the SCS configuration of the PDCCH and the smallest SCS configuration μ_UL provided in RRC parameter scs-SpecificCarrierList of FrequencyInfoUL or FrequencyInfoUL-SIB. The UE may not expect to cancel the PUSCH transmission or the SRS transmission before a corresponding symbol that is T_(proc,2) assuming that d_2, 1=0 after a last symbol of a CORESET where the UE detects the DCI format 2_4.

If the slot-counting type configuration indicates that the number of repetitions to be counted based on contiguous slots, the above-described processing time requirement that "UE does not expect to cancel the transmission of the PUSCH in the set of symbols if the first symbol in the set occurs within T'_(proc,2) relative to a last symbol of a PDCCH where the UE detects the DCI format 2_4, otherwise UE cancels the PUSCH transmission" may be applied. If the slot-counting type configuration indicates that the number of repetitions to be counted based on available slots, the processing time requirement may be relaxed. For example, "UE does not expect to cancel the transmission of the PUSCH in the set of symbols if the first symbol in the set occurs within T'_(proc,2)+d_x relative to a last symbol of a PDCCH where the UE detects the DCI format 2_4, otherwise UE cancels the PUSCH transmission" may be applied, where d_x is a positive value. In other words, If the number of repetitions for PUSCH repetition Type A is counted based on contiguous slots, the processing time requirement of T'_(proc,2) may be applied. If the number of repetitions for PUSCH repetition Type A is counted based on available slots, the longer processing time requirement may be applied.

A UE that detects a DCI format 2_4 for a serving cell may cancel a PUSCH transmission (including PUSCH transmission with repetition Type A), or an actual repetition of a PUSCH transmission if the PUSCH transmission is with repetition Type B, or an SRS transmission on the serving cell if, respectively, the transmission is PUSCH with priority 0 if the UE is provided RRC parameter uplinkCancellationPriority, a group of symbols, from the T_"CI" symbols, has at least one bit value of '1' in the corresponding set of N_BI bits in the DCI format 2_4 and includes a symbol of the (repetition of the) PUSCH transmission or of the SRS transmission, and a group of PRBs, from the B_"CI" PRBs, has a corresponding bit value of '1' in the set of bits corresponding to the group of symbols in the DCI format 2_4 and includes a PRB of the (repetition of the) PUSCH transmission or of the SRS transmission. The cancellation of the (repetition of the) PUSCH transmission may include all symbols from the earliest symbol of the (repetition of the) PUSCH transmission that is in a group of symbols having corresponding bit values of '1' in the DCI format 2_4. The cancellation of the SRS transmission may include only symbols that are in one or more groups of symbols having corresponding bit values of '1' in the DCI format 2_4

If, based on an indication by a DCI format 2_4, a UE cancels a PUSCH transmission or an SRS transmission, the UE may not expect to be scheduled by a second DCI format to transmit a PUSCH or an SRS over symbols that include symbols of the cancelled PUSCH transmission or SRS transmission, where the last symbol of the PDCCH reception providing the second DCI format is later than the first symbol of the PDCCH reception providing the DCI format 2_4.

If a PUSCH (or a repetition of a PUSCH) in a slot is determined to be transmitted, the slot may be considered as available for the PUSCH transmission. If a PUSCH (or a repetition of a PUSCH) in a slot is determined to be cancelled or not to be transmitted, the slot may be considered as not available for the PUSCH transmission.

When the number of repetitions is counted based on available slots, there may be several sub-options in terms of consideration of the conditions in PUSCH-priority based procedure, slot configuration based procedure, slot format based procedure and cancellation indication based procedure. The conditions according to the slot configuration procedure may be always applicable. Whether the conditions in the other procedures are applicable may be depending on a certain RRC configuration.

The first sub-option is to have a single slot-counting type configuration which is applicable to all the conditions. More specifically, if the slot-counting type configuration indicates that the number of repetitions to be counted based on available slots, and if an available-slot type configuration (the RRC configuration or RRC parameter which indicates whether the available slots are determined based on only semi-static configuration or based on both semi-static configuration and dynamic signaling, this configuration may or may not be the same as the slot-counting type configuration)

indicates that dynamic signaling is used for the determination of the available slots, the available slots may be determined according to all the conditions of which corresponding RRC configurations are provided. For example, the conditions in PUSCH-priority based procedure may be applicable if phy-PriorityIndex or priorityIndicatorDCI is provided, while the conditions in PUSCH-priority based procedure may be not applicable if phy-PriorityIndex or priorityIndicatorDCI (the procedure which determines whether PUSCH is transmitted or not based on the priority index of the PUSCH)) is not provided. The conditions in slot format based procedure may be applicable if SlotFormatCombinationsPerCell (i.e. RRC parameter/configuration which causes the slot format based procedure (the procedure which determines whether PUSCH is transmitted or not based on the slot format)) is provided, while the conditions in slot format based procedure may be not applicable if SlotFormatCombinationsPerCell is not provided. The conditions in cancellation indication based procedure may be applicable if UplinkCancellation (i.e. RRC parameter/configuration which causes the cancellation indicator based procedure (the procedure which determines whether PUSCH is transmitted or not based on the cancellation indicator)) is provided, while the conditions in cancellation indication based procedure may be not applicable if UplinkCancellation is not provided.

With the first sub-option, if the UE is capable of a certain coverage enhancement feature(s) and/or if the UE is provided with a certain coverage enhancement configuration(s), alternatively or additionally if the UE is provided with a slot-counting type configuration which indicates the PUSCH repetition to be counted based on available slots and/or if the UE is provided with an available-slot type configuration which indicates dynamic signaling to be used for the determination of the available slots, the following may be applied. For both Type 1 and Type 2 PUSCH transmissions with a configured grant, when K>1, the UE may repeat the TB across the K available slots (i.e. the first K slots which are available for the PUSCH transmission) applying the same symbol allocation in each slot. The K available slots may be determined according to the conditions in the slot configuration based procedure and additionally in the PUSCH-priority based procedure, the slot format based procedure and the cancellation indication based procedure.

With the first sub-option, if the UE is capable of a certain coverage enhancement feature(s) and/or if the UE is provided with a certain coverage enhancement configuration(s), alternatively or additionally if the UE is provided with a slot-counting type configuration which indicates the PUSCH repetition to be counted based on available slots and/or if the UE is provided with an available-slot type configuration which indicates only semi-static configuration to be used for the determination of the available slots, the following may be applied. For both Type 1 and Type 2 PUSCH transmissions with a configured grant, when K>1, the UE may repeat the TB across the K available slots (i.e. the first K slots which are available for the PUSCH transmission) applying the same symbol allocation in each slot. The K available slots may be determined according to the conditions in the slot configuration based procedure but without referring to the conditions in the PUSCH-priority based procedure, the slot format based procedure and the cancellation indication based procedure.

The second sub-option is to have several slot-counting type configuration, each is applicable to the conditions in a respective procedure. More specifically, if the available-slot type configuration for PUSCH-priority based procedure indicates that PUSCH-priority based transmissions/cancellations are used for the determination of the available slots, the available slots may be determined according to the PUSCH-priority based procedure. Similarly, if the available-slot type configuration for slot format based procedure indicates that slot format based transmissions/cancellations are used for the determination of the available slots, the available slots may be determined according to the slot format based procedure. If the available-slot type configuration for cancellation indication based procedure indicates that cancellation indication based transmissions/cancellations are used for the determination of the available slots, the available slots may be determined according to the cancellation indication based procedure. For example, the conditions in PUSCH-priority based procedure may be applicable if phy-PriorityIndex or priorityIndicatorDCI is provided and also if the available-slot type configuration for PUSCH-priority based procedure indicating use of PUSCH-priority based procedure is provided, while the conditions in PUSCH-priority based procedure may be not applicable otherwise. The conditions in slot format based procedure may be applicable if SlotFormatCombinationsPerCell is provided and also if the available-slot type configuration for slot format based procedure indicating use of slot format based procedure is provided, while the conditions in slot format based procedure may be not applicable otherwise. The conditions in cancellation indication based procedure may be applicable if UplinkCancellation is provided and also if the available-slot type configuration for cancellation indication based procedure indicating use of cancellation indication based procedure is provided, while the conditions in cancellation indication based procedure may be not applicable otherwise. Any combination of the above may also apply. For example, if the available-slot type configuration for PUSCH-priority based procedure is provided, and if the available-slot type configuration for slot format based procedure is provided, but if the available-slot type configuration for cancellation indication based procedure is not provided, the available slot may be determined based on the conditions in slot configuration based procedures and also the conditions in PUSCH-priority based procedure and slot format based procedure, but the conditions according to cancellation indication based procedure are not referred to for the determination of available slots.

With the second sub-option, if the UE is capable of a certain coverage enhancement feature(s) and/or if the UE is provided with a certain coverage enhancement configuration(s), alternatively or additionally if the UE is provided with a slot-counting type configuration which indicates the PUSCH repetition to be counted based on available slots and if the UE is provided with at least one of available-slot type configurations for PUSCH-priority based procedure, slot format based procedure and cancellation indication based procedure, the following may be applied. For both Type 1 and Type 2 PUSCH transmissions with a configured grant, when K>1, the UE may repeat the TB across the K available slots (i.e. the first K slots which are available for the PUSCH transmission) applying the same symbol allocation in each slot. The K available slots may be determined according to the conditions in the slot configuration based procedure and additionally in the PUSCH-priority based procedure, the slot format based procedure and the cancellation indication based procedure if, respectively, the available-slot type configuration for PUSCH-priority based procedure, the available-slot type configuration for slot format based procedure, or the available-slot type configuration for cancellation indication based procedure is provided.

If only semi-static configuration is used for the determination of the available slots and/or any dynamic signaling is not used for the determination of the available slots, the UE determines the K slots for a PUSCH transmission starting from a slot indicated to the UE for the PUSCH transmission and having A) an UL symbol, as described in the slot configuration procedure, or flexible symbol that is not SS/PBCH block symbol, and B) consecutive UL symbols, as described in the slot configuration procedure, or flexible symbols that are not SS/PBCH block symbols, starting from the first symbol, equal to or larger than the number of symbols where the first symbol within a slot and the number of symbols within the slot may be provided by time domain resource allocation information for the PUSCH.

It is noted that the aforementioned available-slot type configuration may be referred to as a different name. The existence of the available-slot type configuration in RRC configuration message may mean that the conditions in both the slot configuration procedure and the other procedure(s) are used for the determination of the available slots while the absence of the available-slot type configuration in RRC configuration message may mean that the conditions in the slot configuration procedure but not in the other procedure(s) are used for the determination of the available slots. Additionally and/or alternatively, the available-slot type configuration set to the first value (e.g. 'semi-static') may mean that the conditions in the slot configuration procedure but not in the other procedure(s) are used for the determination of the available slots while the available-slot type configuration set to the second value (e.g. 'dynamic') may mean that the conditions in both the slot configuration procedure and the other procedure(s) are used for the determination of the available slots.

Figure 9:
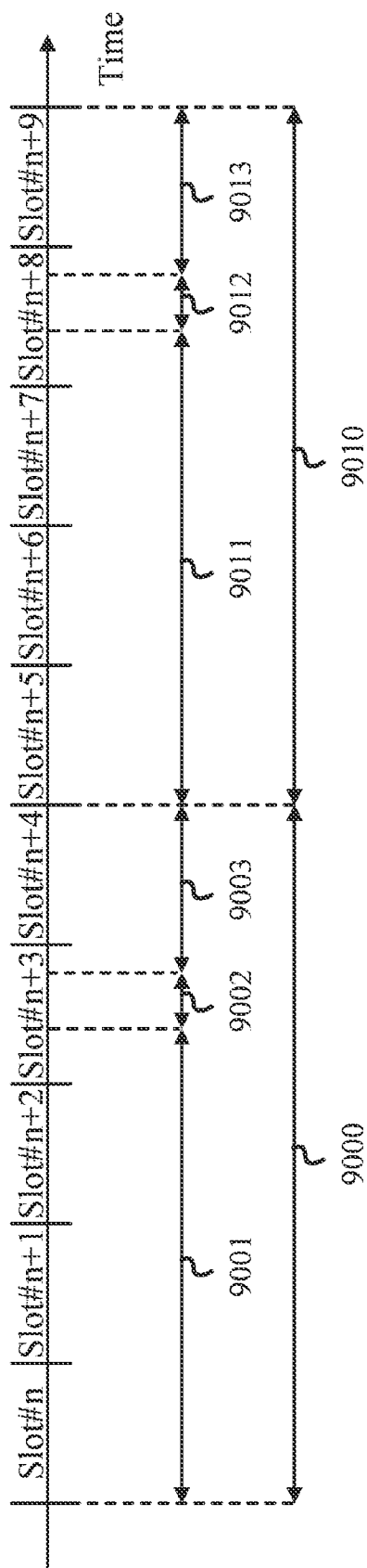
FIG. 9 is an example configuration of a frame structure according to an aspect of the present embodiment.

FIG. 9 is an example configuration of a frame structure according to an aspect of the present embodiment. In FIG. 9, a horizontal axis indicates time domain. In the time domain, slots are numbered from slot #n (slot with index n) in ascending order. Each line in the time domain indicates a slot boundary. 9001 indicates a downlink region. 9002 indicates a flexible region. 9003 indicates an uplink region.

Region indicated by 9000 includes a set of region 9001, 9002 and 9003. Region 9000 may be configured based on a slot configuration. For example, a slot configuration may include at least a downlink region, a flexible region and an uplink region. For example, a slot configuration may be configured such that the slot configuration starts at one UL-to-DL switching point. Further, the slot configuration may be configured such that the slot configuration ends at another UL-to-DL switching point. For example, a UL-to-DL switching point may be a point where a uplink region ends and a downlink region starts.

For example, a slot configuration may be repeated in the time domain. In FIG. 9, a slot configuration comprising 3 downlink slots, one special slot and 1 uplink slot is repeated. Region 9000 is an instance of the slot configuration starting at slot #n and an Region 9010 is an instance of the slot configuration starting at slot #n+5. In FIG. 9, repetition cycle of the slot configuration is 5 slots.

9011 indicates a downlink region. Further, 9012 indicates a flexible region. Further, 9013 indicates an uplink region.

For example, a slot configuration may be represented by a combination of 'D', 'U' and 'S'. 'D' indicates that a slot is a downlink slot. A downlink slot is a slot with downlink region. In FIG. 9, slot #n, slot #n+1, slot #n+2, slot #n+5, slot #n+6 and slot #n+7 are downlink slots.

'U' indicates that a slot is an uplink slot. An uplink slot is a slot with uplink region. In FIG. 9, slot #n+4 and slot #n+9 are uplink slots.

'S' indicates that a slot is a special slot. A special slot is a slot with at least two or more of a downlink regions, a flexible region and an uplink region. In FIG. 9, slot #n+3 and slot #n+8 are special slots.

In FIG. 9, the slot configuration may be also referred to as "DDDSU". "DDDSU" means that the slot configuration comprises 3 downlink slots, 1 special slot and 1 uplink slot.

A configuration of special slot may be represented by "XDYFZU". Here, X is the number of downlink symbols, Y is the number of flexible symbols and Z is the number of uplink symbols. For example, "10D2F2U" indicates that a special slot comprises 10 downlink symbols, 2 flexible symbols and 2 uplink symbols.

A downlink symbol is an OFDM symbol in a downlink region. A flexible symbol is an OFDM symbol in a flexible region. An uplink symbol is an OFDM symbol in an uplink region.

A slot configuration may be provided by RRC parameters. For example, a slot configuration may be configured by a common parameter included in system information such as SIB1. The common parameter may be also referred to as tdd-UL-DL-ConfigurationCommon.

For example, terminal device 1 may determine a reference subcarrier-spacing configuration $u_{ref}$ and a first TDD pattern from the common parameter. The first TDD pattern includes one or more of T1 to T5. T1 is a configuration period P in milliseconds provided by referenceSubcarrierSpacing. T2 is the number $d_{slots}$ of slots indicating consecutive downlink slots provided by nrofDownlinkSlots. T3 is the number $d_{symb}$ of consecutive downlink symbols provided by nrofDownlinkSymbols. T4 is the number $u_{slots}$ of consecutive uplink slots provided by nrofUplinkSlots. T5 is the number $u_{sym}$ of consecutive uplink symbols provided by nrofUplinkSymbols.

Figure 10:
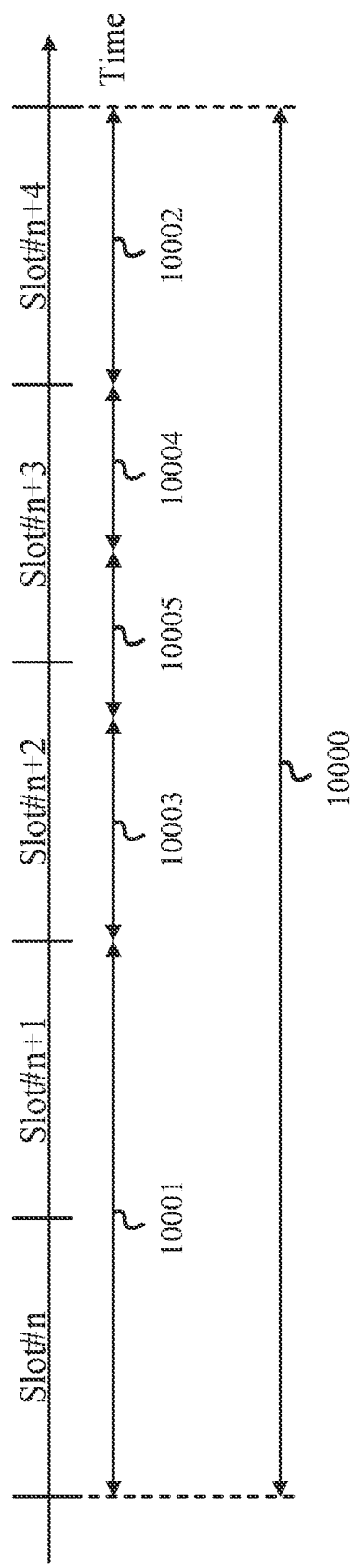
FIG. 10 is an example configuration of a slot configuration according to an aspect of the present embodiment.

FIG. 10 is an example configuration of a slot configuration according to an aspect of the present embodiment. In FIG. 10, a horizontal axis indicates time domain. In the time domain, slots are numbered from slot #n (slot with index n) in ascending order. Each line in the time domain indicates a slot boundary. 10000 indicates a slot configuration. In the slot configuration, first $d_{slots}$=2 slots as indicated by Region 10001 are configured as downlink slots. In the slot configuration, last $u_{slots}$=1 slot as indicated by Region 10002 is configured as an uplink slot. In the slot configuration, first $d_{sym}$ OFDM symbols starting at first OFDM symbol in a slot with index n+$d_{slots}$ as indicated by Region 10003 is configured as downlink symbols. In the slot configuration, last $u_{sym}$ OFDM symbols before first OFDM symbol in a slot with index n+S−$u_{slots}$ as indicated by Region 10004 is configured as uplink symbols. In the slot configuration, the remaining OFDM symbols not indicated as either downlink region or uplink region as indicated by Region 1005 are flexible symbols.

A slot configuration may be modified by a UE-specific parameter. The UE-specific parameter may be also referred to as tdd-UL-DL-ConfigurationDedicated.

If the UE-specific parameter is provided to terminal device 1, the UE-specific parameter may modify (or reconfigure) the slot configuration provided by the common parameter. For example, the UE-specific parameter may modify (or reconfigure) flexible region in the slot configuration.

For example, terminal device 1 may determine a list including a set of slot reconfigurations by the UE-specific parameter. In each slot reconfiguration in the set, at least one or both of an index of a slot and an indication of TDD pattern of the slot may be provided. The indication may indicate one out of 'all DL', 'all UL' and 'explicit'. In a case that 'all DL' is indicated for the slot, the slot configuration in the slot is reconfigured as downlink region. In a case that 'all UL' is indicated for the slot, the slot configuration in the slot is reconfigured as uplink region. In a case that 'explicit' is indicated for the slot, the slot configuration in the slot is reconfigured by explicit indication corresponding to 'explicit'. Indication 'explicit' corresponds to information indicating a TDD pattern in a slot. The information includes information indicating the number of downlink symbols starting at the beginning of the slot and information indicating the number of uplink symbols ending at the end of the slot. The remaining OFDM symbols between downlink symbols and uplink symbols are flexible symbols.

Terminal device 1 may receive a physical signal if terminal device 1 is configured by a higher layer or indicated by a DCI format to receive the physical signal in the downlink region.

Terminal device 1 may transmit a physical signal if terminal device 1 is configured by a higher layer or indicated by a DCI format to transmit the physical signal in the uplink region.

In a case that monitoring of DCI format 2_0 is not configured by a higher layer, terminal device 1 may receive a physical signal if terminal device 1 is indicated by a DCI format scheduling the physical channel to receive in the downlink region or the flexible region.

In a case that monitoring of DCI format 2_0 is not configured by a higher layer, terminal device 1 may transmit a physical signal if terminal device 1 is indicated by a DCI format scheduling the physical signal to transmit in the uplink region or the flexible region.

In a case that monitoring of DCI format 2_0 is configured by a higher layer, terminal device 1 may determine whether to receive a physical signal or not at least based on indication in the DCI format 2_0.

In a case that monitoring of DCI format 2_0 is configured by a higher layer, terminal device 1 may determine whether to transmit a physical signal or not at least based on indication in the DCI format 2_0.

Configuration regarding monitoring of DCI format 2_0 may include at least one or more of S1 to S3. S1 is an identifier of a serving cell. S2 is information indicating bit location of field for index of a slot format indicator. S3 is a set of slot format combinations. Here, each slot format combination may include one or more slot formats. Each of slot format combination may include an index of a slot format indicator. Each slot format may indicate a TDD pattern within a slot. For example, slot format #0 indicates that all OFDM symbols in a slot are downlink symbol. For example, slot format #1 indicates that all OFDM symbols in a slot are uplink symbol. For example, one slot format indicates that first 9 OFDM symbols in a slot are downlink symbol, next 3 OFDM symbols in the slot are flexible symbol and remaining 2 OFDM symbols are uplink symbol. For example, one slot format indicates that terminal device 1 interpret as if monitoring of DCI format 2_0 is not configured. Other TDD patterns in a slot are not precluded.

In a case that terminal device 1 detects a DCI format 2_0 in a first slot, terminal device 1 applies a slot format combination indicated through an index of slot format indicator in the DCI format 2_0. For example, the slot format combination may be applied to slots starting at the first slot.

At least based on an indication in DCI format 2_0, behavior of PUSCH transmission may be controlled. For example, a PUSCH transmission may be repetition of a PUSCH instance where the PUSCH instance is defined within a slot.

A PUSCH instance may be a unit of baseband signal generation. Here, the baseband signal generation may be performed by the baseband unit 13.

Figure 11:
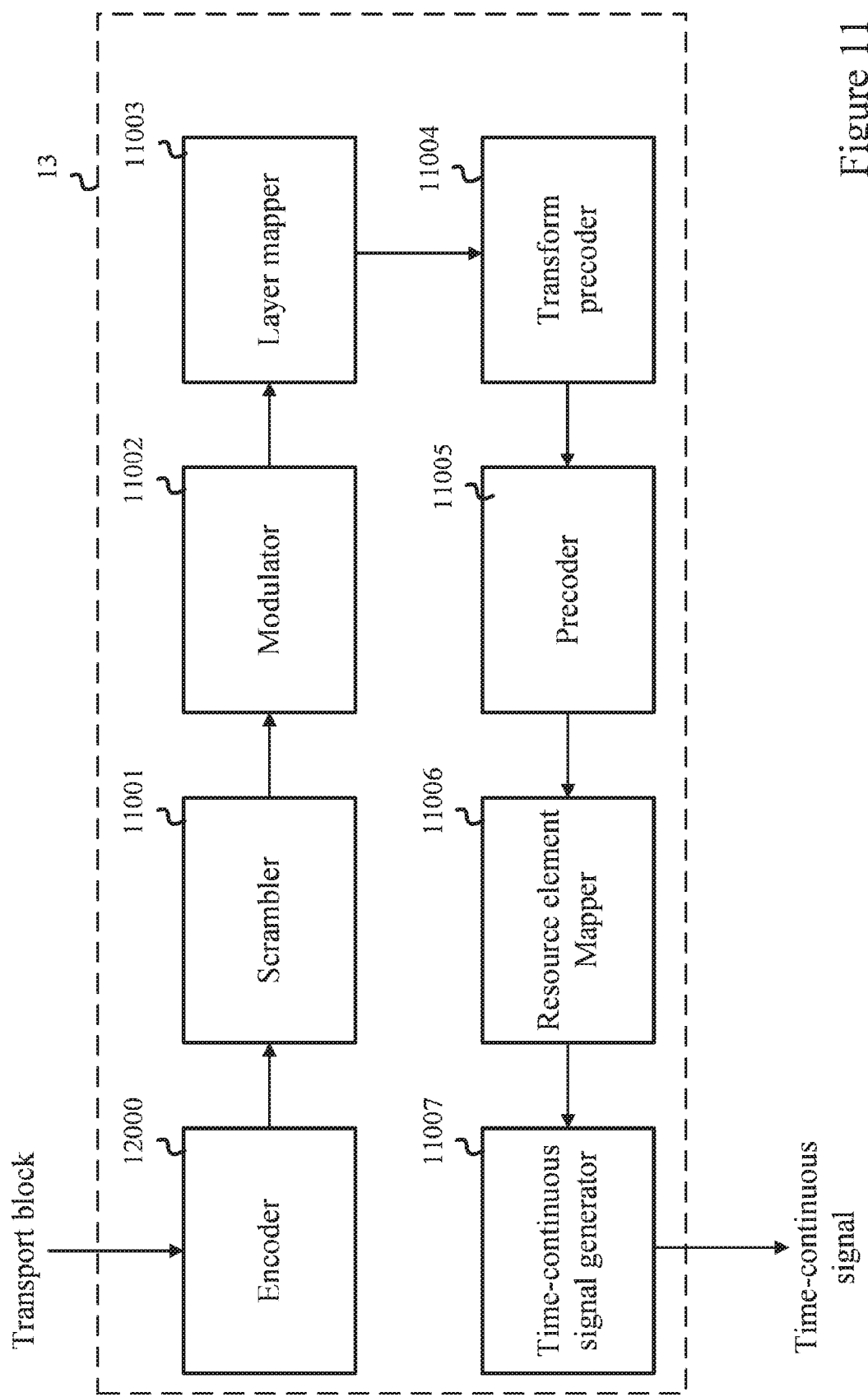
FIG. 11 is an example configuration of the baseband unit 13 in the wireless transmission unit 10a according to an aspect of the present embodiment.

FIG. 11 is an example configuration of the baseband unit 13 in the wireless transmission unit 10a according to an aspect of the present embodiment. The baseband unit 13 may include at least a part or all of Encoder 12000, Scrambler 11001, Modulator 11002, Layer mapper 11003, Transform precoder 11004, Precoder 11005, Resource element mapper 11006 and Time-continuous signal generator 11007.

A transport block may be provided to Encoder 12000 from a higher layer. For example, a transport block may be provided to Encoder 12000 through UL-SCH from MAC layer processing unit 15. Encoder 12000 processes the transport block into a sequence b of coded bits. The sequence of the coded bits may be provided to Scrambler 11001. An element in position k of the sequence b may be referred to as b(k). The position k is in the range from 0 to $M_{bit}-1$. The position k is represented by an integer number. The $M_{bit}$ represents the length of the sequence b.

For example, Scrambler 11001 may scramble the sequence b of the coded bits by using a pseudo-random code c. For example, the element b(k) may be scrambled by an element c(k) in position k of the pseudo-random code c. For example, Scrambler 11001 may output a sequence $b^a$ by calculating $b^a(k)=\text{mod}(b(k)+c(k), 2)$. The $b^a(k)$ is an element in position k of the sequence $b^a$. In a case that the baseband unit 13 doesn't include Scrambler 11001, the sequence b of the coded bits may be input to the $b_a$.

The pseudo-random code c may be a sequence of bits generated by Scrambler 11001. For example, the pseudo-random code c may be generated by an equation with initialization variable. The initialization variable may determine or control an output from the equation. The initialization variable may be determined at least based on RNTI used for scheduling an uplink transmission conveying the transport block.

For example, Modulator 11002 may perform a modulation to the sequence $b_a$ and generate a sequence d of complex-valued symbols. An element in position j of the sequence d is referred to as d(j). The position j is in the range from 0 to $M_{symb}-1$. The position j is represented by an integer number. The $M_{symb}$ represents the length of the sequence d. In a case that the baseband unit 13 doesn't include Modulator 12002, the sequence $b^a$ of the coded bits may be input to the d.

For example, the modulation may be 2/pi BPSK (Binary Phase Shift Keying), QPSK (Quadrature Phase Shift Keying), 16QAM (Quadrature Amplitude Modulation), 64QAM or 256QAM.

For example, Layer mapper 11003 may perform layer mapping to the sequence d. After layer mapping, $N_v$ sequences each with length $M^{layer}_{symb}$ are generated. The $N_v$ is the number of layers for the PUSCH. The $v^{th}$ sequence in the $N_v$ sequences is referred to as $x^{(v)}$. An element in position h of the sequence $x^{(v)}$ is referred to as $x^{(v)}(h)$. The position h is in the range from 0 to $M^{layer}_{symb}-1$. The position h is represented by an integer number. In a case that the number $N_v$ is 1, Layer mapper 11003 may not perform layer mapping. In a case that the layer mapping is not performed to the sequence d, the sequence d may be input to $x^{(0)}$.

For example, Transform precoder 11004 may perform a transform precoding to the sequence $x^{(v)}$ and generate a sequence $y^{(v)}$. In a case that the transform precoding is not performed to the sequence $x^{(v)}$, the sequence $x^{(v)}$ may be input to the sequence $y^{(v)}$.

For example, Precoder 11005 may perform a precoding to the sequence $y^{(v)}$. After the precoding, $N_p$ sequences each with length $M^{layer}_{symb}$ are generated. The $N_p$ is the number of antenna ports for the PUSCH. The $p^{th}$ sequence in the $N_p$ sequences is referred to as $z^{(p)}$. An element in position h of the sequence $z^{(p)}$ is referred to as $z^{(p)}(h)$. In a case that the number $N_p$ is 1, Precoder 11005 may not perform the precoding. In a case that the precoding is not performed to the sequence $y^{(v)}$, the sequence $y^{(v)}$ may be input to $z^{(p)}$.

For example, Resource element mapper 11006 may perform a RE mapping. In a RE mapping, a group of elements $z(h)=[z^{(0)}(h), \ldots, z^{(N_p-1)}(h)]$ is mapped to a resource element.

For example, Time-continuous signal generator 11007 may perform a time-continuous signal generation based on contents in the resource elements. The contents in the resource elements are determined based on the RE mapping. The time-continuous signal generated by Time-continuous signal generator 11007 is provided to RF unit 12.

The baseband unit 33 may include corresponding components for reception of the PUSCH as the baseband unit 13.

Figure 12:
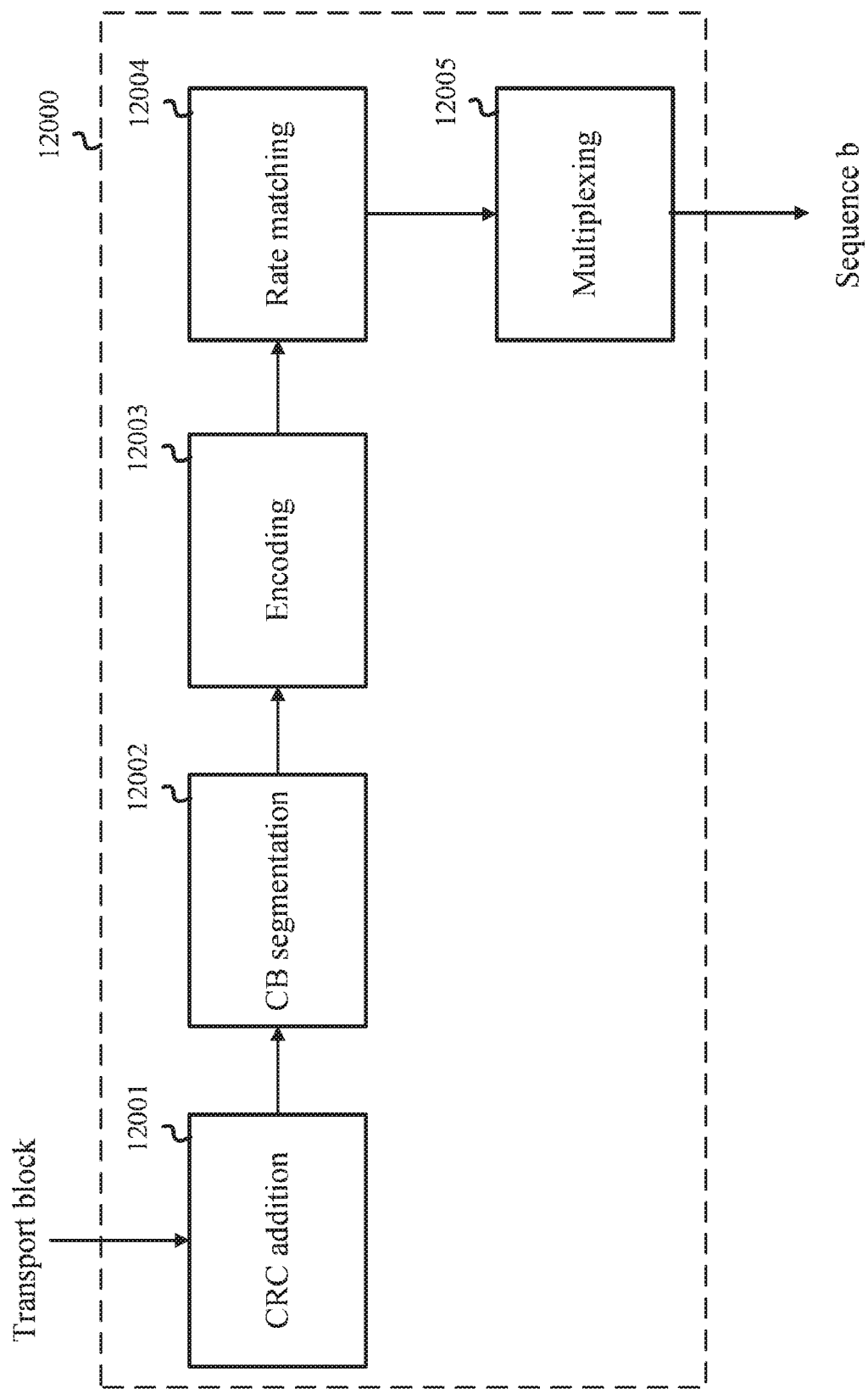
FIG. 12 is an example configuration of Encoder 12000 according to an aspect of the present embodiment.

FIG. 12 is an example configuration of Encoder 12000 according to an aspect of the present embodiment. Encoder 12000 may include at least a part or all of CRC addition unit 12001, CB segmentation unit 12002, Encoding unit 12003, Rate matching unit 12004 and Multiplexing unit 12005.

For example, a transport block input to Encoder 12000 is an input to CRC addition unit 12001. In CRC addition unit 12001, a CRC sequence is added to the transport block. A bit sequence after CRC sequence addition is input to Code block segmentation unit 12002. In a case that a CRC sequence is not added to the transport block, the transport block is input to Code block segmentation unit 12002.

For example, a sequence input to Code block segmentation unit 12002 is segmented into multiple code blocks in a case that the length of the sequence is larger than a certain value. In a case that the sequence is segmented into multiple code blocks, a CRC sequence is added to each code block. Each code block after the CRC sequence addition is input to Encoding unit 12003. In a case that the sequence is not segmented into multiple code blocks, a single code block is input to Encoding unit 12003. In a case that the sequence is not segmented into multiple code blocks, a CRC sequence is not added to the single code block. In a case that the sequence is not segmented into multiple code blocks, the single code block without addition of a CRC sequence is input to Encoding unit 12003.

For example, a code block with index r (code block #r) input to Encoding unit 12003 is encoded by LDPC coding such as QC-LDPC (Quasi-Cyclic Low Density Parity Check) coding. The index r is in the range from 0 to C−1. The C is the number of code blocks determined in Code block segmentation unit 12002. Coded bits $d^r$ for the code block #r after LDPC coding is input to Rate matching unit 12004.

For example, Rate matching unit 12004 performs a bit-selection procedure. In the bit-selection procedure, the coded bits $d^r$ for the code block r is written into a circular buffer of length $N_{cb}$.

FIG. 13 is an example of the bit-selection procedure according to an aspect of the present embodiment. In the bit-selection procedure, two values k and j are set to 0 as Step 0. Next, in Step 1, Rate matching unit 12004 checks if the value k is smaller than a rate matching output sequence length $E_r$. If the value k is smaller than the rate matching output sequence length $E_r$, Rate matching unit 12004 goes to Step 2. If the value k is not smaller than the rate matching output sequence length $E_r$, Rate matching unit 12004 terminates the bit-selection procedure.

Here, the rate matching output sequence length $E_r$ represents the number of available bits for transmission of the code block #r. For example, the rate matching output sequence length $E_r$ for code block #r may be calculated at least based on a part or all of modulation order $Q_m$, the number $N_v$ of layers for the PUSCH, the number C' and the number G. For example, the rate matching output sequence length $E_r$ for code block r may be calculated by $E_r = N_L Q_m \text{floor}(G/(N_L Q_m C'))$ or $E_r = N_L Q_m \text{ceil}(G/(N_L Q_m C'))$.

Here, the number C' represents the number of code blocks. The number G represents the number of available bits for transmission of UL-SCH. For example, the number G may represent the number of available bits for transmission of UL-SCH in the PUSCH instance.

In Step 2, Rate matching unit 12004 checks if $d^r(\text{mod}(k_0+j, N_{cb}))$ is not<NULL>. If $d^r(\text{mod}(k_0+j, N_{cb}))$ is not<NULL>, Rate matching unit 12004 goes to Step 3. If $d^r(\text{mod}(k_0+j, N_{cb}))$ is <NULL>, Rate matching unit 12004 goes to Step 5.

Here, "$d^r(\text{mod}(k_0+j, N_{cb}))$ is <NULL>" means <NULL> is set to $d^r(\text{mod}(k_0+j, N_{cb}))$. <NULL> may be set to some elements of $d^r$ when an element corresponds to a filler bit for LDPC coding.

Here, an element in position k of $d^r$ is referred to as $d^r(k)$.

In Step 3, Rate matching unit 12004 sets a value in $d^r(\text{mod}(k_0+j, N_{cb}))$ to e(k). The sequence e is a rate matching output sequence. An element in position k of the sequence e is referred to as e(k).

Here, $k_0$ represents a starting point for the circular buffer.

In Step 4, Rate matching unit 12004 increments a value k by one.

Step 5 is a sign of the end of Step 2.

In Step 6, Rate matching unit 12004 increments a value j by one.

Step 7 is a sign of the end of Step 1. Rate matching unit 12004 goes back to Step 1.

Figure 14:
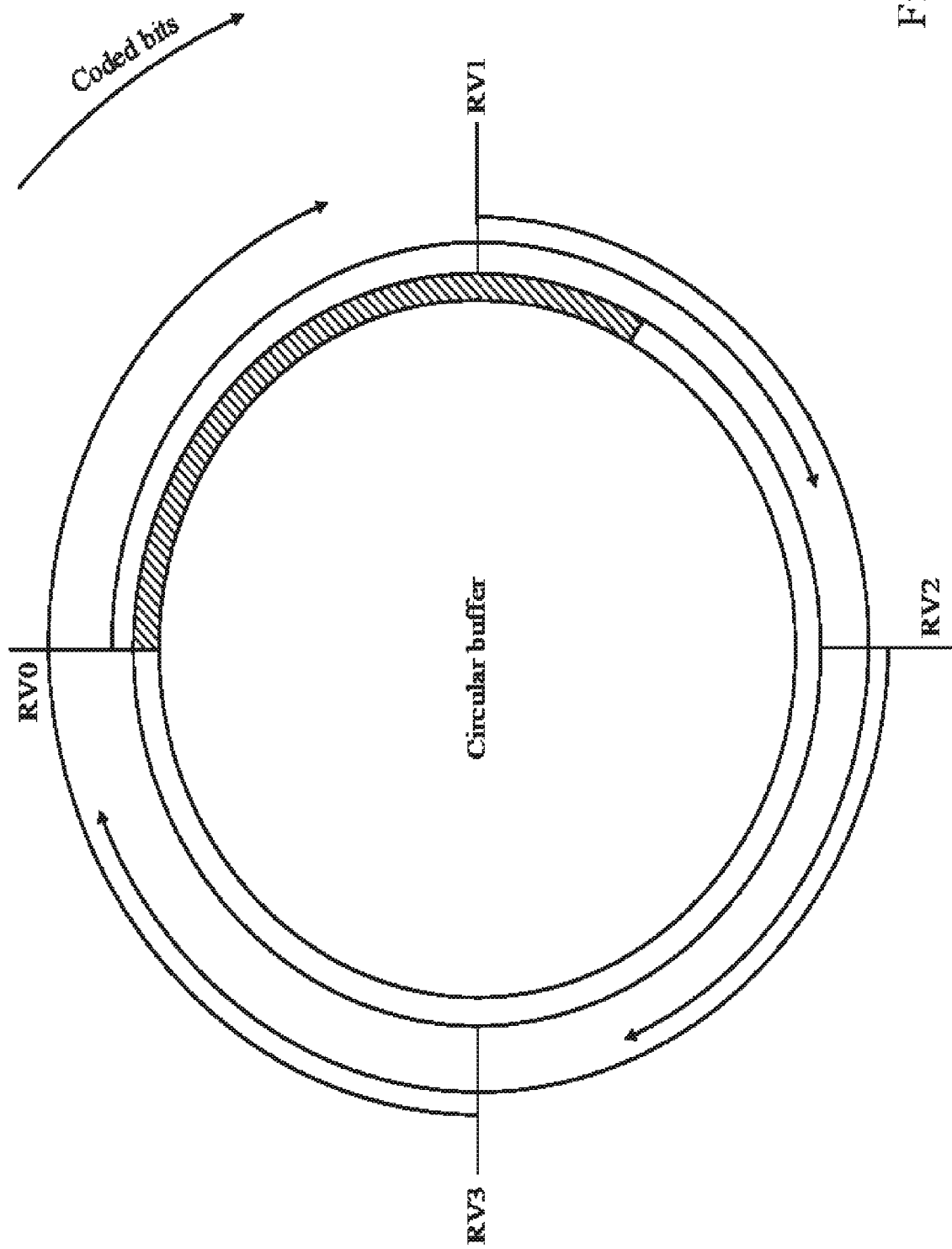
FIG. 14 is an example of a circular buffer according to an aspect of the present embodiment.

FIG. 14 is an example of a circular buffer according to an aspect of the present embodiment. In the circular buffer, the coded bits $d^r$ are mapped clockwise starting at position indicated by RV0. Since the coded bits $d^r$ includes systematic bits followed by parity bits, the systematic bits are mapped starting at the position indicated by RV0 and the parity bits are mapped starting at the end of the systematic bits. The region indicated by the upper right diagonal line is filled with the systematic bits. The region indicated by the lattice line is filled with the parity bits.

In the bit-selection procedure, bits in the circular buffer are read out starting at the starting point $k_0$ with length $E_r$. The bits read out from the circular buffer are written into the rate matching output sequence e.

The starting point $k_0$ is determined based on the redundancy version indicated or determined by a redundancy version field in an uplink DCI format for dynamic scheduling.

For example, the starting point $k_0$ may be determined based on the redundancy version and an identification of an instance. For example, in a case that one DCI format schedules a repetition of a PUSCH, terminal device 1 may transmit multiple instances. For each instance, the starting point $k_0$ may be determined. For example, in a case that 8 instances (instance #0, instance #1, instance #2, instance #3, instance #4, instance #5, instance #6, instance #7) are scheduled by one DCI format, the starting point $k_0$ may be determined 8 times.

For example, a sequence of RV (redundancy version) may be provided to the terminal device 1. In a case that a sequence of RV is provided, a RV is allocated to each instance in the multiple instances based on the sequence. For example, in a case that the sequence [0, 2, 3, 1] of length $N_s$ is provided, $(\mod(n, N_s)+1)^{th}$ value in the sequence may be allocated to $n^{th}$ instance. The starting point $k_0$ of $n^{th}$ instance may be determined based on the allocated RV for nm instance.

Figure 15:
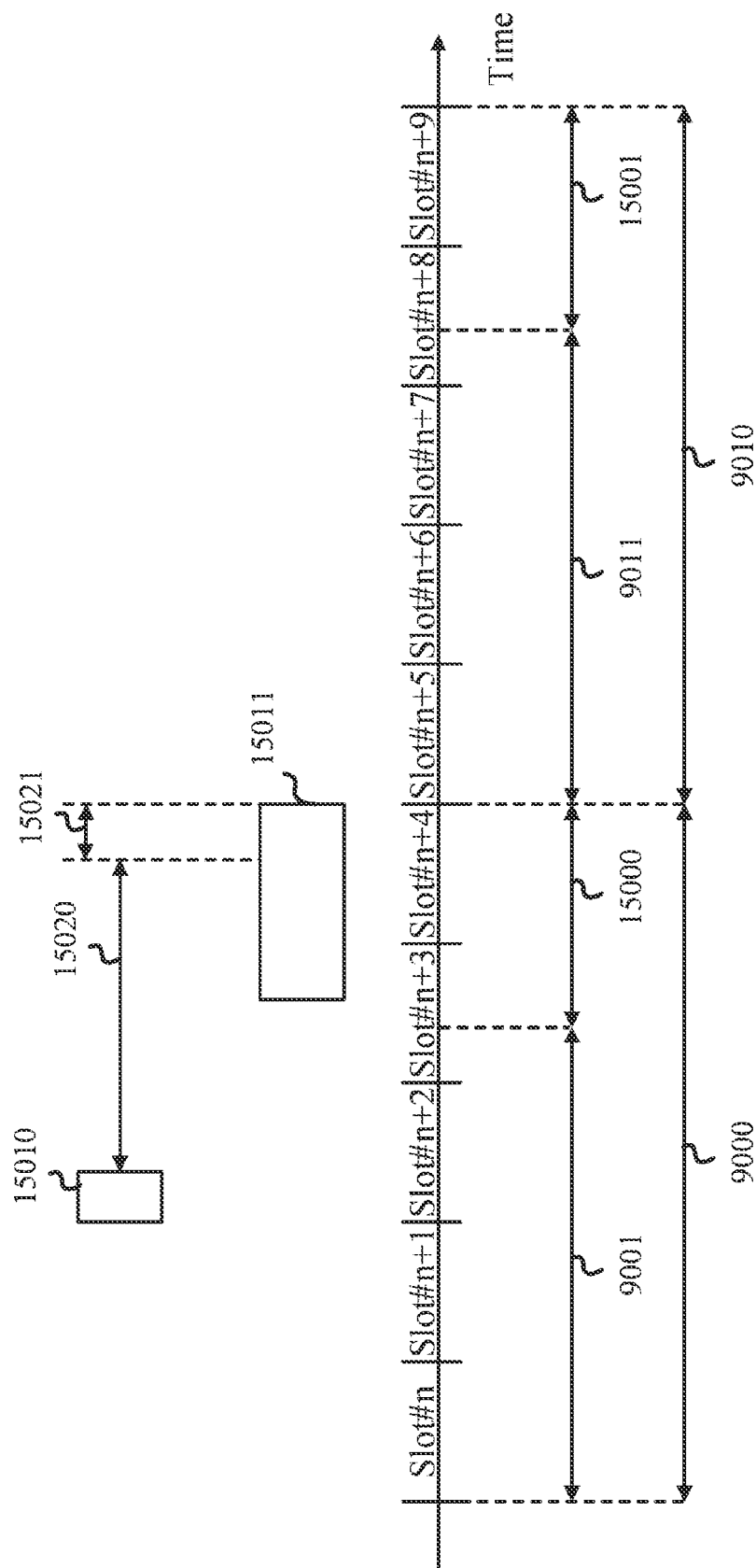
FIG. 15 is an example configuration of a processing timeline according to an aspect of the present embodiment.

FIG. 15 is an example configuration of first type repetition of a PUSCH scheduled by a DCI format in multiple slots according to an aspect of the present embodiment. In FIG. 15, 15000 indicates a PDCCH with a DCI format which schedules a PUSCH with a first type repetition. It is assumed that the first type repetition is scheduled in slots starting at slot #n+3 in FIG. 15. 15001 indicates an instance of the PUSCH in slot #n+3. Here, a value S indicates a starting OFDM symbol index within the slot for the instance 15001. Also, a value L indicates a length in terms of the number of OFDM symbols for the instance 15001. 6 instances indicated by 15002 to 15007 are followed by the instance 15001. Each instance is mapped within a slot. In FIG. 15, it is assumed that the number $K_{rep}$ of repetitions is 7.

A TDRA field in the DCI format may provide a value S and a value L.

In FIG. 15, the S is applied to all the instances for the PUSCH. For example, all the instances apply the same starting OFDM symbol index within a slot. In FIG. 15, the L is applied to all the instances for the PUSCH. For example, all the instances apply the same length in terms of the number of OFDM symbols.

In a first type repetition, multiple instances for a PUSCH may be allocated on $K_{rep}$ continuous slots starting at a slot determined by a DCI format scheduling the PUSCH. For example, in a case that a DCI format scheduling the PUSCH includes a TDRA field, the TDRA field may provide a value K for determining the starting slot for the PUSCH. For example, the value K is in unit of slots. For example, the terminal device 1 may determine the starting slot as slot #(n+K) in a case that a PDCCH including the DCI format is detected in slot #n. In a case that the DCI format doesn't include a TDRA field, the value K may be provided by a RRC layer through a RRC parameter.

A sequence of RV for the first type repetition may be provided to the terminal device 1. For example, the sequence may be provided by a RRC layer through a RRC parameter. In a case that a sequence of RV is provided for the first type repetition, $(\mod(n, N_s)+1)^{th}$ value in the sequence may be allocated to nm instance. Here, an index may be provided to each instance for the PUSCH in ascending order in the time domain.

For a first type repetition, in a case that an instance overlaps with a downlink symbol determined by a slot configuration, transmission of the instance may be omitted (or dropped, cancelled, not transmitted).

For a first type repetition, in a case that an instance overlaps with a downlink symbol determined by a slot format, transmission of the instance may be omitted.

For a first type repetition, in a case that an instance overlaps with another uplink signal with a higher priority than the priority for the PUSCH, transmission of the instance may be omitted. For example, the uplink signal may be a second PUSCH with higher priority than the priority of the PUSCH. For example, the priority for a PUSCH may be provided by a DCI format scheduling the PUSCH.

Figure 16:
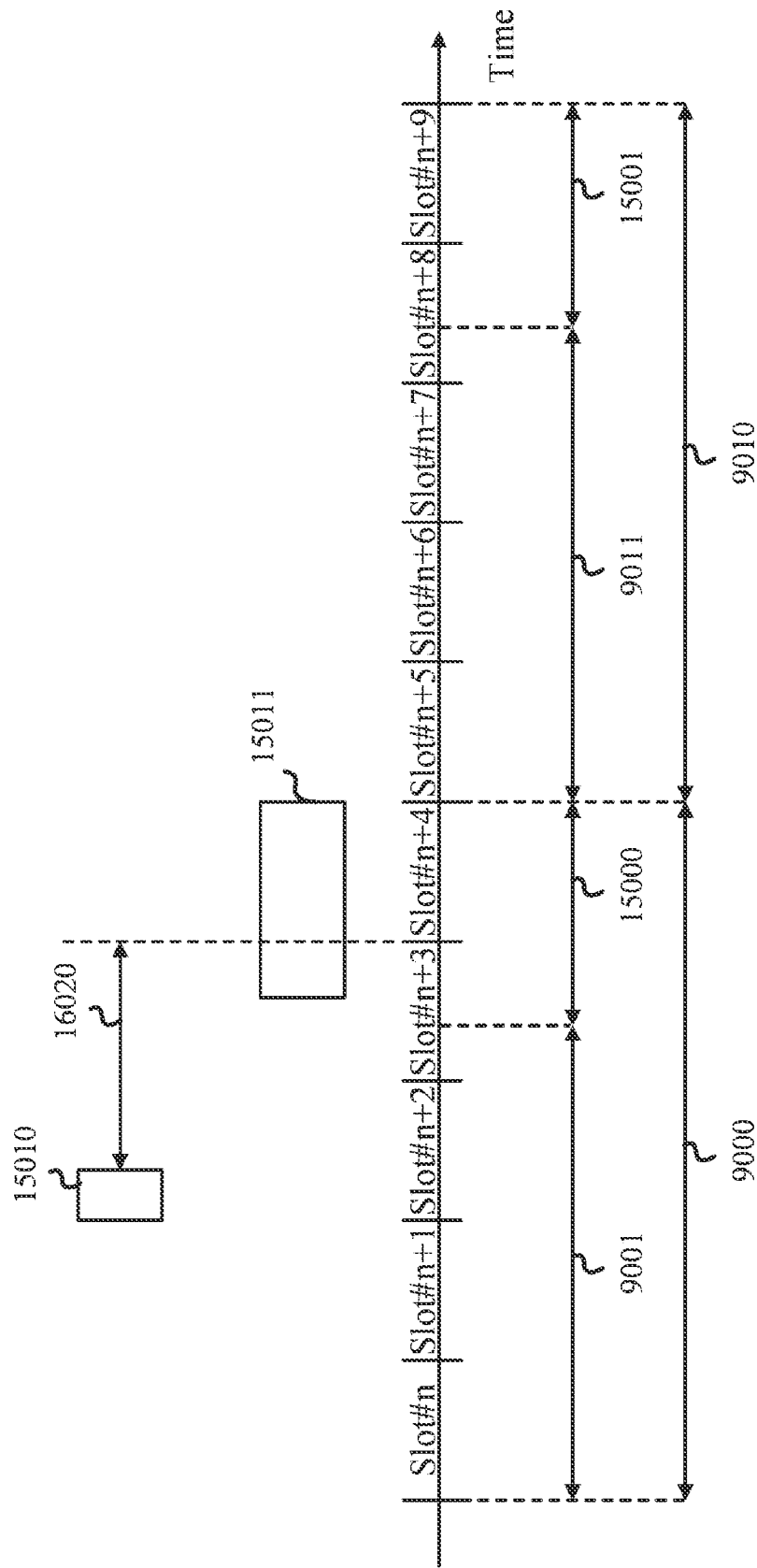
FIG. 16 is an example configuration of a processing timeline according to an aspect of the present embodiment.

FIG. 16 is an example configuration of second type repetition of a PUSCH scheduled by a DCI format in multiple slots according to an aspect of the present embodiment. In FIG. 16, 16000 indicates a PDCCH with a DCI format which schedules a PUSCH with a second type repetition. It is assumed that the second type repetition is scheduled in slots starting at slot #n+3. 16001 indicates an instance of the PUSCH in slot #n+3. Here, a value S indicates a starting OFDM symbol index within the slot for the instance. Also, a value L indicates a length in terms of the number of OFDM symbols for the instance. 3 instances indicated by 16002 to 16004 are followed by the instance 16001. Each instance is mapped within a slot. In FIG. 16, it is assumed that the number $K_{rep}$ of repetitions is 4.

In FIG. 16, S is applied to all instances for the PUSCH. For example, all instances apply the same starting OFDM symbol index within a slot. In FIG. 16, L is applied to all instances for the PUSCH. For example, all instances apply the same length in terms of the number of OFDM symbols.

In a second type repetition, the multiple instances for a PUSCH may be allocated on $K_{rep}$ continuous available slots starting at a slot determined by a DCI format scheduling the PUSCH. For example, in a case that a DCI format scheduling the PUSCH includes a TDRA field, the TDRA field may provide a value K for determining the starting slot for the PUSCH. For example, the value K is in unit of slots. For example, in a case that the terminal device 1 may determine the starting slot as slot #(n+K). In a case that the DCI format doesn't include a TDRA field, the value K may be provided by a RRC layer through a RRC parameter.

In a second type repetition, $K_{rep}$ continuous available slots may be determined by a slot configuration. For example, a slot may be available in a case that a set of OFDM symbols allocated for an instance in the slot doesn't overlap with any downlink symbol which is determined by a slot configuration. For example, a slot may be available in a case that a set of OFDM symbols determined by a value S and a value L in the slot doesn't overlap with any downlink symbol which is determined by a slot configuration. The value S and the value L may be provided by the TDRA field in the DCI format. In FIG. 16, slot #n+3 is available for a second type repetition since the set of OFDM symbols allocated for the instance 16001 doesn't overlap with 9001. In other words, slot #n+3 is available for a second type repetition since each OFDM symbol allocated for the instance 16001 overlaps with 9002 or 9003. In FIG. 16, slot #n+4 is available for a second type repetition since the set of OFDM symbols allocated for the instance 16002 doesn't overlap with 9001. In other words, slot #n+4 is available for a second type repetition since each OFDM symbols allocated for the instance 16002 overlaps with 9003. In FIG. 16, slot #n+5 is not available for a second type repetition since the set of OFDM symbols determined by the value S and the value L overlaps with 9011. In other words, slot #n+5 is not available for a second type repetition since some OFDM symbols determined by the value S and the value L doesn't overlap with 9002 or 9003.

A sequence of RV may be provided for the second type repetition to the terminal device 1. For example, the sequence may be provided by a RRC layer through a RRC parameter. In a case that a sequence of RV is provided for the second type repetition, $(\mod(n, N_s)+1)^{th}$ value in the sequence may be allocated to $n^{th}$ instance. Here, an index may be provided to each instance for the PUSCH in ascending order in the time domain.

For example, a first sequence of RV and a second sequence of RV may be provided to the terminal device 1. For example, the first sequence may be used for a first type repetition. For example, the second sequence may be used for a second type repetition.

For example, the first sequence may be provided by a RRC layer through a first RRC parameter. For example, the second sequence may be provided by a RRC layer through a second RRC parameter which is different from the first RRC parameter.

For a second type repetition, in a case that an instance overlaps with a downlink symbol determined by a slot configuration, transmission of the instance may be omitted. On the other hand, for a second type repetition, there may be no case that an instance overlaps with a downlink symbol determined by a slot configuration since the collision handling with the downlink symbol by the slot configuration may have been done already in a procedure of determining the $K_{rep}$ continuous available slots. Therefore, for a second type repetition, transmission of the instance may not be omitted based on the slot configuration. For example, for a second type repetition, the terminal device 1 may not determine, based on the slot configuration, whether an instance is omitted or not. For example, the terminal device 1 may not perform a process of determining, based on the slot configuration, whether an instance is omitted or not.

For a second type repetition, in a case that an instance overlaps with a downlink symbol determined by a slot format, transmission of the instance may be omitted.

For a second type repetition, in a case that an instance overlaps with another uplink signal with a higher priority than the priority for the PUSCH, transmission of the instance may be omitted. For example, the uplink signal may be a second PUSCH with higher priority than the priority of the PUSCH. For example, the priority for a PUSCH may be provided by a DCI format scheduling the PUSCH.

A third type repetition is described with FIG. 16 assuming $K_{rep}=3$.

In a third type repetition, multiple instances for a PUSCH may be allocated on continuous available slots starting at a slot determined by a DCI format scheduling the PUSCH.

In a third type repetition, the continuous available slots may be determined by a slot configuration. For example, a slot may be available in a case that a set of OFDM symbols allocated for an instance in the slot doesn't overlap with any downlink symbol which is determined by a slot configuration. For example, a slot may be available in a case that a set of OFDM symbols determined by a value S and a value L provided by the TDRA field in the DCI format in the slot doesn't overlap with any downlink symbol which is determined by a slot configuration. In FIG. 16, slot #n+3 is available for a third type repetition since the set of OFDM symbols allocated for the instance 16001 doesn't overlap with 9001. In other words, slot #n+3 is available for a third type repetition since each OFDM symbol allocated for the instance 16001 overlaps with 9002 or 9003. In FIG. 16, slot #n+4 is available for a third type repetition since the set of OFDM symbols allocated for the instance 16002 doesn't overlap with 9001. In other words, slot #n+4 is available for a third type repetition since each OFDM symbol allocated for the instance 16002 overlaps with 9003. In FIG. 16, slot #n+5 is not available for a third type repetition since the set of OFDM symbols determined by the value S and the value L overlaps with 9011. In other words, slot #n+5 is not available for a third type repetition since some OFDM symbols determined by the value S and the value L doesn't overlap with 9002 or 9003.

A sequence of RV may be provided for the third type repetition to the terminal device 1. For example, the sequence may be provided by a RRC layer through a RRC parameter. In a case that a sequence of RV is provided for the third type repetition, $(\mod (n, N_s)+1)^{th}$ value in the sequence may be allocated to $n^{th}$ instance. For example, a first sequence of RV and a third sequence of RV may be provided to the terminal device 1. For example, the first sequence may be used for a first type repetition. For example, the third sequence may be used for a third type repetition.

For example, the first sequence may be provided by a RRC layer through a first RRC parameter. For example, the third sequence may be provided by a RRC layer through a third RRC parameter which is different from the first RRC parameter.

For a third type repetition, in a case that an instance overlaps with a downlink symbol determined by a slot configuration, transmission of the instance may be omitted. On the other hand, for a third type repetition, there may be no case that an instance overlaps with a downlink symbol determined by a slot configuration since the collision handling with the downlink symbol by the slot configuration may have been done already in a procedure of determining the continuous available slots. Therefore, for a third type repetition, transmission of the instance may not be omitted based on the slot configuration. For example, for a third type repetition, the terminal device 1 may not determine, based on the slot configuration, whether an instance is omitted or not. For example, the terminal device 1 may not perform a process of determining, based on the slot configuration, whether an instance is omitted or not.

For a third type repetition, in a case that an instance overlaps with a downlink symbol determined by a slot format, transmission of the instance may be omitted.

For a third type repetition, in a case that an instance overlaps with another uplink signal with a higher priority than the priority for the PUSCH, transmission of the instance may be omitted. For example, the uplink signal may be a second PUSCH with higher priority than the priority of the PUSCH. For example, the priority for a PUSCH may be provided by a DCI format scheduling the PUSCH.

For a third type repetition, first $K_{rep}$ instances are determined for the PUSCH transmission. For example, in a case that no instances are omitted, the terminal device may determine that the instance 16001, 16002, and 16003 as the first $K_{rep}$ instances. For example, in a case that the instance 16002 is omitted due to the collision with the high priority signal, the terminal device determines that the instance 16001, 16003 and 16004 as the first $K_{rep}$ instances. For example, in a case that the instance 16003 is omitted due to the collision with the high priority signal, the terminal device determines that the instance 16001, 16002 and 16004 as the first $K_{rep}$ instances.

A fourth type repetition is described with FIG. 16 assuming $K_{rep}=3$.

In a fourth type repetition, multiple instances for a PUSCH may be allocated on continuous available slots starting at a slot determined by a DCI format scheduling the PUSCH.

In a fourth type repetition, the continuous available slots may be determined by a slot configuration. For example, a slot may be available in a case that a set of OFDM symbols allocated for an instance in the slot doesn't overlap with any downlink symbol which is determined by a slot configuration. For example, a slot may be available in a case that a set of OFDM symbols determined by a value S and a value L provided by the TDRA field in the DCI format in the slot doesn't overlap with any downlink symbol which is determined by a slot configuration. In FIG. 16, slot #n+3 is available for a fourth type repetition since the set of OFDM symbols allocated for the instance 16001 doesn't overlap with 9001. In other words, slot #n+3 is available for a fourth type repetition since each OFDM symbol allocated for the instance 16001 overlaps with 9002 or 9003. In FIG. 16, slot #n+4 is available for a fourth type repetition since the set of OFDM symbols allocated for the instance 16002 doesn't overlap with 9001. In other words, slot #n+4 is available for a fourth type repetition since each OFDM symbol allocated for the instance 16002 overlaps with 9003. In FIG. 16, slot #n+5 is not available for a fourth type repetition since the set of OFDM symbols determined by the value S and the value L overlaps with 9011. In other words, slot #n+5 is not available for a fourth type repetition since some OFDM symbols determined by the value S and the value L doesn't overlap with 9002 or 9003.

Before determining a RV for each instance, the terminal device 1 may determine whether one or more instances are omitted or not. For example, in a case that no instances are omitted, the terminal device may determine that the instance 16001, 16002, and 16003 as the first $K_{rep}$ instances. For example, in a case due to the instance 16002 is omitted due to the collision with the high priority signal, the terminal device determines that the instance 16001, 16003 and 16004 as the first $K_{rep}$ instances. For example, in a case that the instance 16003 is omitted due to the collision with the high priority signal, the terminal device determines that the instance 16001, 16002 and 16004 as the first $K_{rep}$ instances.

A sequence of RV may be provided for the fourth type repetition to the terminal device 1. For example, the sequence may be provided by a RRC layer through a RRC parameter. In a case that a sequence of RV is provided for the fourth type repetition, $(mod(n, N_s)+1)^{th}$ value in the sequence may be allocated to $n^{th}$ instance within the first $K_{rep}$ instances. For example, a first sequence of RV and a fourth sequence of RV may be provided to the terminal device 1. For example, the first sequence may be used for a first type repetition. For example, the fourth sequence may be used for a fourth type repetition.

For example, the first sequence may be provided by a RRC layer through a first RRC parameter. For example, the fourth sequence may be provided by a RRC layer through a fourth RRC parameter which is different from the first RRC parameter.

For a fourth type repetition, in a case that an instance overlaps with a downlink symbol determined by a slot configuration, transmission of the instance may be omitted. On the other hand, for a fourth type repetition, there may be no case that an instance overlaps with a downlink symbol determined by a slot configuration since the collision handling with the downlink symbol by the slot configuration may have been done already in a procedure of determining the continuous available slots. Therefore, for a fourth type repetition, transmission of the instance may not be omitted based on the slot configuration. For example, for a fourth type repetition, the terminal device 1 may not determine, based on the slot configuration, whether an instance is omitted or not. For example, the terminal device 1 may not perform a process of determining, based on the slot configuration, whether an instance is omitted or not.

For a fourth type repetition, in a case that an instance overlaps with a downlink symbol determined by a slot format, transmission of the instance may be omitted.

For a fourth type repetition, in a case that an instance overlaps with another uplink signal with a higher priority than the priority for the PUSCH, transmission of the instance may be omitted. For example, the uplink signal may be a second PUSCH with higher priority than the priority of the PUSCH. For example, the priority for a PUSCH may be provided by a DCI format scheduling the PUSCH.

For a fourth type repetition, the first $K_{rep}$ instances are transmitted for the PUSCH transmission.

Figure 17:
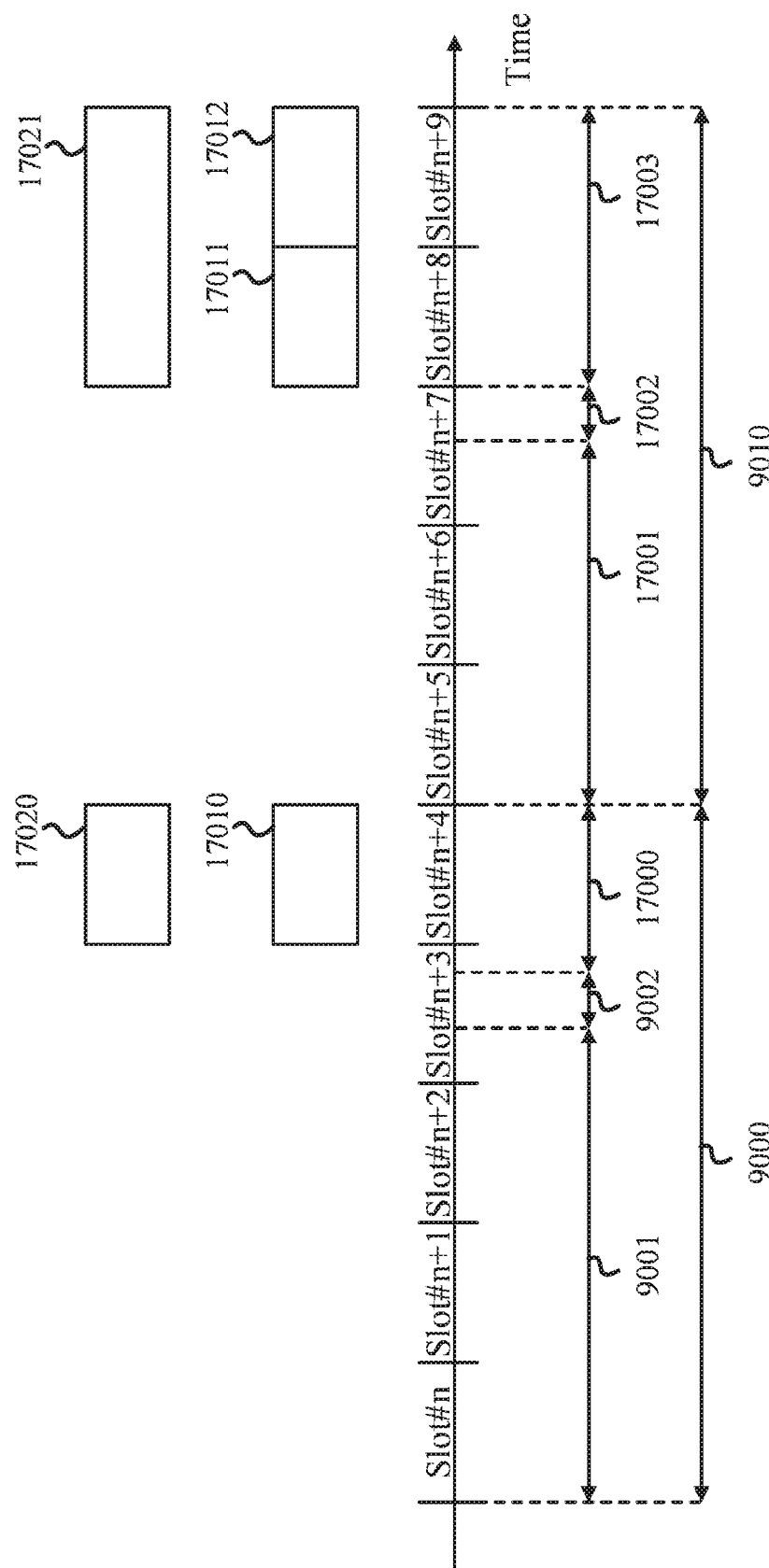
FIG. 17 is an example configuration of a third type of PUSCH transmission in multiple slots according to an aspect of the present embodiment.

FIG. 17 is an example configuration of first type repetition of a PUSCH with a configured grant in multiple slots according to an aspect of the present embodiment. In FIG. 17, 17010 indicates a period for a configured grant. 17011 indicates a period for a configured grant. Periods 17010 and 17011 are configured periodically. A configured grant occurs in a starting OFDM symbol of the period 17010. In a case that a configured grant occurs in a starting OFDM symbol of the period 17010, it is assumed that the first type repetition is scheduled in slots starting at slot #n+3 where slot #n+3 includes the starting OFDM symbol. 17001 indicates an instance of the PUSCH in slot #n+3. Here, a value S indicates a starting OFDM symbol index within the slot for the instance 17001. Also, a value L indicates a length in terms of the number of OFDM symbols for the instance 17001. 5 instances indicated by 17002 to 17006 are followed by the instance 17001. Each instance is mapped within a slot. In FIG. 17, it is assumed that the number $K_{rep}$ of repetitions is 6.

Here, the PUSCH is associated with the period 17010. Also, the PUSCH is associated with the instances 17001 to 17006.

For example, a value S and a value L may be provided by a RRC layer via a RRC parameter. For example, a value S and a value L may be provided by a TDRA field in a DCI format which activates a configured grant operation.

17007 indicates an instance of another PUSCH. The instance 17007 is not a part of repetitions for the PUSCH within the period 17010. The instance 17007 is a first instance for another PUSCH within the period 17011. Here, a period may define a time occasion which includes a number of repetitions for a single PUSCH. For example, if two instances are included in different periods, the two instances are associated with different PUSCH.

Here, another PUSCH is associated with the period 17011. Also, another PUSCH is associated with the instances 17001 to 17006.

A PUSCH with instances which occur within a period is associated with the period. The PUSCH is associated with the instances.

In FIG. 17, the S is applied to all the instances for the PUSCH. For example, all the instances apply the same starting OFDM symbol index within a slot. In FIG. 17, the L is applied to all the instances for the PUSCH. For example, all the instances apply the same length in terms of the number of OFDM symbols.

In a first type repetition, multiple instances for a PUSCH may be allocated on $K_{rep}$ continuous slots starting at a slot including a starting OFDM symbol of a period.

Figure 18:
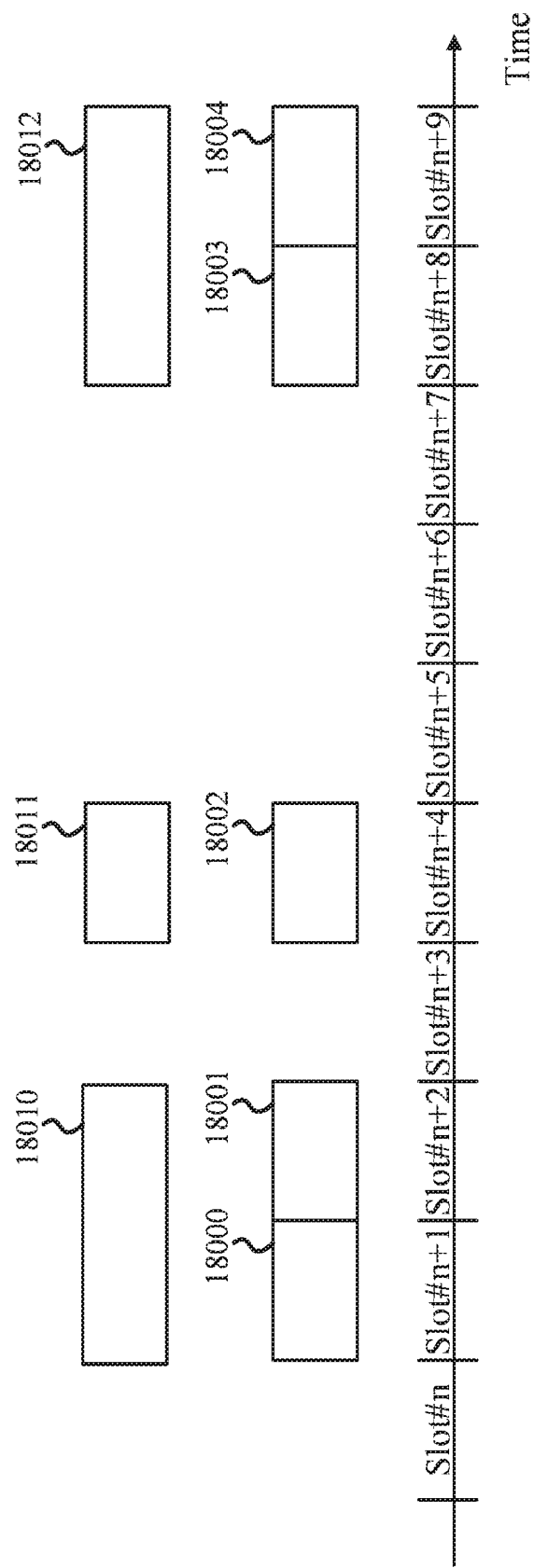
FIG. 18 is an example configuration of multiple instances in a third type of PUSCH transmission in multiple slots according to an aspect of the present embodiment.

FIG. 18 is an example configuration of second type repetition of a PUSCH with a configured grant in multiple slots according to an aspect of the present embodiment. In FIG. 18, 18001 indicates an instance of the PUSCH in slot #n+3. Here, a value S indicates a starting OFDM symbol index within the slot for the instance. Also, a value L indicates a length in terms of the number of OFDM symbols for the instance. 2 instances indicated by 18002 and 18003 are followed by the instance 18001. Each instance is mapped within a slot.

In FIG. 18, it is assumed that the number $K_{rep}$ of repetitions is 4. On the other hand, the instance 18004 is not associated with the PUSCH. The instance 18004 is a first instance associated with another PUSCH within the period 17011.

For example, for a second type repetition, a set of instances for a PUSCH associated with a period may be determined based on the number $K_{rep}$ and the period. For example, in a case that an instance for a PUSCH is out of the period associated with the PUSCH, the instance may be excluded from the set of instances for the PUSCH. For example, the $K_{rep}$ indicates a maximum value for the number of instances for a PUSCH and instances are mapped within the period such that the number of the instances doesn't exceed the number $K_{rep}$.

In FIG. 18, a value S is applied to all instances for the PUSCH. For example, all instances apply the same starting OFDM symbol index within a slot. In FIG. 18, a value L is applied to all instances for the PUSCH. For example, all instances apply the same length in terms of the number of OFDM symbols.

In a second type repetition, the multiple instances for a PUSCH may be allocated on continuous available slots starting at a slot including a starting OFDM symbol of a period associated with the PUSCH.

A third type repetition is described with FIG. 18 assuming $K_{rep}$=4.

In a third type repetition, multiple instances for a PUSCH may be allocated on continuous available slots starting at a slot including a starting OFDM symbol of the period associated with the PUSCH.

For example, for a third type repetition, a set of instances for a PUSCH associated with a period may be determined based on the number $K_{rep}$ and the period. For example, in a case that an instance for a PUSCH is out of the period associated with the PUSCH, the instance may be excluded from the set of instances for the PUSCH. For example, the $K_{rep}$ indicates a maximum value for the number of instances for a PUSCH and instances are mapped within the period such that the number of the instances doesn't exceed the number $K_{rep}$.

A fourth type repetition is described with FIG. 16 assuming $K_{rep}$=4.

In a fourth type repetition, multiple instances for a PUSCH may be allocated on continuous available slots starting at a slot including a starting OFDM symbol of the period associated with the PUSCH.

Figure 19:
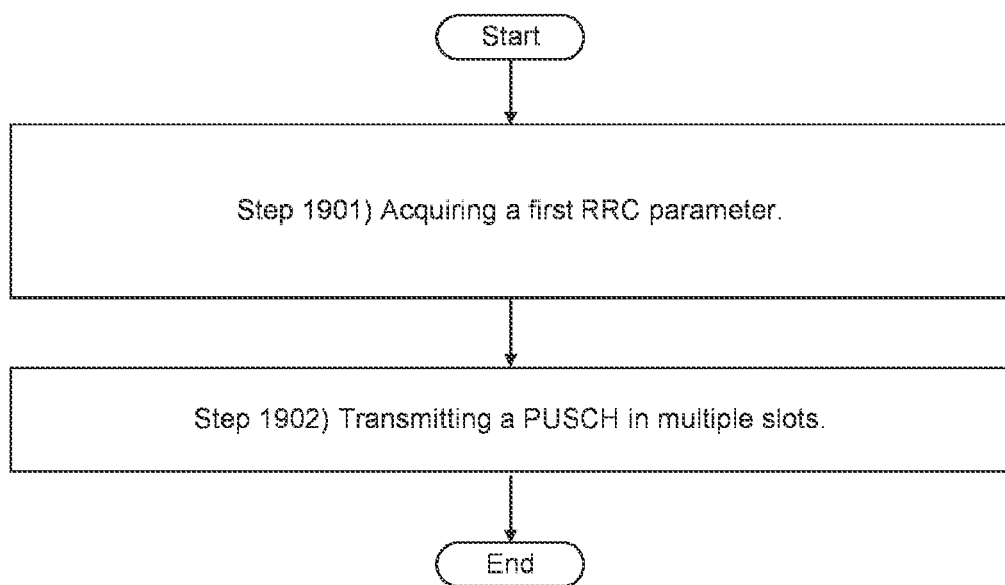
FIG. 19 is an example of a method for a UE.

FIG. 19 shows an example of a method for a UE. The method may comprise acquiring a first RRC parameter (Step 1901) and transmitting a PUSCH in multiple slots (Step 1902). If the first RRC parameter is set to a first value, conditions in a slot format procedure may not be used for determination of the multiple slots. If the first RRC parameter is set to a second value, the conditions in the slot format procedure may be used for the determination of the multiple slots.

Figure 20:
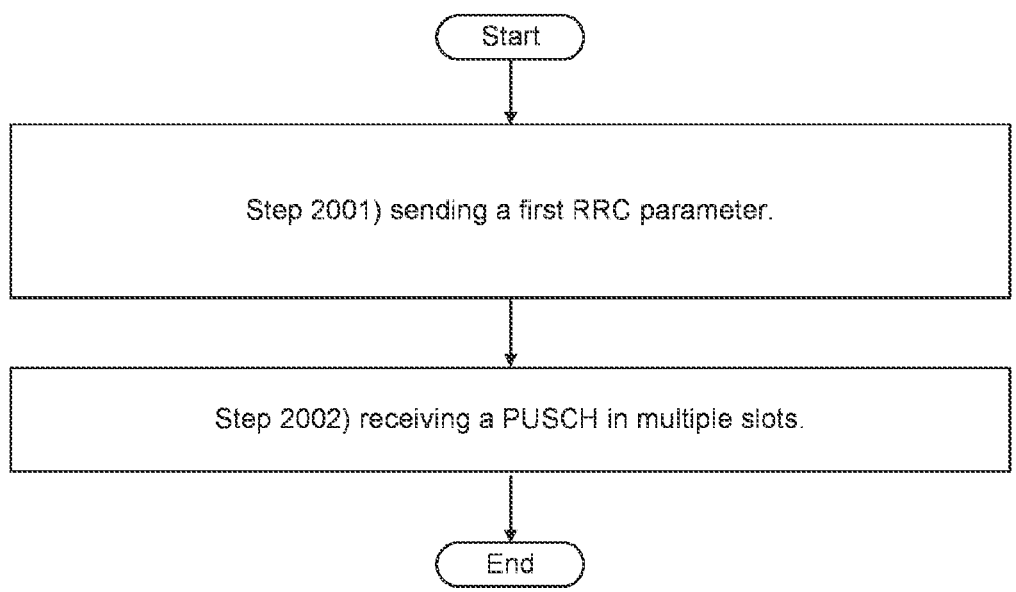
FIG. 20 is an example of a method for a base station.

FIG. 20 shows an example of a method for a base station is described. The method may comprise sending a first RRC parameter (Step 2001) and receiving a PUSCH in multiple slots (Step 2002). If the first RRC parameter is set to a first value, conditions in a slot format procedure may not be used for determination of the multiple slots. If the first RRC parameter is set to a second value, the conditions in the slot format procedure may be used for the determination of the multiple slots.

There are two types of transmission without dynamic grant. One is the configured grant Type 1 where an uplink grant is provided by RRC, and stored as configured uplink grant, and another is the configured grant Type 2 where an uplink grant is provided by PDCCH, and stored or cleared as configured uplink grant based on L1 signalling indicating configured uplink grant activation or deactivation. Type 1 and Type 2 are configured by RRC for a Serving Cell per BWP. Multiple configurations can be active simultaneously in the same BWP. For Type 2, activation and deactivation are independent among the Serving Cells. For the same BWP, the MAC entity can be configured with both Type 1 and Type 2.

RRC configures the following parameters when the configured grant Type 1 is configured. The cs-RNTI is used for determining CS-RNTI for retransmission. The periodicity is used for determining the periodicity of the configured grant Type 1. The timeDomainOffset is used for determining the offset of a resource with respect to SFN=timeReferenceSFN in time domain. The timeDomainAllocation is used for determining the allocation of configured uplink grant in time domain which contains startSymbolAndLength (i.e. SLIV) or startSymbol. The nrofHARQ-Processes is used for determining the number of HARQ processes for configured grant. The harq-ProcID-Offset is used for determining the offset of HARQ process for configured grant for operation with shared spectrum channel access. The harq-ProcID-Offset2 is used for determining the offset of HARQ process for configured grant. The timeReferenceSFN is used for determining the SFN used for determination of the offset of a resource in time domain. The UE uses the closest SFN with the indicated number preceding the reception of the configured grant configuration.

RRC configures the following parameters when the configured grant Type 2 is configured. The cs-RNTI is used for determining CS-RNTI for retransmission. The periodicity is used for determining the periodicity of the configured grant Type 2. The nrofHARQ-Processes is used for determining the number of HARQ processes for configured grant. The harq-ProcID-Offset is used for determining the offset of HARQ process for configured grant for operation with shared spectrum channel access. The harq-ProcID-Offset2 is used for determining the offset of HARQ process for configured grant.

RRC configures the following parameters when retransmissions on configured uplink grant is configured. The cg-RetransmissionTimer is used for determining the duration after a configured grant (re)transmission of a HARQ process when the UE may have to not autonomously retransmit that HARQ process.

Upon configuration of a configured grant Type 1 for a BWP of a Serving Cell by upper layers, the MAC entity may have to store the uplink grant provided by upper layers as a configured uplink grant for the indicated BWP of the Serving Cell and initialise or re-initialise the configured uplink grant to start in the symbol according to timeDomainOffset, timeReferenceSFN, and S (derived from SLIV or provided by startSymbol), and to reoccur with periodicity.

After an uplink grant is configured for a configured grant Type 1, the MAC entity may have to consider sequentially that the Nth (N>=0) uplink grant occurs in the symbol for which [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N×periodicity) modulo (1024×numberOfSlotsPerFrame×numberOfSymbolsPerSlot).

After an uplink grant is configured for a configured grant Type 2, the MAC entity may have to consider sequentially that the Nth (N>=0) uplink grant occurs in the symbol for which [(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo (1024×numberOfSlotsPerFrame×numberOfSymbolsPerSlot).

If cg-nrofPUSCH-InSlot or cg-nrofSlots is configured for a configured grant Type 1 or Type 2, the MAC entity may have to consider the uplink grants occur in those additional PUSCH allocations as specified in the UE procedure(s) for transmitting the PUSCH with the resource allocation for the uplink transmission with configured grant.

If the available slot-based counting is configured for a configured grant Type 1, the MAC entity may have to consider the Nth (N>=0) uplink grant occurs in the first symbol of the first available slot as specified in the UE procedure(s) associated with Transport Block repetition for uplink transmissions of PUSCH repetition Type A with a configured grant at or after the symbol for which [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N×periodicity) modulo (1024×numberOfSlotsPerFrame×numberOfSymbolsPerSlot).

If the available slot-based counting is configured for a configured grant Type 2, the MAC entity may have to consider the Nth (N>=0) uplink grant occurs in the first symbol of the first available slot as specified in the UE procedure(s) associated with Transport Block repetition for uplink transmissions of PUSCH repetition Type A with a configured gran at or after the symbol for which [(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo (1024×numberOfSlotsPerFrame×numberOfSymbolsPerSlot).

The SFNstart time, the slotstart time, and the symbolstart time are the SFN, slot, and symbol, respectively, of the first transmission opportunity of PUSCH where the configured uplink grant was (re-)initialised.

In case of unaligned SFN across carriers in a cell group, the SFN of the concerned Serving Cell is used to calculate the occurrences of configured uplink grants.

When the configured uplink grant is released by upper layers, all the corresponding configurations may have to be released, and all corresponding uplink grants may have to be cleared.

The MAC entity may have to, if at least one configured uplink grant confirmation has been triggered and not cancelled and if the MAC entity has UL resources allocated for new transmission and if, in this MAC entity, at least one configured uplink grant is configured by configuredGrant-ConfigToAddModList, instruct the Multiplexing and Assembly procedure to generate a Multiple Entry Configured Grant Confirmation MAC CE. Else, the MAC entity may have to instruct the Multiplexing and Assembly procedure to generate a Configured Grant Confirmation MAC CE. Or, the MAC entity may have to cancel all triggered configured uplink grant confirmation(s).

For a configured grant Type 2, the MAC entity may have to clear the configured uplink grant(s) immediately after first transmission of Configured Grant Confirmation MAC CE or Multiple Entry Configured Grant Confirmation MAC CE which confirms the configured uplink grant deactivation.

Retransmissions use repetition of configured uplink grants or received uplink grants addressed to CS-RNTI or configured uplink grants with cg-RetransmissionTimer configured.

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in the physical layer procedures for data.

Each HARQ process supports one TB.

Each HARQ process is associated with a HARQ process identifier. For UL transmission with UL grant in RA Response or for UL transmission for MSGA payload, HARQ process identifier 0 is used.

When a single DCI is used to schedule multiple PUSCH, the UE is allowed to map generated TB(s) internally to different HARQ processes in case of LBT failure(s), i.e. UE may transmit a new TB on any HARQ process in the grants that have the same TBS, the same RV and the NDIs indicate new transmission.

The maximum number of transmissions of a TB within a bundle of the dynamic grant or configured grant is given by REPETITION_NUMBER. For a dynamic grant, REPETITION_NUMBER is set to a value provided by lower layers, as specified in the UE procedures associated with the resource allocation in time domain. For a configured grant, REPETITION_NUMBER is set to a value provided by lower layers, as specified in the UE procedure(s) for transmitting the PUSCH with the resource allocation for the uplink transmission with configured grant.

If REPETITION_NUMBER>1, after the first transmission within a bundle, at most REPETITION_NUMBER−1 HARQ retransmissions follow within the bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to REPETITION_NUMBER for a dynamic grant or configured uplink grant unless they are terminated as specified in the UE procedure for transmitting the PUSCH. Each transmission within a bundle is a separate uplink grant delivered to the HARQ entity.

The K available slots may be configured based on the REPETITION_NUMBER.

If a UE is configured with higher layer parameter pusch-TimeDomainAllocationListForMultiPUSCH, the UE does not expect to be configured with pusch-AggregationFactor.

FIG. 21 shows an example of a table of an applicable PUSCH time domain resource allocation for common search space and DCI format 0_0 in UE specific search space.

FIG. 22 shows an example of a table of an applicable PUSCH time domain resource allocation for DCI format 0_1 in UE specific search space scrambled with C-RNTI, MCS-C-RNTI, CS-RNTI or SP-CSI-RNTI.

FIG. 23 shows an example of a table of an applicable PUSCH time domain resource allocation for DCI format 0_2 in UE specific search space scrambled with C-RNTI, MCS-C-RNTI, CS-RNTI or SP-CSI-RNTI.

FIG. 24 shows an example of a table of a default PUSCH time domain resource allocation A for normal CP. The subcarrier spacing specific value j is used in determination of $K_2$ in conjunction to FIG. 24, for normal CP.

FIG. 21, FIG. 22 and FIG. 23 define which PUSCH time domain resource allocation configuration to apply. FIG. 21, FIG. 22 and FIG. 23 is used for determination of the resource allocation table to be used for PUSCH.

When the UE is scheduled to transmit a PUSCH with no transport block and with a CSI report(s) by a 'CSI request' field on a DCI, the 'Time domain resource assignment' field value m of the DCI provides a row index m+1 to the allocated table as defined in FIG. 21, FIG. 22, FIG. 23 and FIG. 24.

For PUSCH repetition Type A, the starting symbol S relative to the start of the slot, and the number of consecutive symbols L counting from the symbol S allocated for the PUSCH are determined from the start and length indicator SLIV of the indexed row.

For PUSCH repetition Type B, the starting symbol S relative to the start of the slot, and the number of consecutive symbols L counting from the symbol S allocated for the PUSCH are provided by startSymbol and length of the indexed row of the resource allocation table, respectively.

For PUSCH repetition Type A, the PUSCH mapping type is set to Type A or Type B as defined in Precoding and mapping to physical resources as given by the indexed row.

For PUSCH repetition Type B, the PUSCH mapping type is set to Type B.

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as the number of repetitions K is equal to numberOfRepetitions if numberOfRepetitions is present in the resource allocation table, the number of repetitions K is equal to pusch-AggregationFactor elseif the UE is configured with pusch-AggregationFactor, otherwise K=1. The number of slots used for TBS determination N is equal to 1.

For unpaired spectrum, when an RRC parameter AvailableSlotCounting is enabled, the UE determines N*K slots for a PUSCH transmission of a PUSCH repetition Type A scheduled by DCI format 0_1 or 0_2, based on RRC parameters tdd-UL-DL-ConfigurationCommon, tdd-UL-DL-ConfigurationDedicated and ssb-PositionsInBurst, and the TDRA information field value in the DCI format 0_1 or 0_2. A slot is not counted in the number of N*K slots for PUSCH transmission of a PUSCH repetition Type A scheduled by DCI format 0_1 or 0_2 if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst. Otherwise, the UE determines N*K consecutive slots for a PUSCH transmission of a PUSCH repetition Type A scheduled by DCI format 0_1 or 0_2, based on the TDRA information field value in the DCI format 0_1 or 0_2.

As explained above, there are two counting method, one is available-slot counting (also referred to as the counting based on available slots) and the other is physical-slot counting (also referred to as the counting based on consecutive slots, consecutive-slot counting or regular/normal/legacy counting). In the available-slot counting, the N*K earliest available slots no earlier than the slot which is determined by the slot offset K2 may be determined as the slots for a PUSCH transmission, where a slot is not counted as the available slot if at least one of the symbols indicated by the indexed row of the used resource allocation table (i.e., the symbols indicated by the TDRA field) in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst. In the physical-slot counting, the N*K consecutive slots starting with the slot which is determined by the slot offset K2 may be determined as the slots for a PUSCH transmission, irrespective of the overlapping with the DL symbol or the symbol of the SS/PBCH block. Note that the actual transmission in the slot determined for the PUSCH may or may not be further dropped depending on the collisions with other channels and/or signals.

For unpaired spectrum, when an RRC parameter AvailableSlotCounting is enabled and the UE is scheduled to transmit a PUSCH with no transport block and with a CSI report(s) by a'CSI request' field on a DCI, the UE may determine N*K consecutive slots for a PUSCH transmission of a PUSCH repetition Type A scheduled by DCI format 0_1 or 0_2, based on the TDRA information field value in the DCI format 0_1 or 0_2.

For unpaired spectrum, when an RRC parameter AvailableSlotCounting is enabled and the UE is scheduled to transmit a PUSCH with no transport block and with a CSI report(s) by a 'CSI request' field on a DCI, the UE may determine N*K consecutive slots for a PUSCH transmission with a transport block of a PUSCH repetition Type A scheduled by DCI format 0_1 or 0_2, based on the TDRA information field value in the DC format 0_1 or 0_2.

For unpaired spectrum, when an RRC parameter AvailableSlotCounting is disabled and the UE is scheduled to transmit a PUSCH with no transport block and with a CSI report(s) by a'CSI request' field on a DCI, the UE may determine N*K consecutive slots for a PUSCH transmission of a PUSCH repetition Type A scheduled by DCI format 0_1 or 0_2, based on the TDRA information field value in the DCI format 0_1 or 0_2.

For unpaired spectrum, when an RRC parameter AvailableSlotCounting is disabled and the UE is scheduled to transmit a PUSCH with no transport block and with a CSI report(s) by a'CSI request' field on a DCI, the UE may determine N*K consecutive slots for a PUSCH transmission with a transport block of a PUSCH repetition Type A scheduled by DCI format 0_1 or 0_2, based on the TDRA information field value in the DC format 0_1 or 0_2.

For unpaired spectrum, when an RRC parameter AvailableSlotCounting is enabled and the UE is scheduled to transmit a PUSCH with no transport block and with a CSI report(s) by a 'CSI request' field on a DCI, the UE may determine N*K slots for a PUSCH transmission of a PUSCH repetition Type A scheduled by DCI format 0_1 or 0_2, based on RRC parameters tdd-UL-DL-ConfigurationCommon, tdd-UL-DL-ConfigurationDedicated and ssb-PositionsInBurst, and the TDRA information field value in the DCI format 0_1 or 0_2. A slot may be not counted in the number of the N*K slots for the PUSCH transmissions with a transport block of a PUSCH repetition Type A scheduled by DCI format 0_1 or 0_2 if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst.

For unpaired spectrum, when an RRC parameter AvailableSlotCounting is disabled and the UE is scheduled to transmit a PUSCH with no transport block and with a CSI report(s) by a 'CSI request' field on a DCI, the UE may determine N*K slots for a PUSCH transmission of a PUSCH repetition Type A scheduled by DCI format 0_1 or 0_2, based on RRC parameters tdd-UL-DL-ConfigurationCommon, tdd-UL-DL-ConfigurationDedicated and ssb-PositionsInBurst, and the TDRA information field value in the DCI format 0_1 or 0_2. A slot may be not counted in the number of the N*K slots for the PUSCH transmissions with a transport block of a PUSCH repetition Type A scheduled by DCI format 0_1 or 0_2 if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst.

For unpaired spectrum, the UE determines N*K slots for a PUSCH transmission of TB processing over multiple slots scheduled by DCI format 0_1 or 0_2, based on tdd-UL-DL-ConfigurationCommon, tdd-UL-DL-ConfigurationDedicated and ssb-PositionsInBurst, and the TDRA information field value in the DCI format 0_1 or 0_2. A slot is not counted in the number of N*K slots for a PUSCH transmission of TB processing over multiple slots if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst.

For unpaired spectrum, the UE determines N*K slots for a PUSCH transmission of a PUSCH repetition Type A scheduled by RAR UL grant, based on tdd-UL-DL-ConfigurationCommon and ssb-PositionsInBurst, and the TDRA information field value in the RAR UL grant. A slot is not counted in the number of N*K slots for a PUSCH transmission of a PUSCH repetition Type A scheduled by RAR UL grant, if at least one of the symbols indicated by the indexed row of the used resource allocation table in the slot overlaps with a DL symbol indicated by tdd-UL-DL-ConfigurationCommon if provided, or a symbol of an SS/PBCH block with index provided by ssb-PositionsInBurst.

For unpaired spectrum, the UE determines N*K slots for a PUSCH transmission of a PUSCH repetition Type A scheduled by DCI format 0_0 with CRC scrambled by TC-RNTI, based on tdd-UL-DL-ConfigurationCommon and ssb-PositionsInBurst and the TDRA information field value in the DCI scheduling the PUSCH. A slot is not counted in the number of N*K slots for a PUSCH transmission of a PUSCH repetition Type A scheduled by DCI format 0_0 scrambled by TC-RNTI, if at least one of the symbols indicated by the indexed row of the used resource allocation table in the slot overlaps with a DL symbol indicated by tdd-UL-DL-ConfigurationCommon if provided, or a symbol of an SS/PBCH block with index provided by ssb-PositionsInBurst.

For paired spectrum and SUL band, the UE determines N*K consecutive slots for a PUSCH transmission of a PUSCH repetition Type A scheduled by DCI format 0_1 or 0_2, or for a PUSCH transmission of TB processing over multiple slots scheduled by DCI format 0_1 or 0_2, based on the TDRA information field value in the DCI format 0_1 or 0_2, irrespective of whether an RRC parameter AvailableSlotCounting is enabled or not. For the case of reduced capability half-duplex UE, and when an RRC parameter AvailableSlotCounting is enabled, a slot is not counted in the number of N*K slots for a PUSCH transmission of a PUSCH repetition Type A scheduled by DCI format 0_1 or 0_2, or for a PUSCH transmission of TB processing over multiple slots scheduled by DCI format 0_1 or 0_2, if at least one of the symbols indicated by the indexed row of the used resource allocation table in the slot overlaps with a symbol of an SS/PBCH block with index provided by ssb-PositionsInBurst.

For paired spectrum and SUL band, the UE determines N*K consecutive slots for a PUSCH transmission of a PUSCH repetition Type A scheduled by RAR UL grant, based on the TDRA information field value in the RAR UL grant.

For paired spectrum and SUL band, the UE determines N*K consecutive slots for a PUSCH transmission of a PUSCH repetition Type A scheduled by DCI format 0_0 with CRC scrambled by TC-RNTI, based on the TDRA information field value in the DCI scheduling the PUSCH.

If an RRC parameter AvailableSlotCounting is enabled and a UE would transmit a PUSCH of a TB processing over multiple slots or PUSCH repetition Type A over N*K slots, and the UE does not transmit the PUSCH of a TB processing over multiple slots or the PUSCH repetition Type A in a slot from the N*K slots, according to UE procedure(s) for reporting control information, UE procedure(s) associated with a slot configuration and UE procedure(s) associated with a cancellation indication, the UE counts the slots in the number of N*K slots.

For PUSCH repetition Type A, in case K>1, if the PUSCH is scheduled by DCI format 0_1 or 0_2, if an RRC parameter AvailableSlotCounting is enabled, the same symbol allocation is applied across the N*K slots determined for the PUSCH transmission and the PUSCH is limited to a single transmission layer. The UE may have to repeat the TB across the N*K slots determined for the PUSCH transmission, applying the same symbol allocation in each slot. Otherwise, the same symbol allocation is applied across the N*K consecutive slots and the PUSCH is limited to a single transmission layer. The UE may have to repeat the TB across the N*K consecutive slots applying the same symbol allocation in each slot. Else if the PUSCH is scheduled by RAR UL grant or by DCI format 0_0 with CRC scrambled by TC-RNTI, the same symbol allocation is applied across the N*K slots determined for the PUSCH transmission and the PUSCH is limited to a single transmission layer. The UE may have to repeat the TB across the N*K slots determined for the PUSCH transmission, applying the same symbol allocation in each slot.

For TB processing over multiple slots, for unpaired spectrum, the same symbol allocation is applied across the N*K slots determined for the PUSCH transmission and the PUSCH is limited to a single transmission layer. The UE may have to transmit the TB across the N*K slots determined for the PUSCH transmission, applying the same symbol allocation in each slot. For paired spectrum or supplementary uplink band, the same symbol allocation is applied across the N*K consecutive slots and the PUSCH is limited to a single transmission layer. The UE may have to transmit the TB across the N*K consecutive slots applying the same symbol allocation in each slot.

For a PUSCH transmission scheduled by DCI format 0_1, or 0_2, or 0_0 with CRC scrambled by TC-RNTI, the redundancy version to be applied on the nth transmission occasion of the TB, where n=0, 1, . . . N*K−1, is determined according to FIG. 25.

For a PUSCH transmission of a PUSCH repetition Type A scheduled by RAR UL grant, the redundancy version to be applied on the nth transmission occasion of the TB, where n=0, 1, . . . N*K−1, is determined according to the first row of FIG. 25.

For PUSCH repetition Type A and TB processing over multiple slots, a PUSCH transmission in a slot of a multi-slot PUSCH transmission is omitted according to the conditions in UE procedure(s) for reporting control information, UE procedure(s) associated with a slot configuration and UE procedure(s) associated with a cancellation indication.

For PUSCH repetition Type B, after determining the invalid symbol(s) for PUSCH repetition Type B transmission for each of the K nominal repetitions, the remaining symbols are considered as potentially valid symbols for PUSCH repetition Type B transmission. If the number of potentially valid symbols for PUSCH repetition Type B transmission is greater than zero for a nominal repetition, the nominal repetition consists of one or more actual repetitions, where each actual repetition consists of a consecutive set of all potentially valid symbols that can be used for PUSCH repetition Type B transmission within a slot. An actual repetition with a single symbol is omitted except for the case of L=1. An actual repetition is omitted according to the conditions in UE procedure(s) for reporting control information, UE procedure(s) associated with a slot configuration and UE procedure(s) associated with a cancellation indication. The UE may have to repeat the TB across actual repetitions. The redundancy version to be applied on the nth actual repetition (with the counting including the actual repetitions that are omitted) is determined according to FIG. 25, where N=1.

For PUSCH repetition Type B, when a UE receives a DCI that schedules aperiodic CSI report(s) or activates semi-persistent CSI report(s) on PUSCH with no transport block by a 'CSI request' field on a DCI, the number of nominal repetitions is always assumed to be 1, regardless of the value of numberOfRepetitions. When the UE is scheduled to transmit a PUSCH repetition Type B with no transport block and with aperiodic or semi-persistent CSI report(s) by a 'CSI request' field on a DCI, the first nominal repetition is expected to be the same as the first actual repetition. For PUSCH repetition Type B carrying semi-persistent CSI report(s) without a corresponding PDCCH after being activated on PUSCH by a 'CSI request' field on a DCI, if the first nominal repetition is not the same as the first actual repetition, the first nominal repetition is omitted; otherwise, the first nominal repetition is omitted according to the conditions in UE procedure(s) for reporting control information, UE procedure(s) associated with a slot configuration and UE procedure(s) associated with a cancellation indication.

For PUSCH repetition Type B, when a UE is scheduled to transmit a transport block and aperiodic CSI report(s) on PUSCH by a 'CSI request' field on a DCI, the CSI report(s) is multiplexed only on the first actual repetition. The UE does not expect that the first actual repetition has a single symbol duration.

If pusch-TimeDomainAllocationListForMultiPUSCH in pusch-Config contains row indicating resource allocation for two to eight contiguous PUSCHs, K2 indicates the slot where UE may have to transmit the first PUSCH of the multiple PUSCHs. Each PUSCH has a separate SLIV and mapping type. The number of scheduled PUSCHs is signalled by the number of indicated valid SLIVs in the row of the pusch-TimeDomainAllocationListForMultiPUSCH signalled in DCI format 0_1.

For pusch-TimeDomainAllocationListForMultiPUSCH-r17 in pusch-Config, each PUSCH has a separate SLIV, mapping type and K2. The number of scheduled PUSCHs is signalled by the number of indicated SLIVs in the row of the pusch-TimeDomainAllocationListForMultiPUSCH-r17 signalled in DCI format 0_1.

For both Type 1 and Type 2 PUSCH transmissions with a configured grant, when K>1, for unpaired spectrum, if an RRC parameter AvailableSlotCounting is enabled, the UE may have to repeat the TB across the N*K slots determined for the PUSCH transmission applying the same symbol allocation in each slot. A slot is not counted in the number of N·K slots if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst. Otherwise, the UE may have to repeat the TB across the N*K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

For both Type 1 and Type 2 PUSCH transmissions with a configured grant, when K>1, for paired spectrum, irrespective of whether AvailableSlotCounting is enabled or not, the UE may have to repeat the TB across the N*K consecutive slots applying the same symbol allocation in each slot, except if the UE is provided with RRC parameters cg-nrofSlots and cg-nrofPUSCH-InSlot, in which case the UE repeats the TB in the repK earliest consecutive transmission occasion candidates within the same configuration. If an RRC parameter AvailableSlotCounting is enabled, and in case of reduced capability half-duplex UE, a slot is not counted in the number of N*K slots if at least one of the symbols indicated by the indexed row of the used resource allocation table in the slot overlaps with or a symbol of an SS/PBCH block with index provided by ssb-PositionsInBurst.

A Type 1 or Type 2 PUSCH transmission with a configured grant in a slot is omitted according to the conditions in UE procedure(s) for reporting control information, UE procedure(s) associated with a slot configuration and UE procedure(s) associated with a cancellation indication.

For the PUSCH without UL-SCH and/or the PUSCH with CSI only, N=1 and K=1 may be assumed in the aforementioned procedure. A UE and a base station for this case are described.

The UE may comprise high-layer processing circuitry configured to acquire at least a first RRC parameter for indicating whether available-slot counting is enabled or not. The first RRC parameter may be named AvailableSlotCounting. The possible values of the first RRC parameter may be "enabled" and "disabled". The UE may also comprise reception circuitry configured to receive a DCI format (e.g., DCI format 0_1 or DCI format 0_2) for scheduling of a PUSCH. This may also be described as that the reception circuitry may monitor and detect a PDCCH which carries the DCI format. The UE may also comprise transmission circuitry configured to transmit the PUSCH in one or more slots scheduled by the DCI format. The UE may transmit the PUSCH upon the detection of the PDCCH with the DCI format which schedules the PUSCH.

A base station which communicates with the UE may comprise the functional units associated with the functional units at the UE side and may perform the processes associated with the processes at the UE side. The base station (also referred to as gNB) may comprise high-layer processing circuitry configured to send at least a first RRC parameter for indicating whether available-slot counting is enabled or not. The base station may also comprise transmission circuitry configured to transmit a DCI format (e.g., DCI format 0_1 or DCI format 0_2) for scheduling of a PUSCH. This may also be described as that the transmission circuitry may transmit a PDCCH which carries the DCI format. The base station may also comprise reception circuitry configured to receive the PUSCH in one or more slots scheduled by the DCI format. The base station may monitor and receive the PUSCH upon the transmission of the PDCCH with the DCI format which schedules the PUSCH.

The DCI format may include a plurality of information fields. The plurality of information fields may include Time domain resource assignment field (also referred to as TDRA (time domain resource allocation) field). The plurality of information fields may include CSI request field. The plurality of information fields may include UL-SCH indicator field. A trigger state may be initiated using the CSI request field in DCI. When all the bits of CSI request field in DCI are set to zero, no CSI is requested. Each of the other values of the CSI request field in DCI may correspond to and indicate a respective triggering state. Each trigger state may contain a list of associated CSI-ReportConfigs indicating the Resource Set IDs for channel and optionally for interference. A value of "1" set in the UL-SCH indicator field may indicate UL-SCH is to be transmitted on the PUSCH and a value of "0" in the UL-SCH indicator field may indicate UL-SCH is not to be transmitted on the PUSCH. In other words, a value of "1" set in the UL-SCH indicator field may indicate at least one transport block is to be included in the PUSCH, and a value of "0" set in the UL-SCH indicator field may indicate no transport block is to be included in the PUSCH. The value of the UL-SCH indicator field may be set to "0" only when a trigger state except for no CSI request is initiated using the CSI request field in the DCI.

In a case that the first RRC parameter indicates that the available-slot counting is enabled and the PUSCH is transmitted in unpaired spectrum, the UE may determine whether to use available-slot counting, based on a metric. The metric may be whether a transport block is included in the PUSCH or not. For example, the available-slot counting is used if a transport block is included on the PUSCH, and the physical-slot counting is used if a transport block is not included on the PUSCH. In other words, the UE may determine whether a first slot where at least one of symbols indicated by a TDRA field overlaps with a DL symbol or a symbol of an SS/PBCH block is not counted as a second slot for a transmission of the PUSCH or not, based on whether a transport block is included on the PUSCH or not. For example, the first slot is not counted as the second slot if a transport block is included on the PUSCH, and the first slot is counted as the second slot if a transport block is not included on the PUSCH.

Alternatively or additionally, the metric may be whether the value of the UL-SCH index field is set to "1" or "0". For example, the available-slot counting is used if the value of the UL-SCH index field in the DCI is set to "1", and the physical-slot counting is used if the value of the UL-SCH index field in the DCI is set to "0".

Yet alternatively or additionally, the metric may be whether the value of the CSI request field indicates another trigger state than no CSI request or not. For example, the available-slot counting is used if the value of the CSI request field indicates another trigger state than no CSI request, and the physical-slot counting is used if the value of the CSI request field indicates the state corresponding to no CSI request.

Yet alternatively or additionally, the metric may be whether the PUSCH is for CSI only or not. For example, the available-slot counting is used if the PUSCH is not for CSI only, and the physical-slot counting is used if the PUSCH is for CSI only.

These methods may lead to a unified processing for the CSI-only PUSCH transmissions with and without AvailableSlotCounting configuration, and therefore the processing complexity in terms of aperiodic CSI reporting may be reduced.

In a case that the high-layer processing circuitry does not acquire the first RRC parameter which indicates that the available-slot counting is enabled, the UE may always use the physical-slot counting. In other words, in a case that the high-layer processing circuitry does not acquire the first RRC parameter which indicates that the available-slot counting is enabled, the UE may determine the first slot is counted as the second slot, regardless of whether a transport block is included on the PUSCH or not. In a case that the PUSCH is transmitted in paired spectrum, the UE may always use the physical-slot counting. In other words, in a case that the PUSCH is transmitted in paired spectrum, the UE may determine the first slot is counted as the second slot, regardless of whether a transport block is included on the PUSCH or not.

As an alternative way, in a case that the first RRC parameter indicates that the available-slot counting is enabled and the PUSCH is transmitted in unpaired spectrum, the UE may use available-slot counting for determination of a slot for a transmission of the PUSCH without a transport block and with an aperiodic CSI report. This is the same as for a transmission of the PUSCH with a transport block and with an aperiodic CSI report or for a multi-slot transmission of the PUSCH with a transport block.

This method may lead to a unified processing for available-slot counting for the PUSCH transmission with a transport block and the CSI-only PUSCH transmission, and therefore the processing complexity in terms of slot counting may be reduced.

More details of UE procedure(s) for applying transform precoding on PUSCH are described.

For a PUSCH scheduled by RAR UL grant, or for a PUSCH scheduled by fallbackRAR UL grant, or for a PUSCH scheduled by DCI format 0_0 with CRC scrambled by TC-RNTI, the UE shall consider the transform precoding either 'enabled' or 'disabled' according to the higher layer configured parameter msg3-transformPrecoder.

For a MsgA PUSCH, the UE shall consider the transform precoding either 'enabled' or 'disabled' according to the higher layer configured parameter msgA-TransformPrecoder. If an RRC parameter msgA-TransformPrecoder is not configured, the UE shall consider the transform precoding either 'enabled' or 'disabled' according to the RRC parameter msg3-transformPrecoder.

The RRC parameter msgA-TransformPrecoder indicates whether the UE enables or disables the transform precoder for MsgA transmission.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was received with DCI format 0_0, the UE shall, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameter transformPrecoder in pusch-Config, the UE shall, for this PUSCH transmission, consider the transform precoding either enabled or disabled according to this parameter (i.e. configured transformPrecoder).

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder and dynamicSwitchingTransformPrecoder set to 'disabled' in pusch-Config, the UE shall, for this PUSCH transmission, consider the transform precoding either enabled or disabled according to the RRC parameter transformPrecoder.

"The DCI with the scheduling grant was not received with DCI format 0_0" may mean that "the DCI with the scheduling grant was received with a DCI format other than the DCI format 0_0". Or "the DCI with the scheduling grant was not received with DCI format 0_0" may mean that "the scheduling grant was received with a configured grant".

The RRC parameter dynamicSwitchingTransformPrecoder indicates whether or not the 'transform precoding indicator' field is included in the DCI format 0_1/0_2. The 'transform precoding indicator' field is used for indicating whether or not the transform precoder is enabled.

The RRC parameter dynamicSwitchingTransformPrecoder may be configured as a common parameter for different DCI formats.

The RRC parameter dynamicSwitchingTransformPrecoder may be configured for the DCI format 0_1 and the DCI format 0_2, respectively. In other words, the RRC parameter dynamicSwitchingTransformPrecoder corresponding to each of DCI formats may be configured. If the UE is configured with the RRC parameters dynamicSwitchingTransformPrecoder corresponding to each of DCI formats, the UE may assume that the 'transform precoding indicator' field may be included in the corresponding DCI format(s), respectively.

If the RRC parameter dynamicSwitchingTransformPrecoder indicates 'enabled', the 'transform precoding indicator' field may be included in the DCI format 0_1/0_2. If the RRC parameter dynamicSwitchingTransformPrecoder indicates 'disabled', the 'transform precoding indicator' field may not be included in the DCI format 0_1/0_2.

If the RRC parameter dynamicSwitchingTransformPrecoder is configured, the UE may assume that the 'transform precoding indicator' field may be included in the DCI format 0_1/0_2. The RRC parameter dynamicSwitchingTransformPrecoder may indicate that the 'transform precoding indicator' field is included in the DCI format 0_1/0_2, if provided.

If the RRC parameter dynamicSwitchingTransformPrecoder is not configured/absent, the UE may assume that the 'transform precoding indicator' field may not be included in the DCI format 0_1/0_2.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder and dynamicSwitchingTransformPrecoder set to 'enabled' in pusch-Config, the UE shall, for this PUSCH transmission, consider the transform precoding either enabled or disabled according to the DCI 'transform precoding indicator' field.

Alternatively, for PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder and dynamicSwitchingTransformPrecoder set to 'enabled' in pusch-Config, the UE shall, for this PUSCH transmission, consider the transform precoding either enabled or disabled according to the DCI 'transform precoding indicator' field, irrespective of the value of the transformPrecoder.

Alternatively, for PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is configured with the RRC parameters transformPrecoder set to 'enabled' and dynamicSwitchingTransformPrecoder set to 'enabled' in pusch-Config, the UE shall, for this PUSCH transmission, consider the transform precoding either enabled or disabled according to the DCI 'transform precoding indicator' field.

The UE may assume that the DCI 'transform precoding indicator' field is not included in the DCI format 0_0.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is not configured with the RRC parameter transformPrecoder in pusch-Config, the UE shall, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0 and if the UE is not configured with the RRC parameters transformPrecoder and dynamicSwitchingTransformPrecoder set to 'enabled' in pusch-Config, the UE shall, for this PUSCH transmission, consider the transform precoding either enabled or disabled according to the higher layer configured parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0 and if the UE is not configured with the RRC parameters transformPrecoder and dynamicSwitchingTransformPrecoder in pusch-Config, the UE shall, for this PUSCH transmission, consider the transform precoding either enabled or disabled according to the higher layer configured parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, if the UE is not configured with the RRC parameters transformPrecoder and if the UE is configured with dynamicSwitchingTransformPrecoder set to 'disabled' in pusch-Config, the UE shall, for this PUSCH transmission, consider the transform precoding either enabled or disabled according to the RRC parameter msg3-transformPrecoder.

For PUSCH transmission scheduled by a PDCCH with CRC scrambled by CS-RNTI with NDI=1, C-RNTI, or MCS-C-RNTI or SP-CSI-RNTI, if the DCI with the scheduling grant was not received with DCI format 0_0, and if the UE is not configured with the RRC parameter transform- Precoder in pusch-Config and if the UE is configured with the RRC parameter dynamicSwitchingTransformPrecoder set to 'enabled' in pusch-Config, the UE shall, for this PUSCH transmission, consider the transform precoding either enabled or disabled according to the DCI 'transform precoding indicator' field.

The feature of the DCI 'transform precoding indicator' field may be realized by using the DCI field other than 'transform precoding indicator' field. In other words, if the UE is configured with the RRC parameter dynamicSwitchingTransformPrecoder set to 'enabled' in pusch-Config, a first value of a first DCI field may indicate that the transform precoder is enabled, and a second value of the first DCI field may indicate that the transform precoder is disabled. The UE may assume that the value(s) of the first DCI field included in the DCI format are associated with whether or not the transform precoder is enabled.

If the base station provides the RRC parameter dynamicSwitchingTransformPrecoder set to 'enabled' in pusch-Config, a first value of a first DCI field may be set for indicating that the transform precoder is enabled, and a second value of the first DCI field may be set for indicating that the transform precoder is disabled.

For PUSCH transmission with a configured grant, if the UE is configured with the RRC parameter transformPrecoder in configuredGrantConfig, the UE shall, for this PUSCH transmission, consider the transform precoding either enabled or disabled according to this parameter.

For PUSCH transmission with a configured grant, if the UE is not configured with the RRC parameter transformPrecoder in configuredGrantConfig, the UE shall, for this PUSCH transmission, consider the transform precoding either enabled or disabled according to the higher layer configured parameter msg3-transformPrecoder.

Here, "the dynamicSwitchingTransformPrecoder is configured" may have a same meaning as "the dynamicSwitchingTransformPrecoder set to 'enabled' is configured". And "the dynamicSwitchingTransformPrecoder is not configured" may have a same meaning as "the dynamicSwitchingTransformPrecoder set to 'disabled' is configured".

Each of a program running on the base station device and the terminal device according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A user equipment (UE) comprising:

high-layer processing circuitry configured to acquire at least a first radio resource control (RRC) parameter for indicating whether or not a transform precoder is enabled and a second RRC parameter for indicating whether or not a transform precoding indicator field is included in a downlink control information (DCI) format;

reception circuitry configured to receive the DCI format for scheduling of a physical uplink shared channel (PUSCH); and transmission circuitry configured to transmit the PUSCH scheduled by the DCI format, wherein in a case that the second RRC parameter indicates that the transform precoding indicator field is included in the DCI format, the transmission circuitry is further configured to apply a transform precoding for the transmission of the PUSCH based on a value of the transform precoding indicator field in the DCI format.

2. A base station comprising:

higher-layer processing circuitry configured to provide at least a first radio resource control (RRC) parameter for indicating whether or not a transform precoder is enabled and a second RRC parameter for indicating whether or not a transform precoding indicator field is included in a downlink control information (DCI) format;

transmission circuitry configured to transmit the DCI format for scheduling of a physical uplink shared channel (PUSCH); and reception circuitry configured to receive the PUSCH scheduled by the DCI format, wherein in a case that the second RRC parameter indicates that the transform precoding indicator field is included in the DCI format, the transmission circuitry is further configured to transmit the DCI format including the transform precoding indicator field and the reception circuitry is configured to receive the PUSCH with a transform precoding applied based on a value of the transform precoding indicator field in the DCI format.

3. A method for a user equipment, the method comprising:

acquiring at least a first radio resource control (RRC) parameter for indicating whether or not a transform precoder is enabled and a second RRC parameter for indicating whether or not a transform precoding indicator field is included in a downlink control information (DCI) format;

receiving the DCI format for scheduling of a physical uplink shared channel (PUSCH);

transmitting the PUSCH scheduled by the DCI format; and applying a transform precoding for the transmission of the PUSCH based on a value of the transform precoding indicator field in the DCI format in a case that the second RRC parameter indicates that the transform precoding indicator field is included in the DCI format.

* * * * *